Sept. 8, 1931.  W. W. LASKER  1,822,156
PRINTING TABULATOR
Original Filed March 28, 1917   23 Sheets-Sheet 1

Witnesses:

Inventor:
William W. Lasker.
By his Atty,

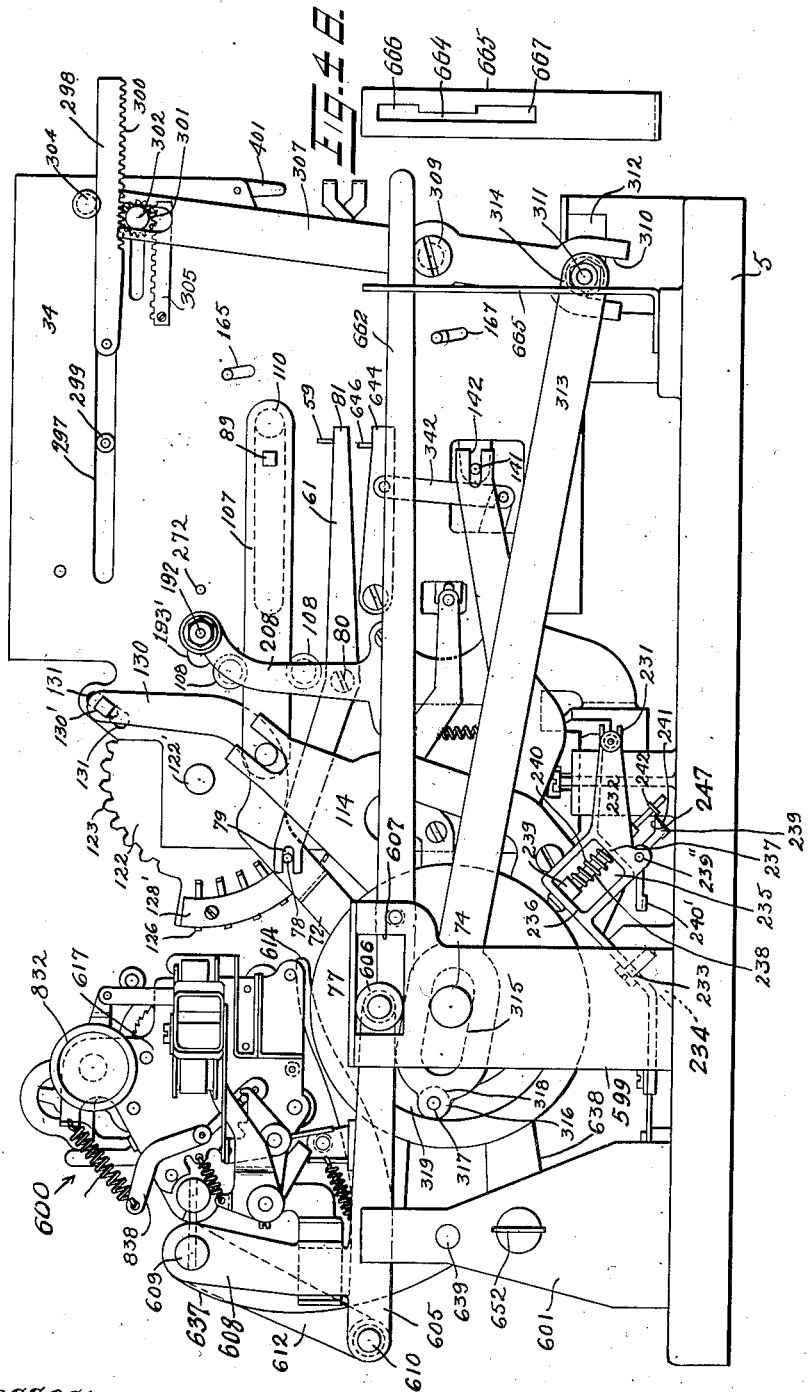

Sept. 8, 1931.  W. W. LASKER  1,822,156
PRINTING TABULATOR
Original Filed March 28, 1917  23 Sheets-Sheet 3
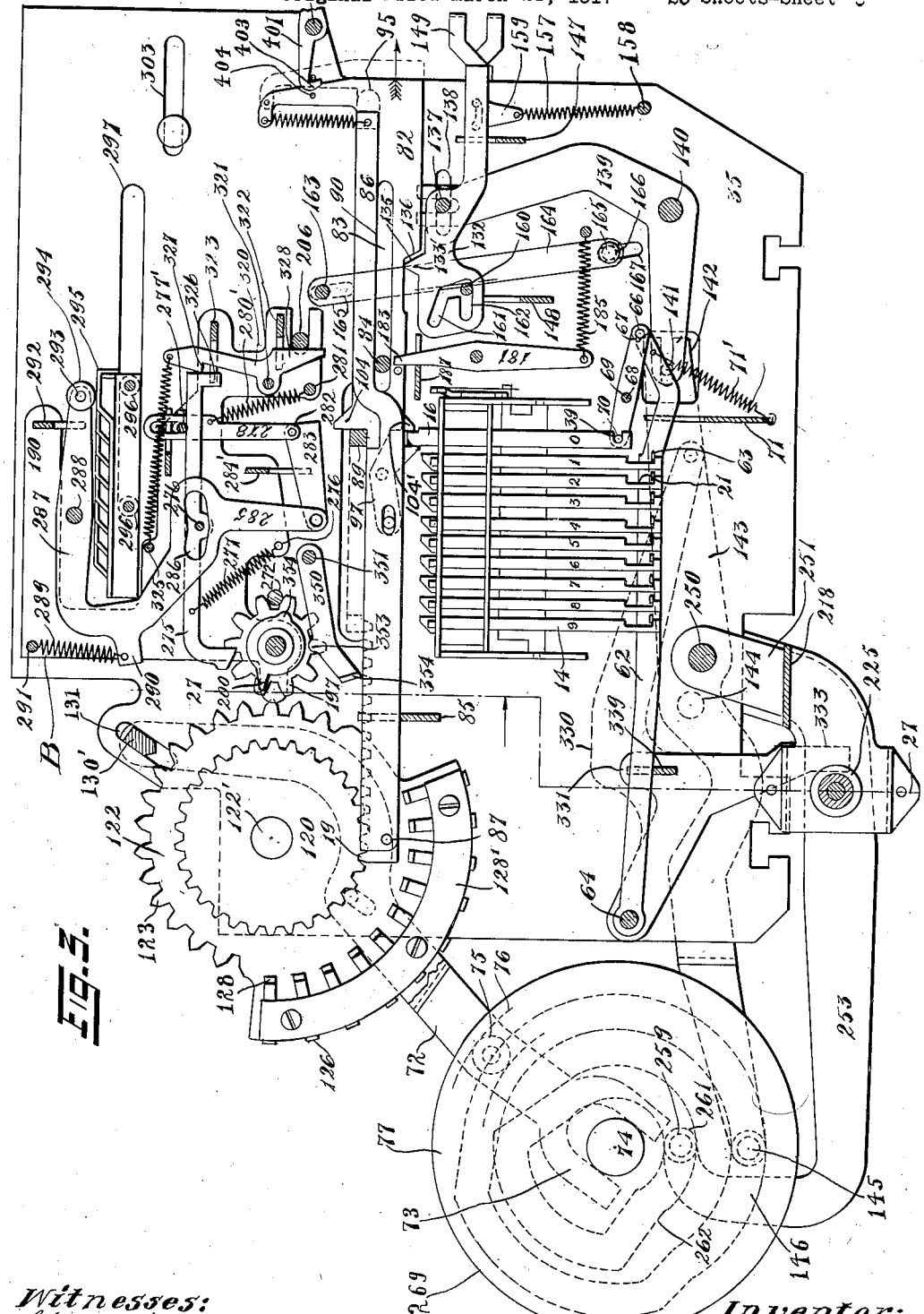

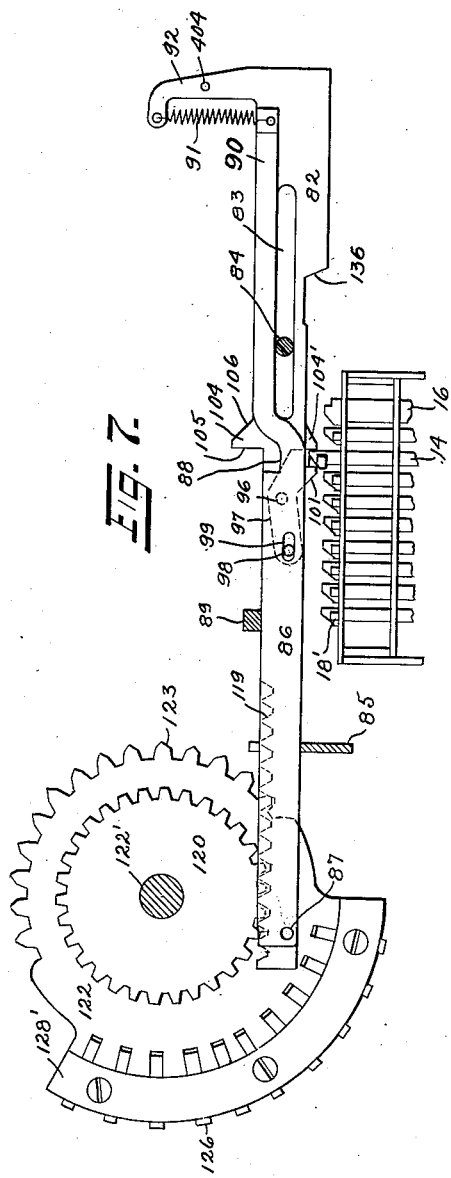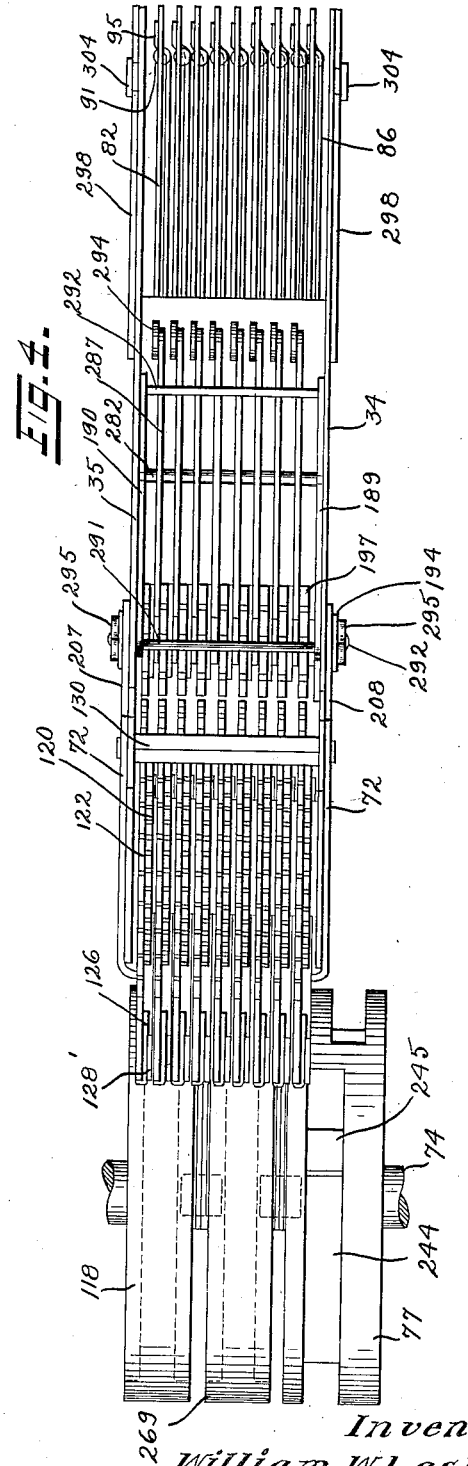

Sept. 8, 1931.  W. W. LASKER  1,822,156
PRINTING TABULATOR
Original Filed March 28, 1917    23 Sheets-Sheet 5
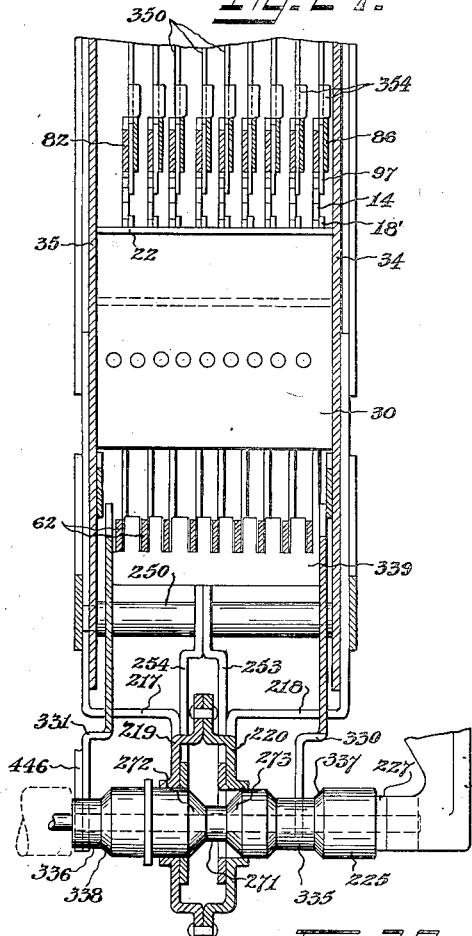
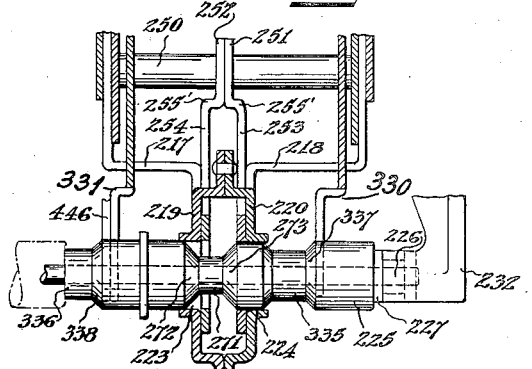
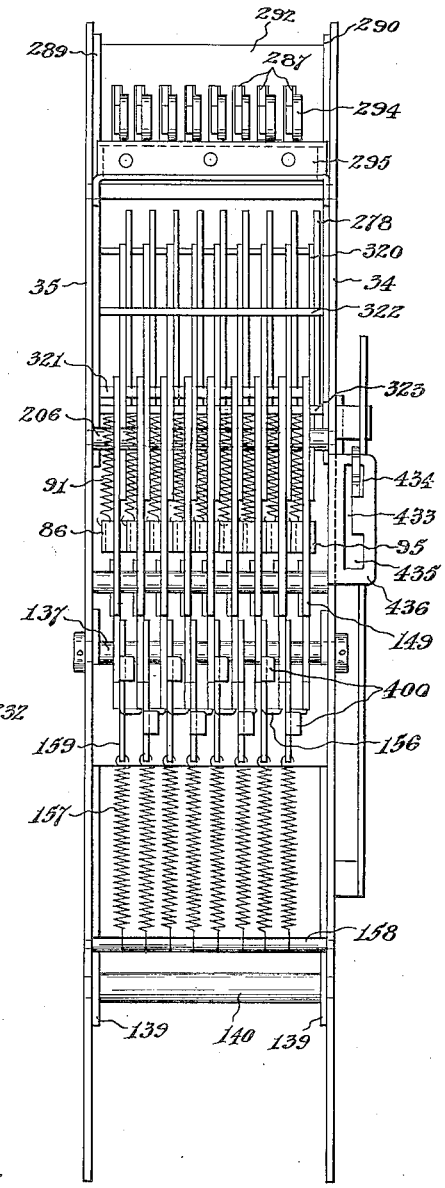
Inventor:
William W. Lasker.

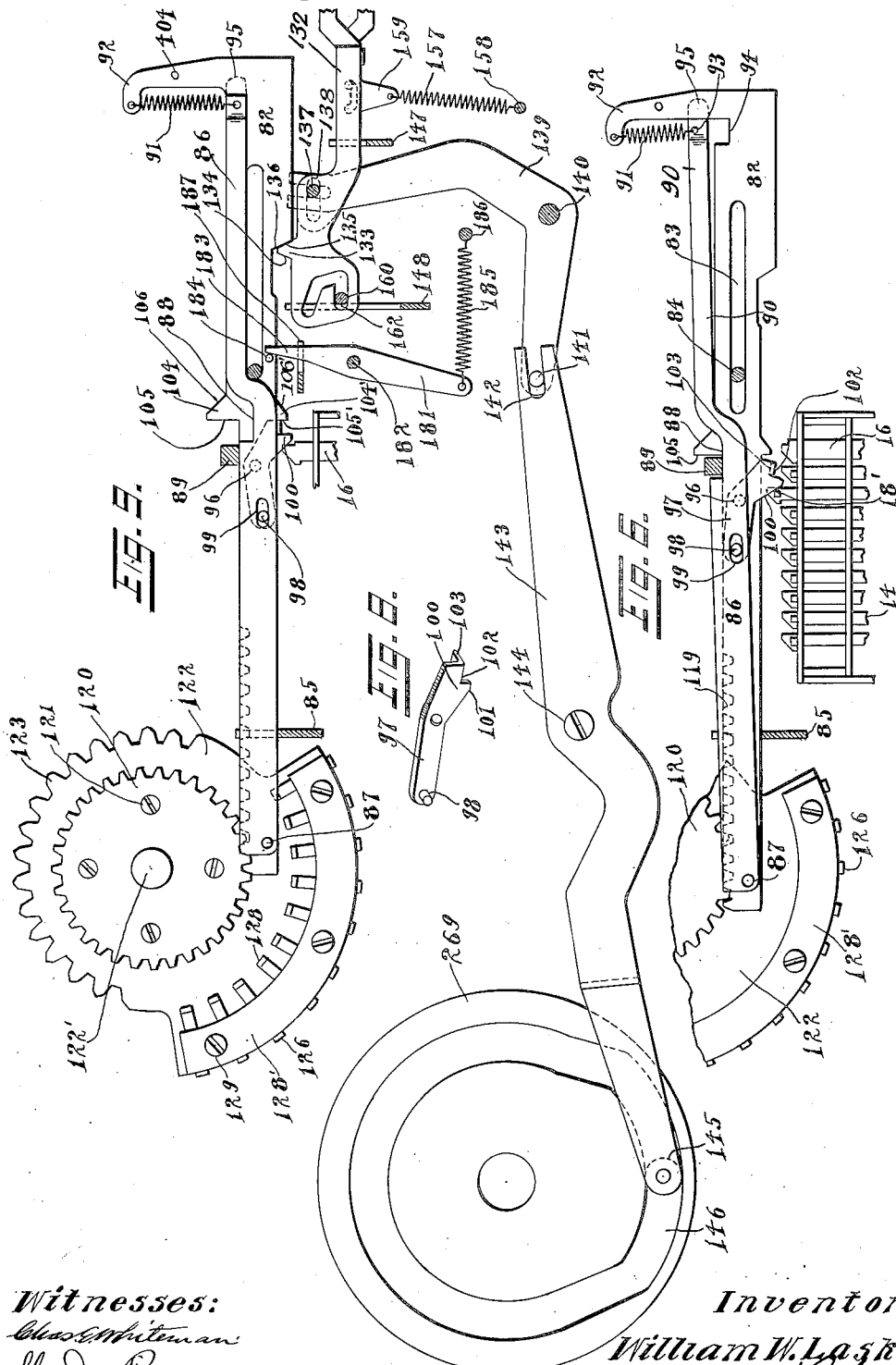

Sept. 8, 1931. W. W. LASKER 1,822,156
PRINTING TABULATOR
Original Filed March 28, 1917 23 Sheets-Sheet 7
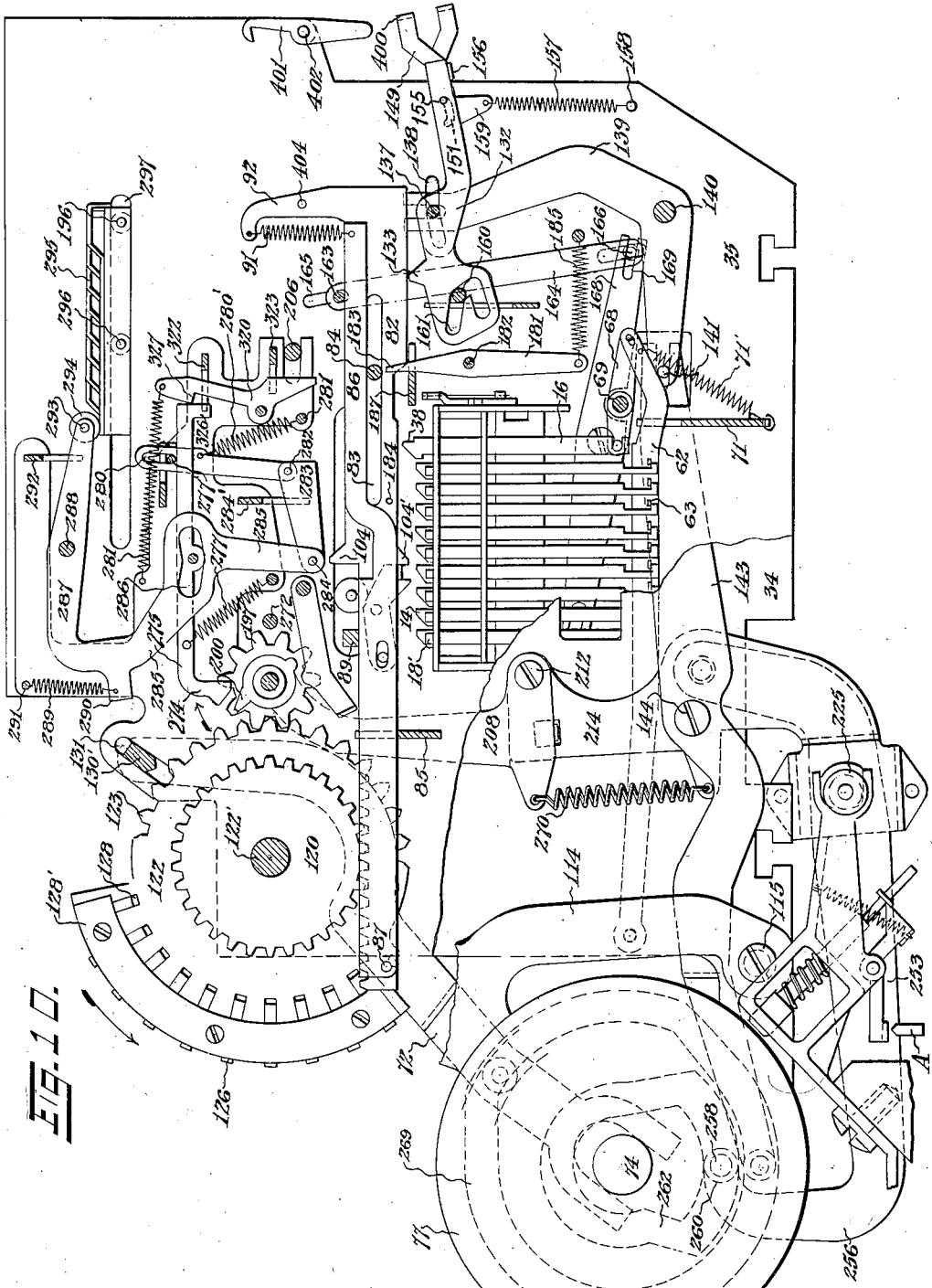

Sept. 8, 1931. W. W. LASKER 1,822,156
PRINTING TABULATOR
Original Filed March 28, 1917 23 Sheets-Sheet 8
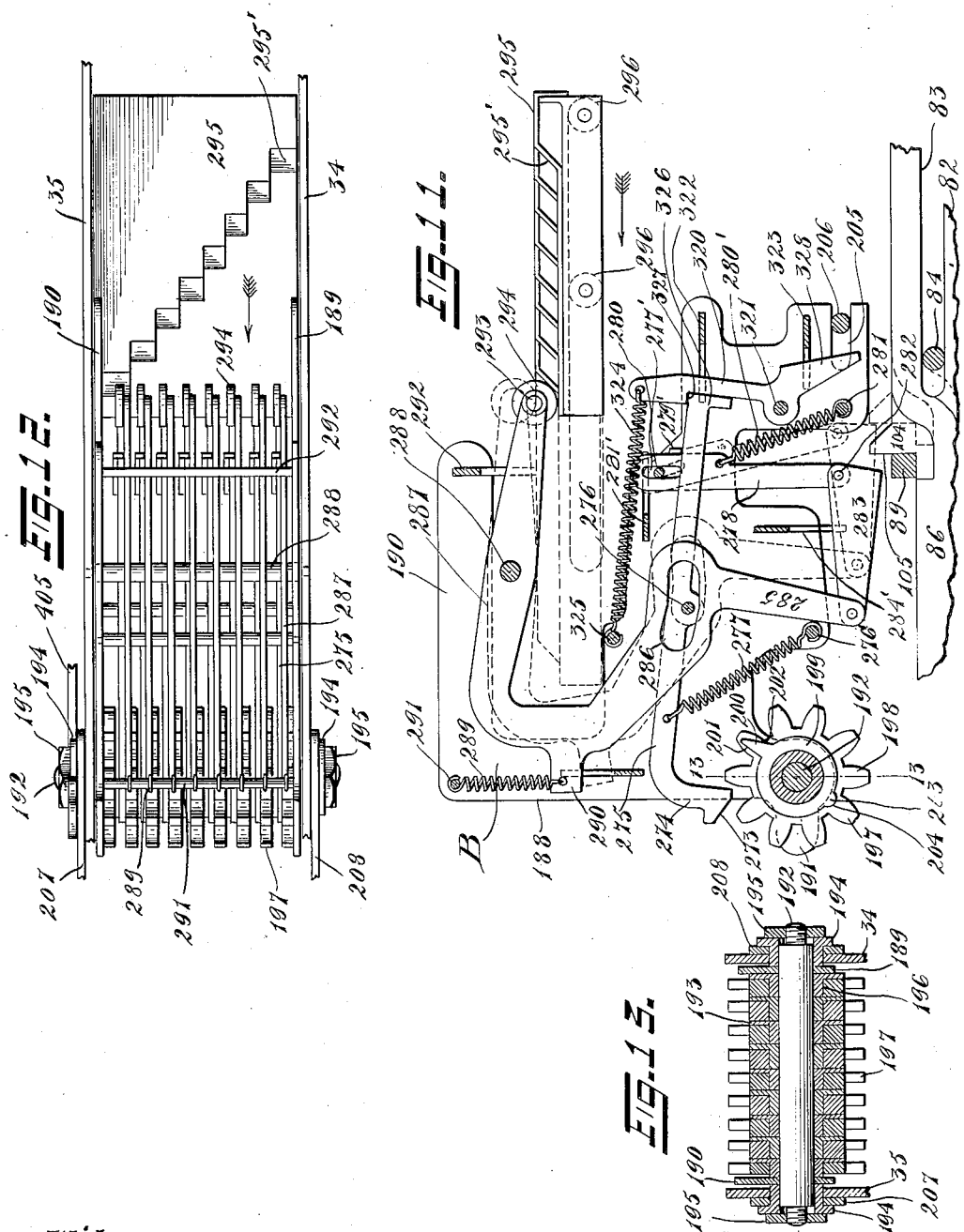
Witnesses:
Inventor:
William W. Lasker
By his Atty, Sept. 8, 1931.  W. W. LASKER  1,822,156
PRINTING TABULATOR
Original Filed March 28, 1917    23 Sheets-Sheet 9
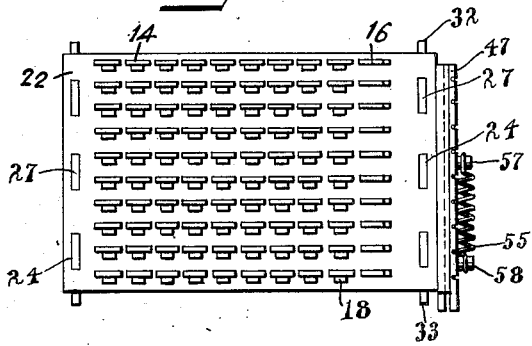
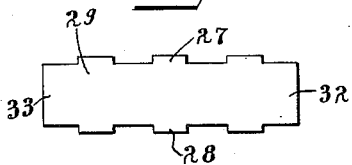
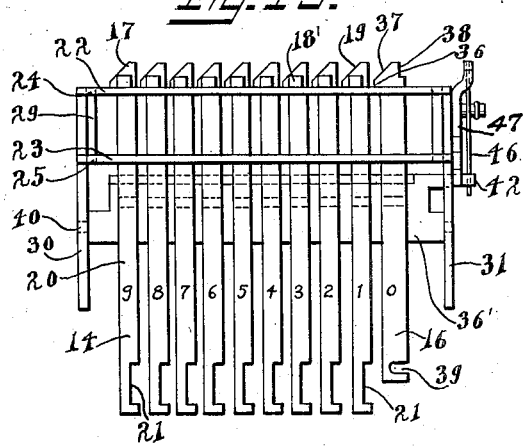
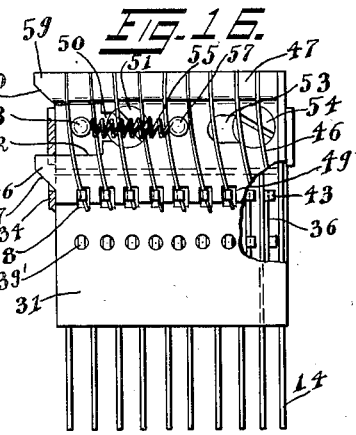
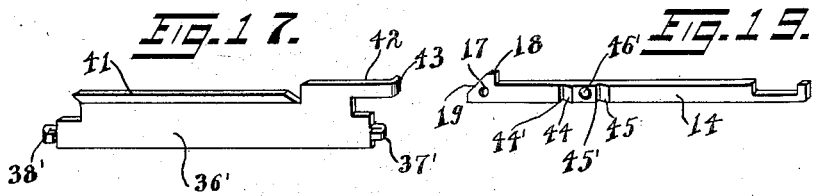
Witnesses:
Inventor:
William W. Lasker.
By his Att'y,

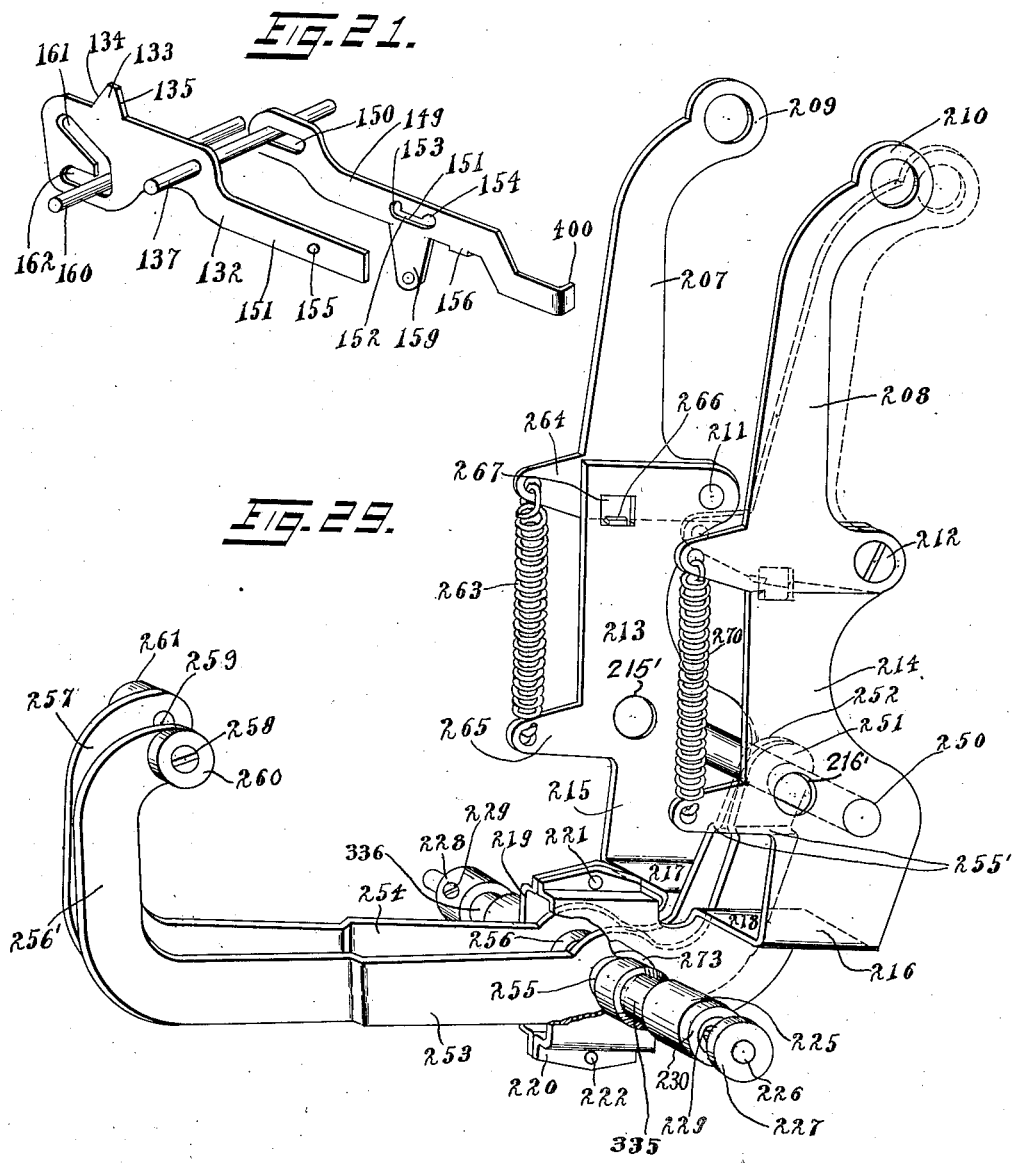

Sept. 8, 1931.   W. W. LASKER   1,822,156
PRINTING TABULATOR
Original Filed March 28, 1917   23 Sheets-Sheet 11
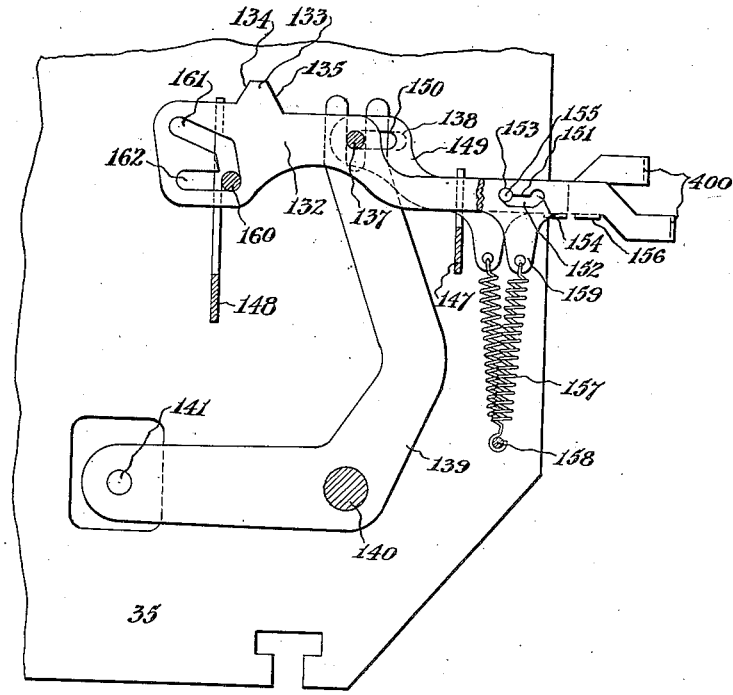
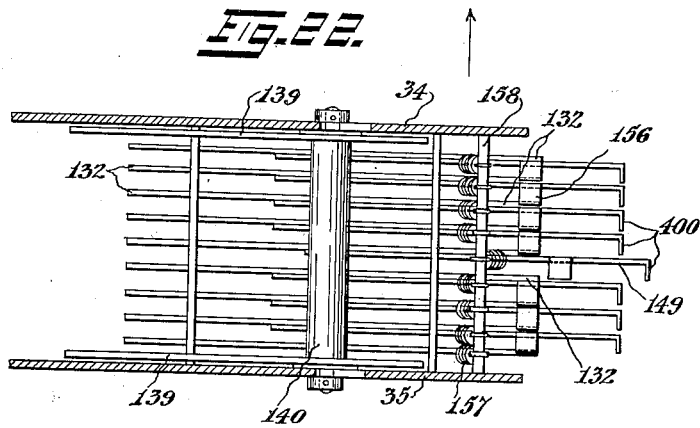

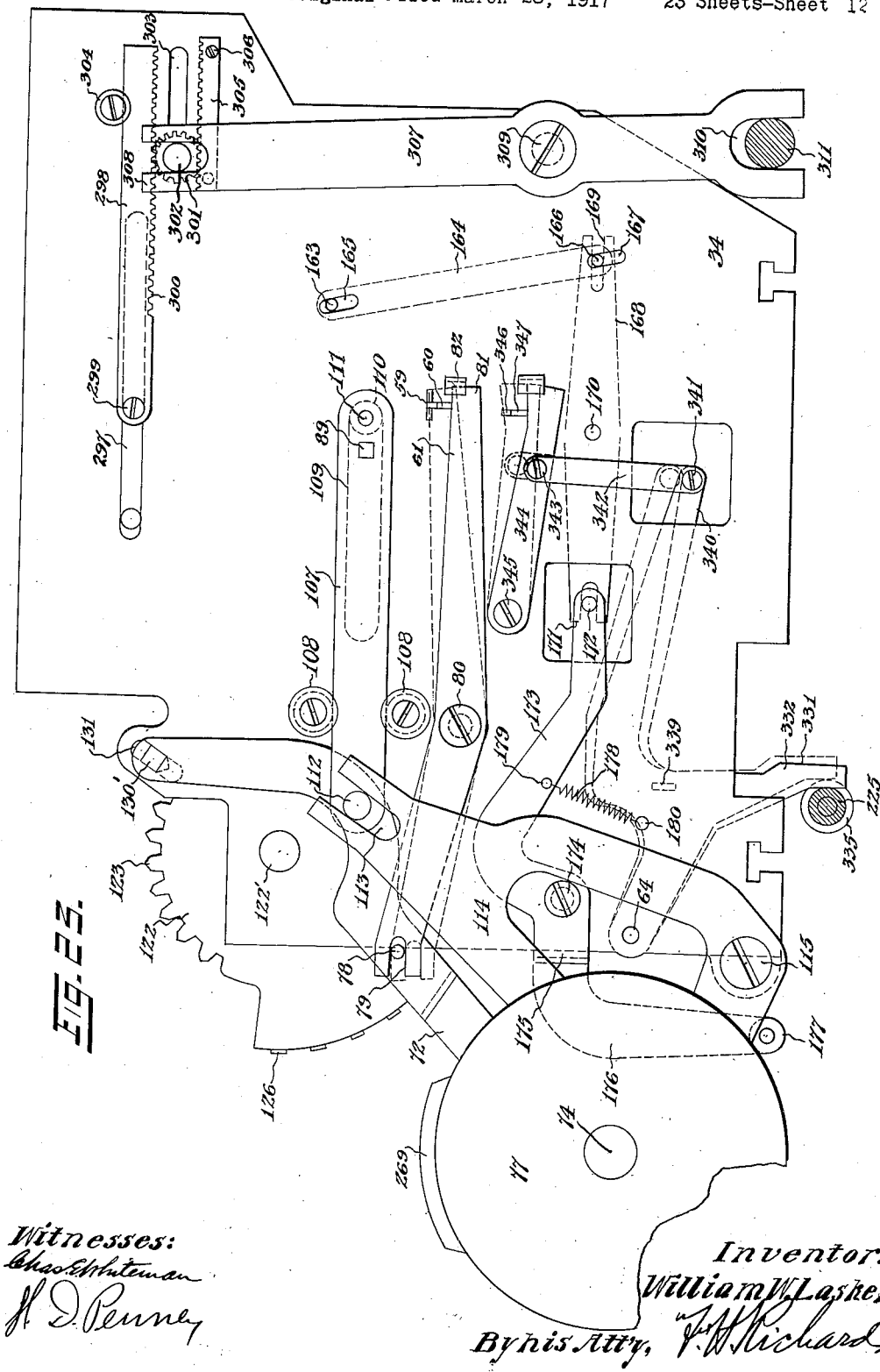

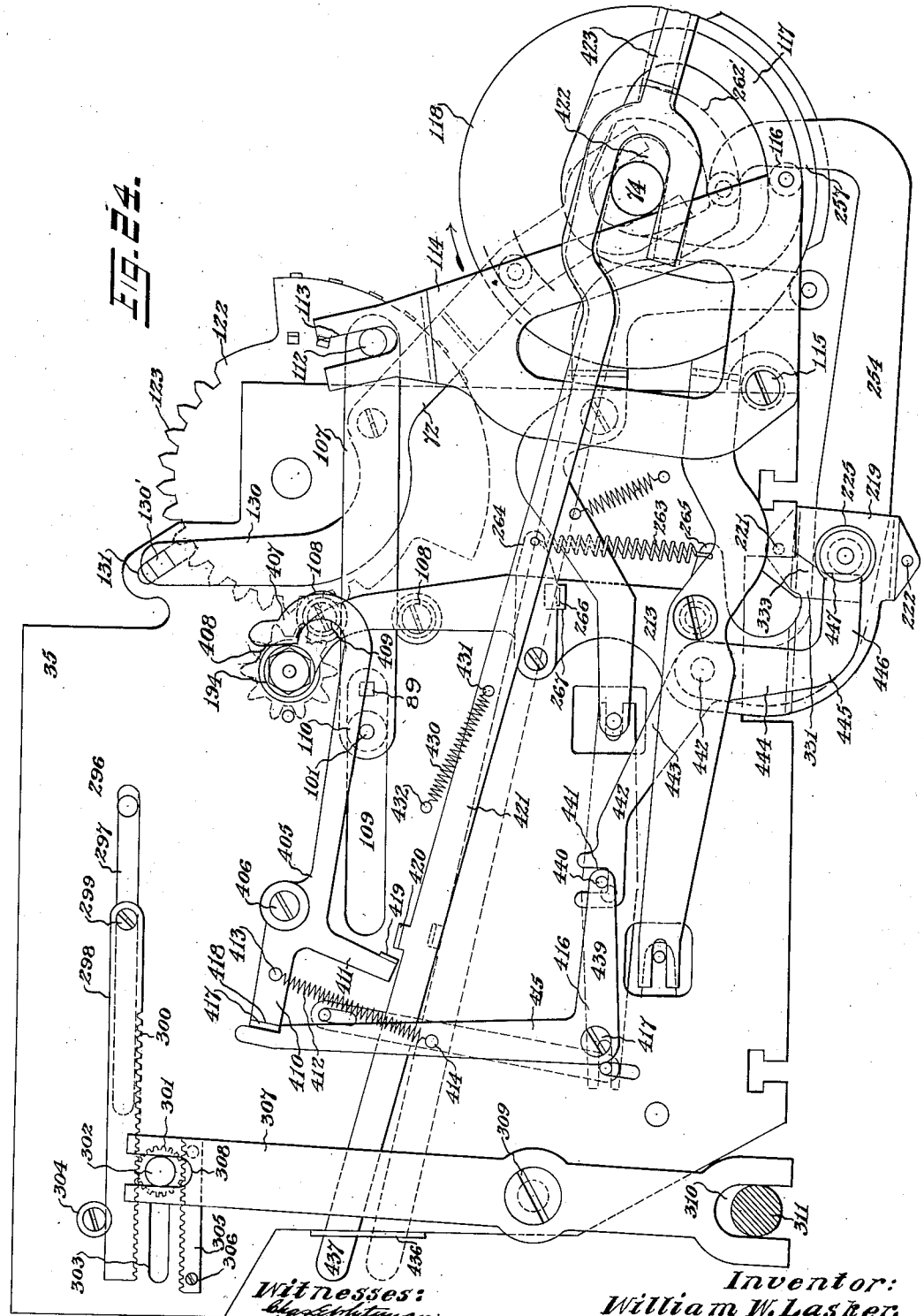

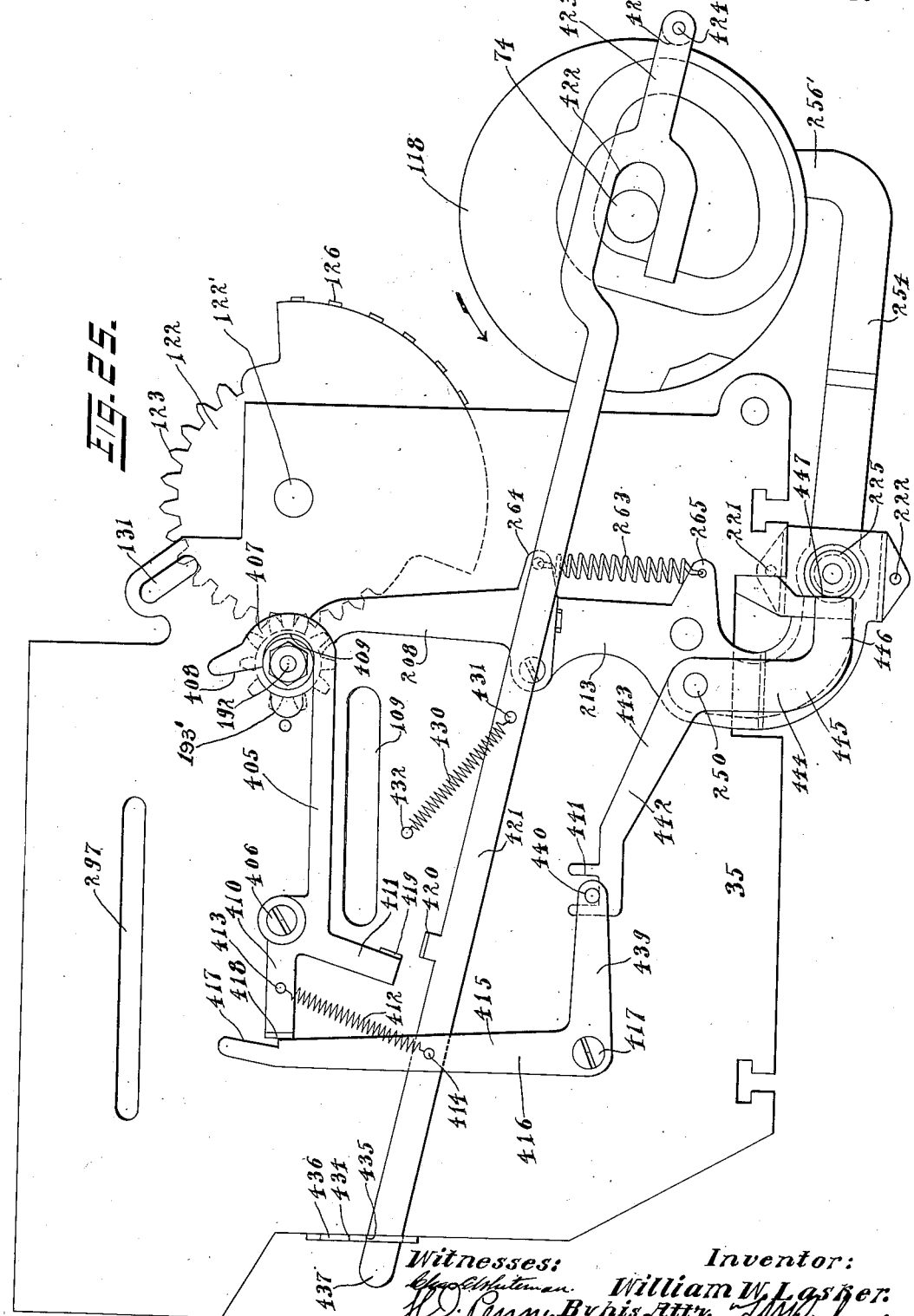

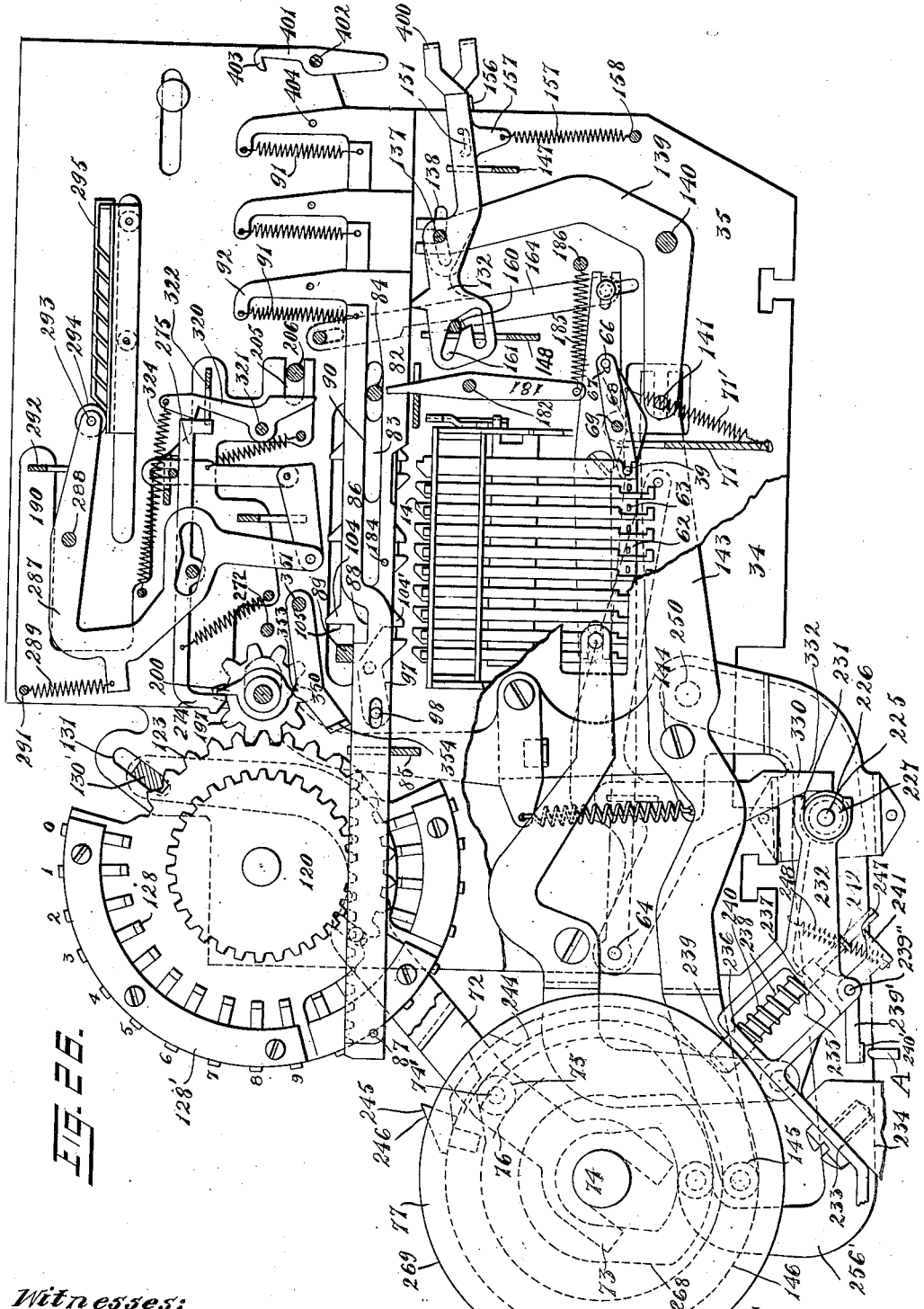

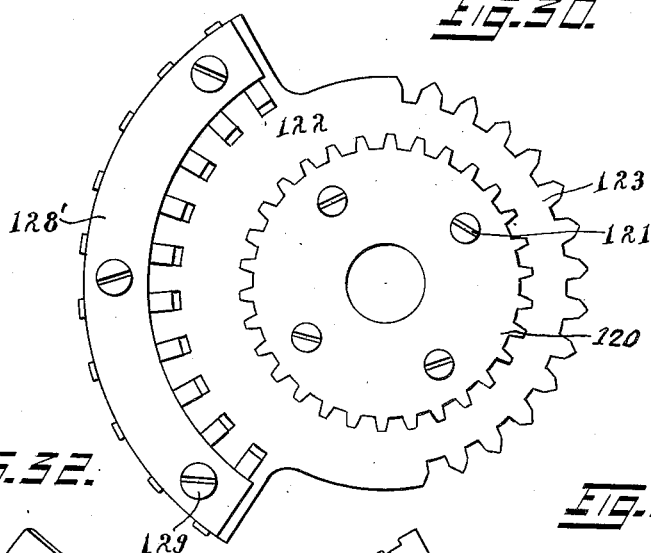
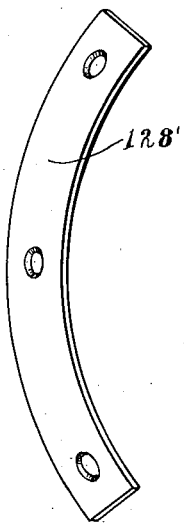
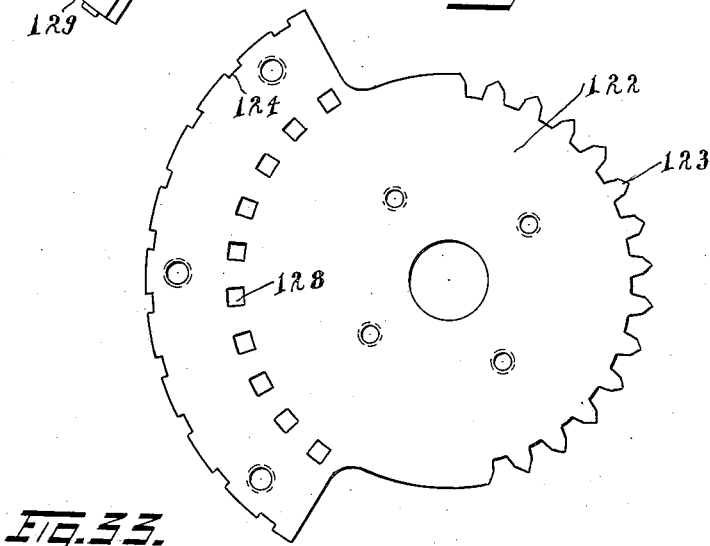
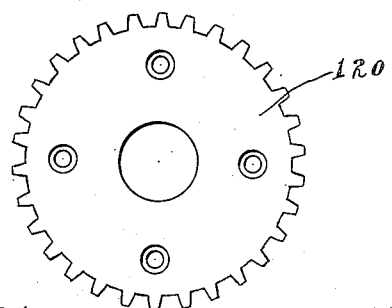
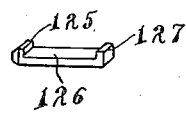

Sept. 8, 1931.     W. W. LASKER     1,822,156
PRINTING TABULATOR
Original Filed March 28, 1917     23 Sheets-Sheet 17

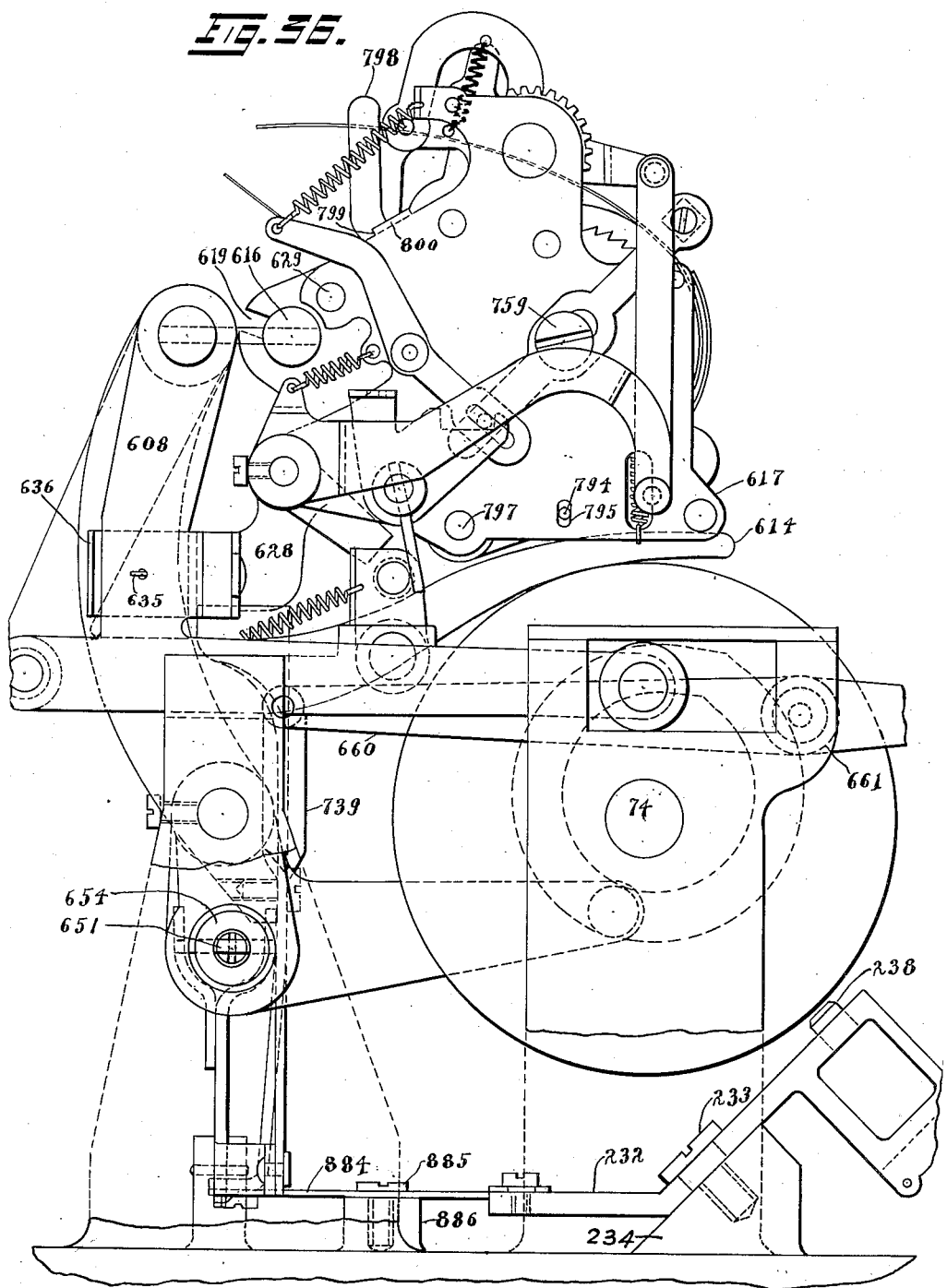

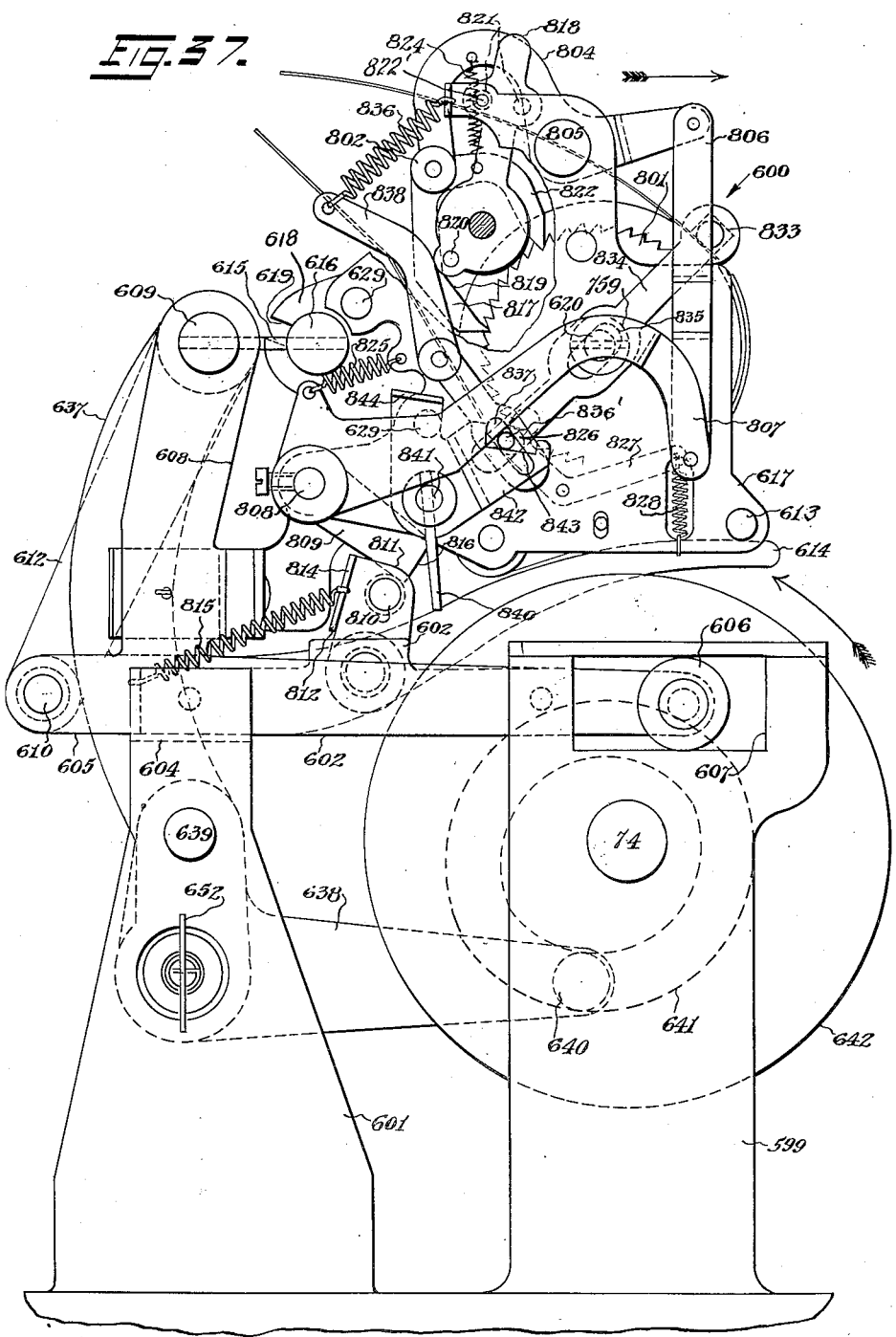

Sept. 8, 1931.　　　W. W. LASKER　　　1,822,156
PRINTING TABULATOR
Original Filed March 28, 1917　　23 Sheets-Sheet 20
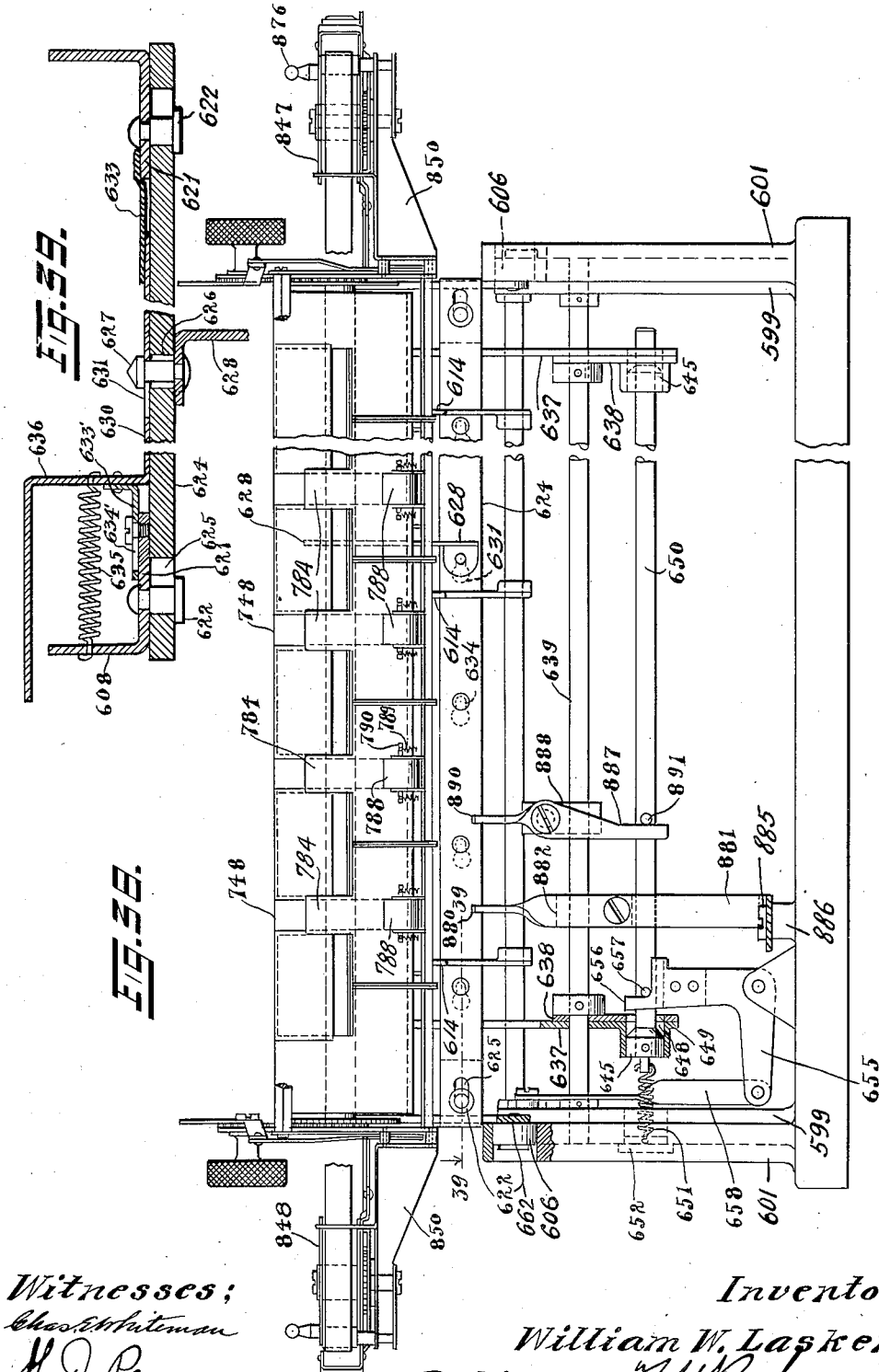
Witnesses:
Chas. F. Whiteman
H. D. Penney
Inventor.
William W. Lasker.
By his Atty, F. H. Richard, Sept. 8, 1931. W. W. LASKER 1,822,156
PRINTING TABULATOR
Original Filed March 28, 1917 23 Sheets-Sheet 21
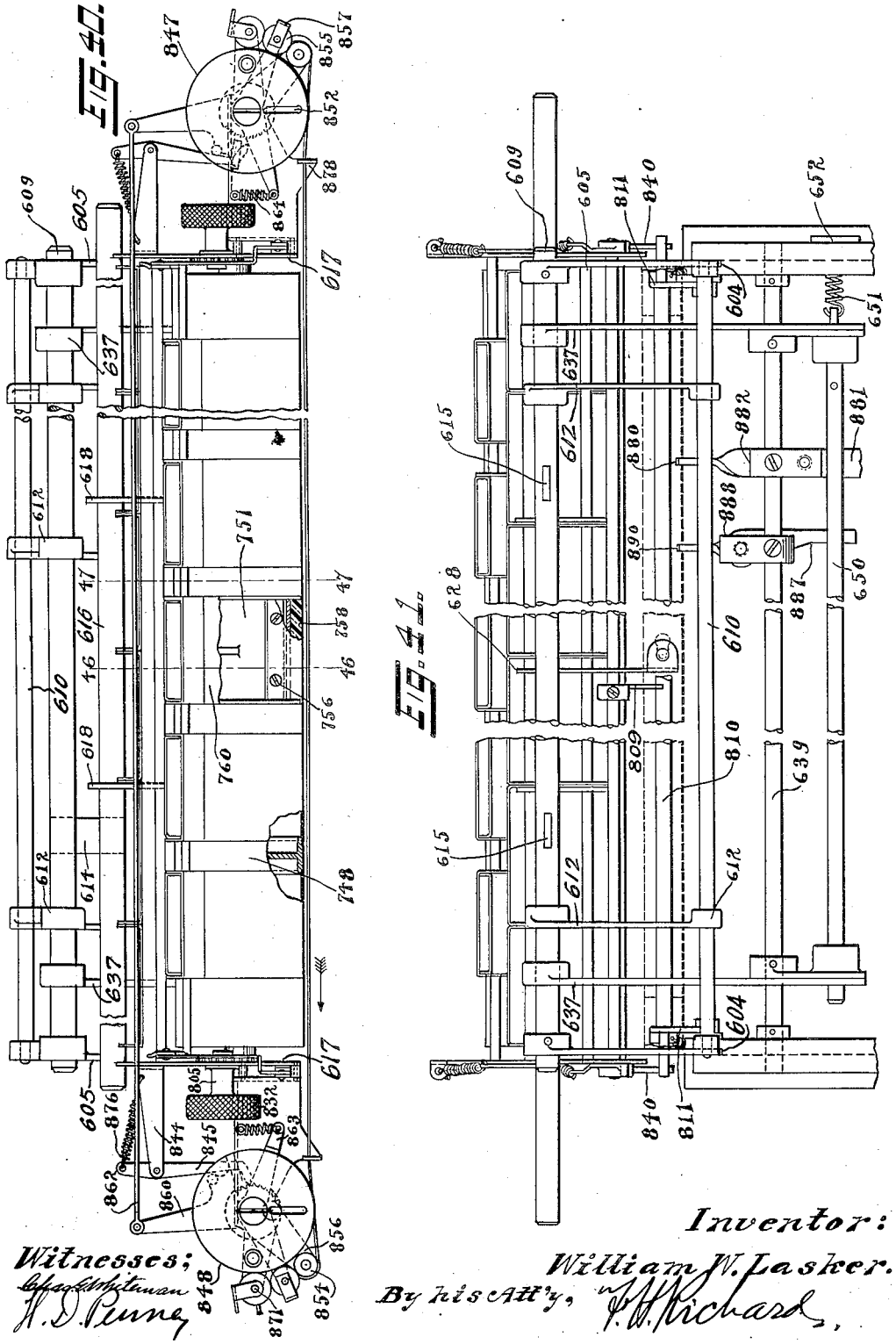
Witnesses;
Inventor:
William W. Lasker.
By his Att'y, Sept. 8, 1931. W. W. LASKER 1,822,156
PRINTING TABULATOR
Original Filed March 28, 1917 23 Sheets-Sheet 22
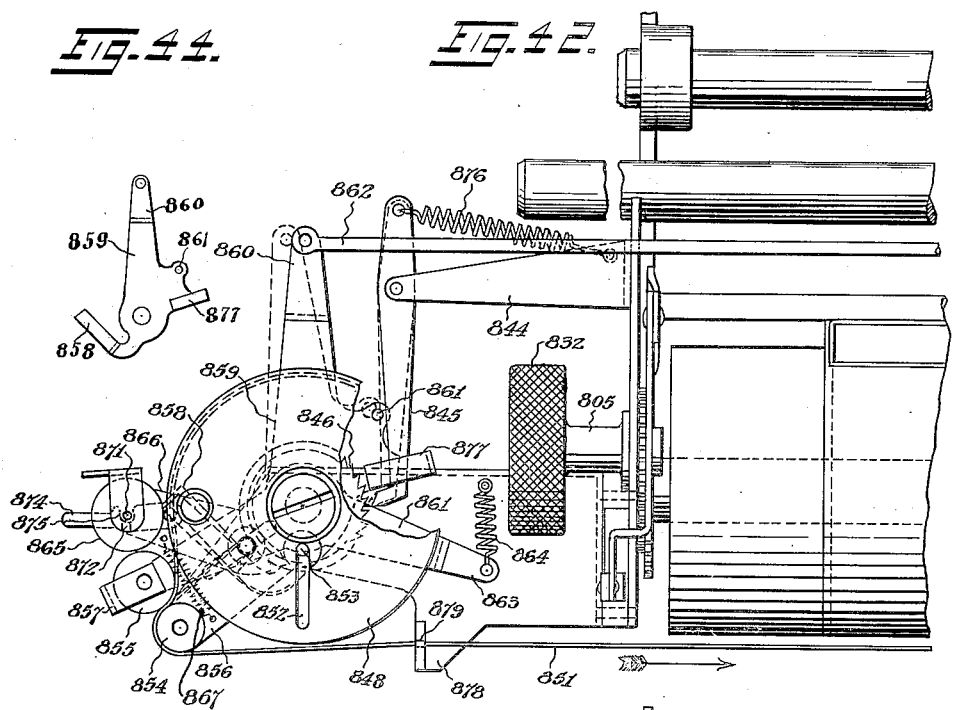
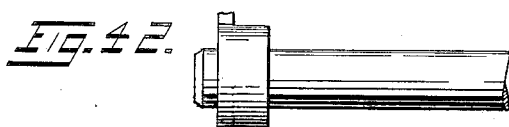
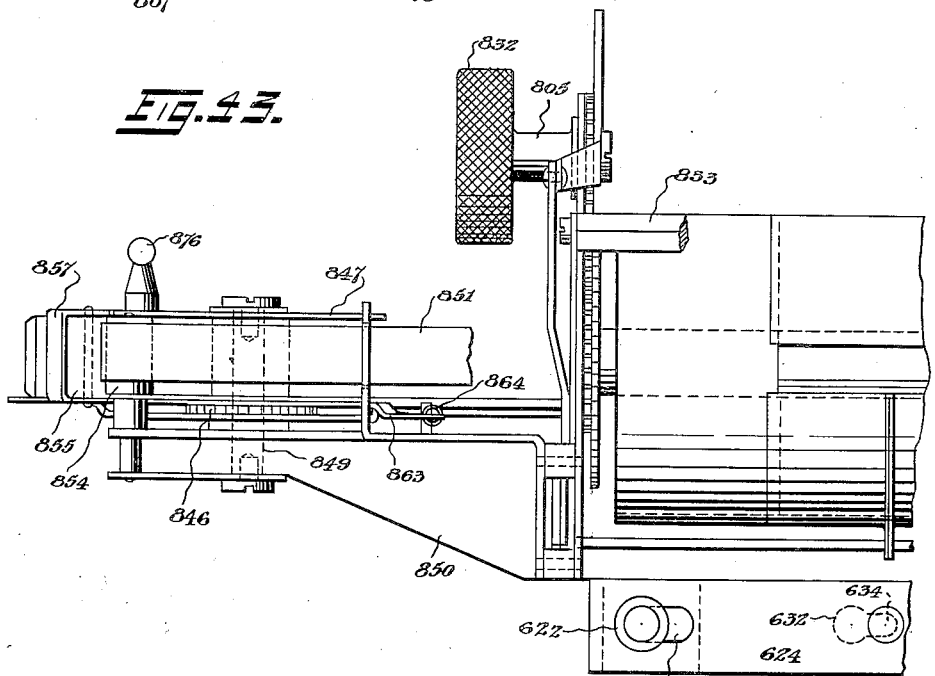
Witnesses:
Inventor:
William W. Lasker.
By his Att'y, Sept. 8, 1931.  W. W. LASKER  1,822,156
PRINTING TABULATOR
Original Filed March 28, 1917   23 Sheets-Sheet 23
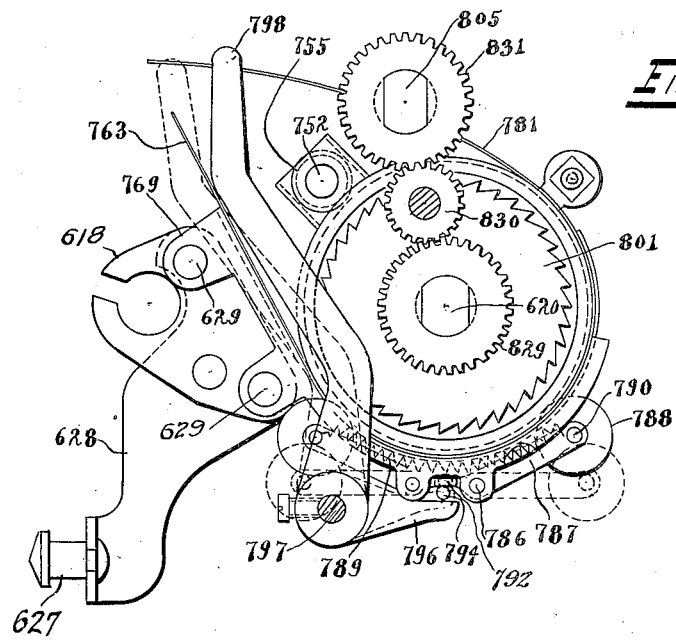
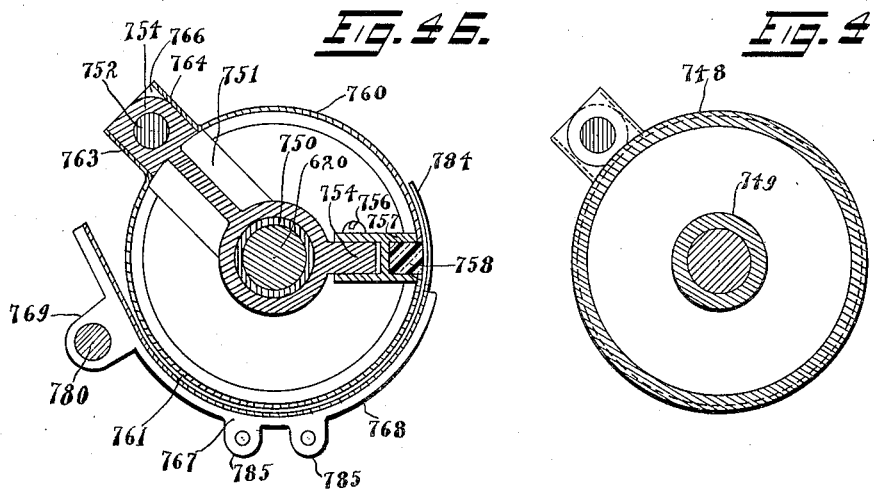

Patented Sept. 8, 1931

1,822,156

UNITED STATES PATENT OFFICE

WILLIAM W. LASKER, OF BROOKLYN, NEW YORK, ASSIGNOR, BY MESNE ASSIGNMENTS, TO REMINGTON RAND INC., OF NEW YORK, N. Y., A CORPORATION OF DELAWARE

PRINTING TABULATOR

Application filed March 28, 1917, Serial No. 158,142. Renewed February 27, 1924.

The object of this invention is to devise a printing tabulator actuated by perforated cards in which the printing elements and the tabulating elements are positively driven.

Another object of the present improvement is to construct a printing tabulator, the driving means of which comprises reciprocating rack bars that actuate the tabulating and printing elements.

A still further object of the present improvement is to devise a printing tabulator actuated by perforated cards, embodying as one of its elements, a non-print mechanism which is for the purpose of preventing ciphers from being printed to the left of the type, set up by the analyzed perforated cards passed through the machine.

A still further object of the present improvement is to devise a tabulator having as one of its elements a mechanism for rendering any one of the type segments and its associated tabulator element inoperative both for printing and tabulating.

A still further object of the present improvement is to devise a printing tabulator composed of a plurality of separate units or zones and having a mechanism through the medium of which any one of the zones may be divided, so that each zone may operate as a plurality of zones, each divided zone accumulating and printing data, separate and independent from the rest.

A still further object of the present improvement is to devise a printing tabulator having a reciprocating accumulating carriage and means for reciprocating this carriage by two different actions, one action controlling the carriage for accumulating and the other action controlling the carriage for taking a total.

A still further object of the present improvement is to construct a printing tabulator, embodying a novel form of shift mechanism whereby the accumulating and printing elements of the machine are shifted from accumulating position to total taking position and vice versa.

Still another object of the present improvement is to construct a printing tabulator having means arranged for locking out any one of the accumulating units so that the type segments associated therewith may set type for printing data, but will prevent the said data from being accumulated by the accumulating mechanism.

Still another object of the present improvement is to devise a printing tabulator having a novel form of printing segments.

Still another object of the present improvement is to construct a printing tabulator having an improved form of locking and alining mechanism for the type segments.

Still another object of the present improvement is to construct a printing tabulator having a novel form of "carry over mechanism" for the accumulating elements of the machine.

Still another object of the present improvement is to combine in a printing tabulator, a novel form of stop pin and naught stop construction whereby the naught stops are controlled by actuation of the stop pins.

A still further object of the present improvement is to construct a printing tabulator having type segments, accumulating elements associated with the type segments, rack bars for driving the type segments, driving means for the rack bars, and means for locking and releasing the driving means to and from the rack bars.

Another object of the invention is to provide an economical and efficient means for effecting the printing by the reciprocation of the paper carriage when the printing type have been set.

Another object is to provide convenient means for rendering the carriage reciprocating mechanism inoperative at will and for automatically rendering the reciprocating mechanism operative when totals are printed.

Another object is to provide convenient means for at will displacing the printing carriage laterally relative to the type so that substantially any part of the paper may be brought to the type.

Another object is to provide an efficient and convenient total signal means for indicating the fact that a figure is a total, this means operating by shifting the carriage to one side as the total is being printed, whereby the total is offset from the listed column.

Another object is to provide a new and improved method of mounting the paper supporting rolls.

Another object is to provide an economical and efficient platen for pressing the paper against the type.

Another object is to provide an improved method of feeding, supporting clamping and releasing the paper and of adjusting the amount of feed of the paper.

Another object is to provide efficient means for preventing over-throw of the feeding when the machine is running at high-speed.

Another object is to provide an improved means for supporting, feeding and reversing the inking ribbon, and an improved means for inking the ribbon.

Still further objects and advantages of the present improvement will be set forth in the following description and drawings in which, Fig. 1 is a side elevation of a printing tabulator constructed in accordance with my invention.

Fig. 2 is a side elevation of the printing and calculating mechanism constituting a part of the printing tabulator.

Fig. 3 is an interior side elevation partly in section of the type setting and calculating elements and showing the parts thereof in normal or initial position.

Fig. 4 is a top plan view of Fig. 3.

Fig. 5 is an end elevation of Fig. 3.

Fig. 6 is a fragmental side elevation partly in section of one of the reciprocating bars for actuating the type setting segments showing it in its forward movement.

Fig. 7 is a fragmental side elevation similar to Fig. 6 showing the bar at the end of its forward movement.

Fig. 8 is a detail perspective view of one of the bell crank controls for the reciprocating bars.

Fig. 9 is a fragmentary side elevation partly in section showing the non-printing actuating elements for the type setting segments.

Fig. 10 is an interior side elevation partly in section of the type setting and calculating elements and showing said elements after the completion of the printing action.

Fig. 11 is a detailed side elevation partly in section of the carry-over mechanism of the accumulator mechanism.

Fig. 12 is a top plan view of Fig. 11.

Fig. 13 is a vertical sectional view taken on the line 13—13 of Fig. 11.

Fig. 14 is a top plan view of the stop pin box.

Fig. 15 is a side elevation of Fig. 14.

Fig. 16 is an end elevation of Fig. 14.

Fig. 17 is a detailed perspective view of one of the shutters for retracting the stop pins.

Fig. 18 is a detailed side elevation of one of the supporting plates for attaching the stop pin box to the framework of the machine.

Fig. 19 is a detailed perspective view of one of the stop pins.

Fig. 20 is an enlarged detailed side elevation partly in section of the non-printing mechanism for controlling the type setting elements.

Fig. 21 is an enlarged detail perspective view of one of the kick back levers of the non-printing mechanism and showing the cipher cut-out levers moved apart from their operative position.

Fig. 22 is a bottom plan view of Fig. 20.

Fig. 23 is a side elevation of one side of the type setting and calculating mechanism showing the actuating levers for the type setting and calculating elements.

Fig. 24 is a side elevation of the opposite side of the machine from that shown in Fig. 23 and also showing the mechanism for holding one of the accumulator units in non-accumulating position.

Fig. 25 is a view similar to Fig. 24 and showing the parts in normal position.

Fig. 26 is an interior side elevation partly in section of the type setting and calculating elements and showing the same in total taking position.

Fig. 27 is a fragmental vertical sectional view taken on the line 27—27, Fig. 3.

Fig. 28 is a vertical sectional view taken on the line 27—27, Fig. 3 and showing the total taking shaft shifted into position to take a total.

Fig. 29 is an enlarged perspective view of the total taking shaft and the actuating arms for the accumulating mechanism.

Fig. 30 is a side elevation of one of the type segments, type, and an actuating gear for the segment.

Fig. 31 is a side elevation of one of the type segments.

Fig. 32 is a perspective view of one of the retaining plates for the type.

Fig. 33 is a side elevation of one of the driving gears for the type segments.

Fig. 34 is a perspective view of one of the type.

Fig. 36 is an end elevation of the printing carriage showing one position of the parts.

Fig. 37 is a similar view, parts being broken away showing a different position of the parts.

Fig. 38 is a front elevation of the carriage.

Fig. 39 is a sectional view of the detail taken on the lines 39—39 of Fig. 38.

Fig. 40 is a plan of the carriage.

Fig. 41 is a rear-elevation of the same.

Figs. 42 and 43 are an enlarged plan and front elevation respectively of the ribbon feed mechanism of the printing carriage.

Fig. 44 is a plan of the reversing bracket of the ribbon feed.

Fig. 45 is a fragmental end elevation showing parts of the paper feeding mechanism and the release of the same.

Figure 1:
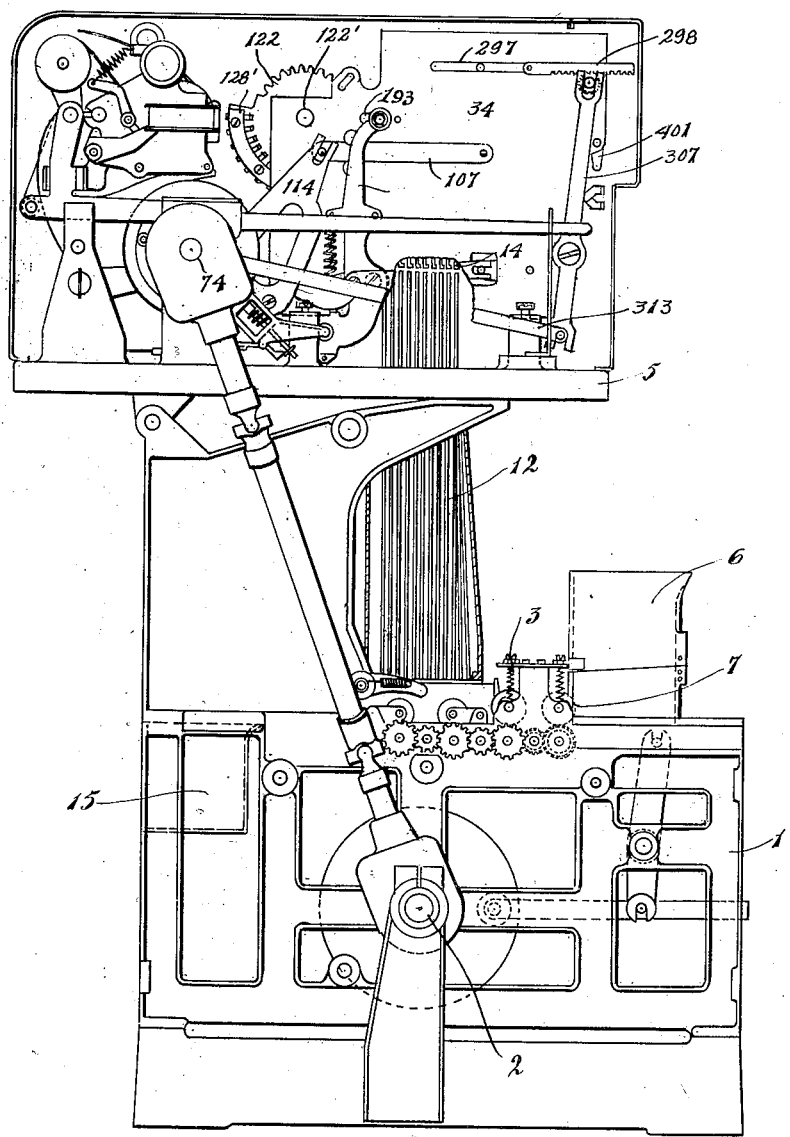

Figs. 46 and 47 show sections taken respectively on lines 46—46 and 47—47 of Fig. 40.

Fig. 48 is a face view of the print and non-print laying plate.

In the present specification the left hand end of the machine as shown in Fig. 3 is considered as the forward end of the machine.

The invention herein relates to a printing tabulator which is adapted to be actuated by perforated cards, which in their passage through the machine operate elements for setting up type commensurate with the designations on the card and actuate an accumulating mechanism for accumulating therein the data recorded on the card perforations whereby the total accumulated data may be computed and then printed by the printing elements of the machine.

The embodiment illustrated comprises a lower frame 1 in which the main driving shaft 2 is mounted, the card feeding mechanism 3, and the card analyzing mechanism 4 (see Figs. 1 and 35); and an upper frame 5, in which the accumulating and printing mechanism hereinafter to be described are mounted.

The cards to be analyzed are disposed in the receptacle 6 and are fed by a card picker mounted at the bottom of such receptacle 6 to the feed rollers 7, from which the card is fed between the die plate 8 (see Fig. 35) and guide plate 9 in which position the several designations on the card register with the pins 10 of the vertical reciprocable pin box 11, which pin box is raised after a card is positioned between such plates 8 and 9 and the pins 10 which find perforations in the card being analyzed pass upward therethrough and engage extension pins 12 which, in turn, will actuate the registering stops 14. After the card has been so analyzed by the pins 10 it will be discharged into the receptacle 15. (Fig. 1).

The operating elements for both setting the type and operating the tabulating mechanism are all shown in their normal position in Fig. 3, before any of the stop pins have been set and before the operation of the machine has started.

The first step in the operation of the type setting and tabulating mechanism, consists in the pushing up of the various stop pins 14 by means of the push rods 12, which are actuated under control of the various perforations in the cards as they pass through the machine. A specific description of the stop pins, their supporting means, and the means for returning them to normal position after they have set in motion various other parts of the type setting and tabulating mechanism will now be described.

The registering stops 14 correspond in number to the pins 10 except that there are no extension pins 12 or registering stops 14 to correspond with the pins 10 that analyze the zero perforations in the cards. The registering stops 14 have a zero stop 16 associated therewith, which is normally in zero stopping position and will remain so unless one of the registering stops 1 to 9 inclusive is actuated and therefore it is unnecessary for a zero pin 10 to actuate or cooperate with a registering stop 14.

The registering stops 14 in the present instance are arranged in nine rows having ten stops in each row (see Fig. 14), the stops of each row corresponding to the integers 9 to 1 inclusive and zero, the stop 9 being at the forward end of the machine and the zero stop at the rear end thereof. The stops 14 corresponding to the integers 1 to 9 inclusive are each composed (see Figs. 15 and 19) of a flat body portion comprising a head 17 having a forwardly projecting portion 18, a cam face 19 facing forward directly above said projection 18, a small rectangular shaped abutment 18' riveted on one side of the pin and adjacent its upper end, an elongated body portion 20, and a lower restoring notch 21 on the rear edge thereof. The stops 14 have their projections 18 normally resting on an upper stop plate 22 and extending down through a lower stop plate 23. The stop plates 22 and 23 have openings therein corresponding in number to the stops 14 and zero stop 16 in registry with each other whereby the pins may reciprocate through them. The stop plates 22 and 23, as is clearly shown in Figs. 14, 15 and 16 are provided with slots 24 and 25 at either end to receive the projections 27 and 28 of the narrow cross plates 29 (Fig. 18). The plates 29 are secured to side plates 30 and 31 and have their ends projecting beyond the lateral sides of said plates 30 and 31, and by means of projecting ends 32 and 33, which extend through the main cheek plates 34 and 35 of the frame work of the machine, such narrow plates 29 are fixed to the cheek plates 34 and 35.

The zero stops 16 are formed somewhat similar to the stops 14 and have a forward projection 36 at their upper end and a cam face 37 on the forward edge extending upward from the extension 36 and a recess 38 in its rear edge. The stops 16 have a recess 39 in their lower ends somewhat elongated as compared with the recesses 21 of the stops 14, and for this reason mainly the stops 16 are formed of broader stock than the stops 14. Since the spacing of the rear edges of the stops of a single row must be equal to one another it is therefore necessary to form the recess 38 in the zero stops 16.

Means are provided for anchoring the various registering stops 14 that are actuated by the extension pins 12 and also holding the zero stops 16 in position for causing an actuation of the corresponding type setting and tabulating elements. This anchoring means comprises shutters 36' (see Fig. 17) which have pivot lugs 37' and 38' formed on their end edges which extend through openings 39' and 40, Figs. 15 and 16, of the side plates 30 and 31 respectively. By means of these pivot lugs 37' and 38' the shutters 36' are adapted to rock relative to the side plates 30 and 31. The upper edge of the shutters 36' has an inclined edge 41 as is illustrated in Fig. 17, and a forwardly extending arm 42 that is turned at its extreme end to form a stop 43. All of the inclined edges 41 of the shutters 36' are inclined in the same direction and all of the stops 43 of the shutters 36 also extend in the same direction. Each of the shutters 36' is disposed alongside of one row of stop pins 14 with its inclined edge 41 extending toward the adjacent row of stop pins and adapted to be engaged thereby. In order that the stop pins 14 and zero stops 16 may engage the inclined edges 41 of the shutters 36' they are provided with two notches 44 and 45, as is clearly shown in Fig. 19, the upper edges of which are formed with a shoulder 44' and 45' respectively so that when the inclined edge 41 engages such notches 44 and 45, the stops 14 will be supported on such inclined edge 41. The lower edges of such notches 44 and 45 are inclined to form cam faces over which the edge 41 of the shutter 36' can ride with facility when the said registry stops 14 are raised. Attention is called to the fact that a rounded abutment 46' is formed on each of the stops 14 between the notches 44 and 45. As one of the registry stops 14 is raised the edge 41 of the shutter will engage the abutment 46' and will be forced outwardly sufficient to put the springs (hereafter to be described) which actuate the shutter 36' under sufficient tension to cause the said shutter to forcibly spring within the notch 44 when it has cleared the said abutment 46', and at the same time move the shutters a sufficient distance to release the zero stops 16. For the purpose of the present operation it is only necessary that the upper notches 44 have a lower inclined cam face. When the stops 14 are in their normal depressed position, the edge 41 of the shutter engages the upper notches 44, and whenever a stop 14 is raised, the lower cam face of the notch 44, of such actuated stop 14 will engage the edge 41 of the shutter 36' and thrust it to one side for engagement with the abutment 45' which will engage the said edge 41 as the stop pin 14 is raised further, permitting the said edge 41 to engage and snap into the lower notch 45 as the stop pin reaches the limit of its upward movement and at the same time release the zero stops 16. The edge 41 upon lodging within the lower notch 45 will maintain the stop 14 in a raised position. For normally and resiliently maintaining the said shutters in engagement with the stops 14 the springs 46 are provided which are secured to the upper edge of a reciprocating plate 47 and extend downward into engagement with the extensions 43 as shown in Fig. 16, said springs 46 exercising a lateral pressure on the shutters 36' to press them into engagement with the stop pins 14. As is shown in Figs. 15 and 16, the rear side plate 31 is provided with openings 48, above the openings 39', through which the said extensions 42 of the shutters 36' pass. The extensions 42 also pass through recesses 49 formed at the lower edge of the reciprocatable plate 47, such extensions 42 being normally pressed against one side of such recesses 49 by means of the springs 46. The reciprocating plate 47 is provided with a recess 50 through which extends a screw 51, and an opening 52 enlarged at one end (as shown in Fig. 16), and also a narrow elongated slot 53 at its other end through which extends a screw 54. The recess 50 and elongated slot 53 are in alinement with each other to permit the actuation of the plate 47 relative to the screws 51 and 54. For normally maintaining the plate 47 with the inner end of the recess 50 against the screw 51 and the inner end of the elongated portion 53 against the screw 54, a coil spring 55 is provided which connects a stud 57 on the reciprocating plate 47 with a stud 58 formed on the side plate 31. The plate 47 is also provided with an extension 59 which extends over the cheek plate 34 and has a lower cam face 60 for engagement by the shutter release arm 61 (Fig. 23). Under normal conditions plate 47 is held by spring 55 so that the edges of openings 48 and 49 coincide, but when plate 47 is moved to the right as viewed in Fig. 16, the shutters 36' will be rocked so that edges 41 will clear the notches in stops 14 and permit any stops 14 that have been raised to drop back to their lower position.

The zero stops 16 are normally disposed in raised position and whenever a stop 14 is actuated to the raised position by means of the plungers 12, simultaneously therewith the zero stop 16 in that row will be lowered. In order to accomplish this result an elongated lever 62 (Fig. 3) is provided for each row of stops 14, which lever is provided with nine lugs 63 arranged in a straight line and all extending in the same direction, each lug 63 also extending into one of the recesses 21 of a stop pin 14. The front ends of the levers 62 are pivoted on a shaft 64 which is supported within the cheek plates 34 and 35. The rear ends of the levers 62 are provided with lugs 66 which are slidably and pivotally mounted in slots 67 at the rear ends of the links 68, which links are pivoted on a shaft 69 supported by the cheek plates 34 and 35 adjacent to the lower end of the side plate 31. The front end of each of the links 68 is provided with a lug 70 which is arranged to slide within a recess 39 formed in the rear edge of a zero stop 16.

Supported by the cheek plates 34 and 35 is a comb plate 71 the upper end of which is slotted to permit the lever 62 to extend therethrough and be guided thereby. A coil spring 71' is stretched between the lever 62 and the lower edge of the said plate 71 for the purpose of normally holding the naught stops 16 in its raised position shown in Fig. 3. Attention is called to the fact that when one of the stops 14 is raised, the actuation of the lever 62 by means of the cooperation of the slot 21, carried by the stop, with the lug 63, carried by the lever, will cause the link 68 to be actuated which will in turn lower the stop 16 of the row in which the stop pin 14 has been raised.

As has been heretofore described the first action that takes place when the machine is started, is the raising of the various stop pins 14 by the actuation of the plungers 12 which are in turn controlled by the perforations in the cards passed through the machine. After a card has transferred its data to the pins 14 by raising them, and has passed from the machine, means is provided for returning the pins 14 to their normal lower position for actuation by the next incoming card. This means for returning the stop pins to their normal position will now be described in detail.

A lever 72 (Fig. 3) is provided having a bifurcated lower end 73 which straddles the main drive shaft 74 which provides the driving means for the entire type setting and calculating mechanism. This lever 72 is provided with a pin upon which is rotatably mounted a roller 75 which is arranged to roll within a cam slot 76 of a cam 269. A pin 78 (see Fig. 23) is rigidly fastened on one side of the lever 72, which is arranged to slide within a slot 79 formed in one end of the bell crank 61 which is pivoted at 80 to the cheek plate 34. The other end 81 of the lever 61 reciprocates in a guideway 82 formed on the cheek plate 34, and is arranged to come in contact with the cam face 60 of the projecting lug 59 of the reciprocatable plate 47. Let us suppose for instance, that one of the stop pins 14 has been raised by means of one of the plungers 12 and in the sequence of operation of the machine it is desired to restore this stop pin to its normal position. The lever 72, through the medium of the roller 75 and cam slot 76, is oscillated which oscillation through the medium of the pin 79, will lift the lever 61 so that its end 81 will contact with the cam face 60 of the plate 47 and force it against the tension of the springs 46. The reciprocation of the plate 47 rocks the shutters 36' through the medium of the extensions 42 and slots 49. The rocking of a shutter 36' disengages the inclined upper edge 41 thereof from engagement with the notch 45 of the stop pins. As soon as the pins 14 are freed, the lever 62 will be pulled down by means of the coil spring 71', and in its downward movement the lugs 63 carried thereby will engage the shoulders formed by the slots 21 of the stop pins 14 and pull them downward to their normal lowered position.

The naught stop pins 16 are arranged to normally retain or hold back reciprocating members, which during their reciprocation actuate type setting elements. As heretofore described, the raising of a stop pin will lower the naught stop so that upon the actuation of a stop pin, the reciprocating member associated therewith will be released and be permitted to run forward until it engages a raised stop pin 14. During their forward movement the reciprocating members actuate the type setting elements and upon being stopped by the raised stop pins will hold the type setting elements in a position to print from type corresponding with the number of the raised stop pins. A detailed description of the reciprocating members and their connection and cooperation with the naught stops, stop pins and type setting elements will now be described.

The reciprocating members each comprise a relatively thin bar 82 (see Figs. 6, 7 and 9) which is provided with a longitudinal slot 83 that is adapted to slide along a transverse support 84, secured to the cheek plates 34 and 35. A transverse support 85 is also provided which serves as a support for the forward ends of the bars 82. The support 85 is rigidly fastened to the cheek plates 34 and 35. A second relatively thin bar engaging or abutment lever 86 is pivoted at its front end to a pivot 87 carried by the front end of the bar 82. The upper edge of the bar 86 is provided with a recess 88 to receive a bar 89 which is reciprocated by means hereinafter to be described, and which during its reciprocation will move both the bar 82 and the bar 86 connected thereto. The bar 86 is provided with a narrowed portion 90 so as to lessen the width of the said bar to enable it to slide above the shaft 84 and at the same time permit the outer ends of the bars 82 and 86 to remain parallel with each other. A spring 91 is stretched between the free end of the bar 86 and a vertically extending arm 92 which is made integral with the rear end of the bar 82. The free end of the bar 86 is provided with an off-set portion 93 which is adapted to extend through a slot 94 in the upper edge of the bar 82 so that the extreme end 95 of the bar 86 may engage the bar 82 on its opposite side. Due to this arrangement the two bars 82 and 86 are always held together and as the bar 86 swings on its pivot 87 the end 95 of the bar 86 will engage and slide up and down against the vertically extending arm 92 carried by the bar 82. A horizontally extending pin 96 is carried by the side face of the bar 82 which is adjacent to the bar 86 upon which is pivotally mounted a bell crank lever 97, the forward end of which is provided with a horizontally extending pin 98 which is movable in a slot 99 made in the bar 86. The other end of the lever 97 is provided with a lug 100 having a cam front face 101 and a right angular notch 102, in its rear edge. The portion of lever 97 corresponding to the notch 102 is bent out at right angles to the lever 97 forming a rest 103 (Fig. 8). The upper edge of the bar 82 is provided with an upstanding abutment 104 having a vertical front wall 105 and an inclined or cam rear wall 106, the purpose of which inclined wall will be hereinafter set forth. The bottom edge of the bar 82 is provided with an abutment 104′ similar but smaller than the abutment 104 carried by its upper edge. This abutment 104′ is provided with a vertical front wall 105′ directly beneath and in the same plane with the vertical wall 105 of the abutment 104. The abutment 104′ is also provided with an inclined or cam rear wall 106′, the purpose of which will be hereinafter set forth.

The bar 89, which as heretobefore described, is for the purpose of reciprocating the bars 82 and 86 is itself reciprocated in the following manner, reference especially being made to Fig. 23. The bar 89 which is rectangular in cross section is rigidly connected at each end to a slide 107, which is movable between rollers 108 which form guideways for this slide. A slot 109 is made in each cheek plate 34 and 35 which receives a roller 110 revolubly mounted on the shaft 111 secured to the rear end of the said slide 107. The front ends of the slides 107 (Figs. 23 and 24) are provided with horizontally extending pins 112, which are reciprocatably mounted in slots 113 formed in the upper ends of levers 114, the lower portions of which are triangularly shaped, one corner being pivoted to stud shafts 115 carried by each cheek plate 34 and 35. The other corners of the triangular shaped levers 114 carry rollers 116 which are arranged to roll within cam grooves 117 made in the cams 118 and 269 (Fig. 24). Returning now to the reciprocating bars 82, the top edge of the forward portions of the said bars 82 are provided with gear teeth 119 which are in mesh with gears 120 (Figs. 7, 30, 31, and 33) secured by means of screws 121 to type segments 122, which have bearings in a transverse shaft 122′ carried between the cheek plates 34 and 35, which segments have an arc shaped rear edge provided with gear teeth 123 which will hereinafter be described. The front edges of the segments 122 are also made arc shaped and are provided with ten rectangular notches 124 to receive the upturned ends 125 of type 126. The rear ends of the type are also provided with an upstanding portion 127 which is arranged to fit within rectangular openings 128 diametrically back of the rectangular notches 124. A flat arch shaped plate 128′ is arranged to fit against the type 126 and to hold their upturned portion 125 and 127 in engagement with the notches 124 and openings 128 respectively. The plates 128′ are secured to the segment by means of bolts 129. Reading from the upper edge of the type carrying portion of the segment, the type carried thereby read in sequence, the first type being zero, the next "1" the next "2" etc., the last type on the segment being numbered "9".

A description of the operation of the stop pins, the reciprocating bars and the oscillating type segments will now be given. In the position shown in Fig. 3 all the parts are at rest and as before described all of the stop pins 14 are down and all of the naught stops 16 are in raised position. When in their raised position the vertical walls 105′ of the abutments 104′ fit within the notches 38 in the upper end of the stop pins 16, and consequently hold the bars 82 and their associated bars 86 in their extreme rearward position, and also retain all of the type segments in a position to print ciphers. Although each spring 91 is exerting tension to lift the bar 86 nevertheless this bar is held to the limit of its downward movement due to the fact that the rest 103 carried by one end of the bell crank lever 97 is resting on top of the naught stop 16 which holds the said bell crank 97 at the limit of its downward movement by means of the pin 98 carried by the member 82 and the slot 99 in the bar 86. As soon as any of the stop pins 14 are raised by means of the plungers 12, actuated upon a card passing through the machine the naught stop 16 in that row is lowered simultaneously, (as has been heretobefore described). The downward movement of the stop pin 16 frees the abutment 104′ permitting the bar 82 to be carried forward. Simultaneously with the disengagement of the abutment 104′ and the stop pin 16, the lever 86 is raised by means of the spring 91 which in its upward movement moves the notch 88 to fit against the front side of the reciprocating bar 89. Attention is called to the fact that when the parts are in their normal position, the bar 89 is at the limit of its rearward movement and rests against the vertical wall 105 of the abutment 104. As soon as the notch 88 engages the reciprocating bar 89, the said bar is locked between it and the vertical wall 105 of the upstanding abutment 104 so that when the said bar 89 is reciprocated by means of the lever 114 and its associated parts, heretofore described, the bars 82 and 86 will also be moved. The reciprocating bar 89 is shown in its locked position in Fig. 6. Simultaneous with the upward movement of the bar 86 the bell crank 97 is moved down to the position shown in Fig. 6. As the bar 89 is reciprocated by the lever 114, the said bars 82 and 86 will be carried with it until the cam face 101 of the bell crank 97 engages the knob 18′ of the stop pin 14 which has been raised. This contact lifts the bell crank 97 and, as heretofore described, lowers the rod 86 against the tension of the spring 91 which in its downward movement releases the reciprocating bar 89. As soon as the bell crank 97 has been raised the vertical wall 105′ of the abutment 104′ will engage the rear end of the raised stop pin 14 and prevent the bar 82 from moving further. Since the reciprocating bar 89 has been released before the bar 82 is stopped, the bar 89 may continue its forward movement although the bar 82 and the bar 86 have stopped. This is for the purpose of freeing the bars 82 and 86 from the reciprocating member 89 as they engage the stop pins in their forward position and thereby permitting the bar 89 to carry all of the bars 86 forward which have not been freed therefrom in the manner heretofore described. Due to the rack teeth 119, as the bar 82 has moved forward, it has oscillated the type segment 122 through the medium of the gear wheel 120 as heretofore described. As is shown in Fig. 7, the stop pin 14 which represents the digit "2" is raised and in this case the bar 82 has been permitted to pass over one stop pin and the zero stop and consequently rotates the gear wheel 120 two spaces or teeth, which rotation oscillates the type segments upwardly a sufficient distance to place the type "2" in position to print.

Attention is called to the fact that when the bars 82 have come to rest against the raised stops 14, the bell cranks 97 have their abutments 100 sufficiently lowered to engage the abutments 18′ to prevent the weight of the type segments 122 from oscillating downwardly and reciprocating the associated bars 82 backward.

After all of the type segments have been set by the stop pins in position to print data transferred thereto from the cards, means are provided for locking and alining the type segments so that they may not move during the printing operation. This locking and alining means will now be described (see Figs. 2, 3 and 23). The extreme upper end of the lever 72 is connected to a knife shaped transversely extending arm 130′ slidably mounted within a slot 131, within the cheek plates 34 and 35. Both the slot 131 and the knife shaped member 130′ which is termed a detent, are arranged radially to the gear teeth 123 of the type segments and the detent 130′ locks the said segments from moving, and lines up the type carried thereby. Attention is called to the fact that the detent 130′ is connected to the lever 72 to which lever the bell crank 61 is also connected, which lever 61 is for the purpose of moving the shutters 36′ for returning all of the stop pins 14 to their normal position, and at the same time raising the naught stops 16. As a consequence the locking of the printing segments and the clearing of the stops 14, is brought about simultaneously so that the reciprocating members may be free to be moved back to their original position after printing without engaging any stop pins whatever except the naught stops 16 as will be hereinafter more fully described.

Should all of the elements thus far described operate in the manner explained it will be apparent that all of the type segments which have not been set up by various stop pins will be held in the naught position and consequently print ciphers. As a result should a number such as "324" be set up by the stop pins, six ciphers would be printed in front of the digit "3" and the number "324" printed thus, "000000324". This result is of course undesirable for the numbers would be difficult to read, and a mechanism is herein provided for preventing all of the ciphers to the left of the digit last set up by the stop pin from being printed. Or in other words, a mechanism is provided for retracting all of the segments out of printing position which have been left against the naught stops as the released bars 82 start on their forward movement.

Relatively thin levers 132 (Figs. 3, 9 and 26) are provided which have on their upper edges an abutment 133 provided with a front cam wall 134 and a rear cam wall 135. The said rear cam wall is arranged adjacent a cam wall 136 formed on the bottom edge of the reciprocatable bar 82. The levers 132 are pivotally mounted upon a transverse shaft 137 which is reciprocatably mounted within slots 138 made in the cheek plates 34 and 35. Means are provided (see Fig. 26) for reciprocating the shaft 137 and this means comprises bell cranks 139 having vertical slots in their upper ends which straddle the pin 137. The bell cranks 139 are pivoted on a rod 140 rigidly mounted in the cheek plates 34 and 35 and each has on its outer end a rigid horizontally extending pin 141 which fits within the bifurcated end 142 of a lever 143, which lever is pivotally mounted upon a stud 144 rigidly mounted in the cheek plates 34 and 35.

The other end of the lever 143 is provided with a roller 145 which runs in a cam groove 146. Comb plates 147 and 148 are rigidly mounted between the check plates 34 and 35 and provide guides for the bars 132. A lever 149 (referring to Figs. 20, 21 and 22) has a slot 150 on its inner end which engages the bar 137, and is also provided with a slot 151 having a longitudinal portion 152 and a lock recess 153 and 154 at each end thereof. The slot 151 receives a pin 155 carried by the lever 132 which provides means for fastening operatively together, a lever 132 and the lever 149 on its right. The outer end of the lever 149 carries a lip 156 which extends horizontally to the right of the bar 149 a sufficient distance to engage the next adjacent bar, 132 to the right (see Fig. 22 which, it is to be remembered, is a bottom view). A spring 157 is strained between a bar 158 fastened between the cheek plates 34 and 35 and a downwardly extending ear 159 made integral with the lower edge of the bar 149. This spring is for the purpose of normally holding the levers 132 and 149 in the position shown in Figs. 20 and 21. The operation of this mechanism will now be described (see Fig. 3). As the various stop pins 14 are elevated, and the associated stop pins 16 are lowered, as has been heretofore described, the bars 82 are started on their forward stroke. As they move forwardly the cam face 136 on the bottom edge of the bar 82 will strike the cam face 135 of the lever 132 and force it downwardly into the position shown in Fig. 10. The downward movement of the inner end of the lever 132 through the pin 155 and the slot 151 will elevate outer end of the lever 149 which, through the medium of the horizontally extending lip 156 fastened thereto, will engage the adjacent lever 132 to the right thereof and force its outer end up and the inner end of it down. As these levers 132 are forced down they will clear the bottom edge of the levers 82. After all of the bars 82, which have been controlled by the stops 14, have started on their forward movement and have forced down all of the levers 132, associated to the right thereof, the bell crank 139 is moved in the direction of the arrow (Fig. 3) by means of the roller 145, cam groove 146 and its other associated elements. This movement of the bell crank 139 will reciprocate all of the bars 132. Those bars 132 which have already been depressed by the forward movement of the bars 82 will slide beneath the said bars 82 and upon a rod 160 mounted between the cheek plates 34 and 35, engaging a longitudinal slot 161 made in the inner end of the bar 132. However, those bars 132 which have not been depressed either by a movement of the bar 82 or by a lip 156 carried by the adjacent bar 149, will still be in their upward position as shown in Figs. 9 and 20, in which the cam face 135 of the abutment 133 lies adjacent the cam face 136 of the reciprocatable bar 82. As a consequence, when these last mentioned levers 132 are moved by the bell crank 139 a longitudinal slot 162 made in the inner end of the lever 133 will engage the bar 160 and prevent the lever 132 from being depressed. As the bars 132 move further under the action of the bell crank 139, the cam face 135 of the lever 132 will engage the cam face 136 of the reciprocatable bar 82 and force it backward in the direction of the arrow. The cam groove 146 is of such a pitch that the bell crank 139 will move the bars 82 back one space, so that the segments associated therewith will occupy the position shown in Fig. 9 in which the naught type are below the printing position. As a consequence, when the bars 82 have finished their forward movement and are set up for printing, all of the type segments to the left of the type segment which is controlled by a stop pin 14 will be kicked back by the mechanism above described so that they will be in a non-print position.

Up to this point the general operation of the mechanisms thus far described, is as follows. When any of the stop pins 14 are controlled by the plungers 12 actuated by the perforations in the cards fed through the machine, the naught stops in that row are simultaneously lowered which will permit the members 82 to move forward. The forward movement of the bars 82 operates the kick back mechanism, comprising the bell crank 139 lever 133 and their associated elements so that all of the bars 82 to the left of the bar last permitted to move by removal of the naught stop and the setting of the pin 14 will be kicked back one space so that the type sectors are oscillated down out of printing position. The bars 82, which have been released, move forward under the action of the reciprocating bar 89 until they are stopped by engagement with the stop pins 14 which have been raised. When the bars 82 come to rest the reciprocating bar 89 is freed and permitted to move forward to the limit of its stroke. At the time the bars 82 that have stopped against the raised pins 14 have oscillated their associated type sectors until the type corresponding with the stop pins have been oscillated up into position to print. When all of the type sectors are in position to print, the detent mechanism is operated, which slides the detent 130' into the gear teeth 123 of the type segments and locks them against movement. Simultaneously with the operation of the detent mechanism, the shutter 47 is rocked through the medium of the lever 61 which releases the stop pins 14 and permits them to be drawn down into their original position by means of the bar 62 which is drawn down under tension of the spring 71', and at the same time raises the naught stops 16 into the upward position as shown in Fig. 3. The printing carriage 600 is then moved up into engagement with the type on the type segments, and the printing operation takes place. The printing carriage is then retracted and at the same time means is provided for lowering the bars 86 so as to raise the bell cranks 97 so that when the bars reach the limit of the rearward stroke the rest 103 will be in position to rest upon the top of the naught stops which are in their raised position as shown in Fig. 3.

The means for lowering the bars 86 and lifting the bell cranks comprises a transverse bar 163 which is arranged above the upper edge of the bars 86 being rigidly carried by the upper ends of slide levers 164 arranged adjacent the inner face of each cheek plate 34 and 35, which slide levers 164, during their downward movement, slide the bar 163 in slots 165 made in the said cheek plates. The slots 165 are of a length sufficient to permit the bar 163 to move down in contact with the upper edge of the bars 86 and force them downward until they occupy the position shown in Figs. 3 and 10. The lower ends of the levers 164 are provided with pins 166 which project through slots 167 in the cheek plates 34 and 35, which slots are of a length equal to the slots 165. The levers 164 are reciprocated up and down by means of levers 168 (see Fig. 23) which are arranged adjacent the inner face of the cheek plates 34 and 35 and have bifurcated rear ends 169 which straddle the pins 166. The levers 168 are pivoted at 170 to each cheek plate 34 and 35, and their other ends 171 are bifurcated to receive a pin 172 carried by the ends of bell cranks 173 which are pivoted to the cheek plates 34 and 35 at the point 174. The forward ends of the bell cranks 173 are connected at the point 175 so as to form one lever 176 which carries on its outer end a roller 177 which is arranged to run on the outer periphery of the cam 269. A coil spring 178 is strained between a pin 179 carried by the bell crank 173 and a lug 180 carried by the cheek plates 34 and 35 and provides means for normally holding the bell crank 173 in a downward position and the bar 163 in a raised position out of contact with the bars 86 as is shown in Fig. 3. As has been before described, after the printing operation takes place the bar 163 is lowered so as to come in contact with the upper edges of the bars 86 and force them downward into the position shown in Fig. 10. At about the same time the bars 86 are forced downward by means of the bar 163, the bell crank 139 is operated by the mechanism heretofore described which will lower the lever 132 and disengage the abutment 134 thereof from the cam face 136 formed on each of the lower edges of the levers 82 and permit the said levers to move forward until the abutments 104' carried thereby, come into engagement with the notch 38 of the naught stop 16. The means for causing the forward movement of the bars which have been released from the kick back mechanism (see Figs. 3, 9 and 10), comprises levers 181 pivoted to a bar 182 carried by the cheek plates 34 and 35, the upper end 183 of which is adapted to come in contact with pins 184 carried by levers 82, and force them forward by means of a spring 185 which is strained between the lower end of the levers 181 and a rod 186 carried by the cheek plates 34 and 35. The forward movement of the upper ends of the levers 181 is limited by means of a horizontally disposed comb plate 187.

Thus far a description has been given which explains the manner and the means by which the type sectors are set up in consonance with the perforations of a card and an impression made on the paper carried by the printing carriage, and also explains the manner and means by which all of the elements which have been actuated for the printing operation are returned to their normal position so that the bars 82 may have a clear passage in a rearward direction. Attention is called to the fact that all of the operations heretofore described take place during the forward movement of the bars 82 and therefore the movement of the said bars in a forward direction may be termed the printing stroke.

The accumulating elements of the machine are arranged to be operated by the rearward movement of the bars 82, and a description of this mechanism will now be given setting forth in detail its construction and also its cooperation with the bars 82 which serve as its actuating means.

The accumulating mechanism comprises a reciprocating carriage having spaced vertically arranged cheek plates 189 and 190 which are arranged within and adjacent to the cheek plates 34 and 35 respectively as is clearly shown in Fig. 12. The forward end of the cheek plates 189 and 190 have downwardly extending ears 191 within which is rigidly mounted a transverse horizontally extending shaft 192, the outer ends of the shaft 192 projecting through longitudinal slots 193' (see Fig. 2) in the cheek plates 34 and 35. Upon the shaft 192 are mounted nine spacing collars 193 which are rigidly held together between the ears 191 by means of collars 194 which clamp against the outside of the ear 191 by means of a nut 195 as is clearly shown in Fig. 13. Revolubly mounted in each of the spacing collars 193, which have an annular rectangular shaped groove 196, are nine gear wheels 197 having ten gear teeth 198 thereon as shown in Fig. 11. One side face of each of the gear wheels 197 is provided with an annular collar 199 having on its periphery an abutment 200 which has a radial face 201 and an inclined cam face 202. The abutment 200 is made on the periphery of the collar 199 so that it lies adjacent gear tooth "0" of the gear teeth 198. The collars 199 are also provided with an abutment 203 having a rounded upper face 204, and this abutment is arranged adjacent gear tooth No. 5 of the gear teeth 198 and diametrically opposite the abutment 200. The functions of the abutments 200 and 203 will be hereinafter set forth. The rear ends of the cheek plates 189 and 190 are provided with longitudinal slots 205 which receive a guide rod 206 rigidly carried by the cheek plates 34 and 35.

Means is provided for reciprocating the accumulating carriage 188 and the shaft 192 which carries the accumulating gear wheels backward and forward on the guide rod 206. This means comprises levers 207 and 208 which have their ends 209 and 210 respectively pivoted to the shaft 192. A detailed view of these levers is given in Fig. 29. The other ends of the levers 207 and 208 are pivoted to stud shafts 211 and 212 carried by vertically extending offset portions 213 and 214 of levers 215 and 216 which have pivot openings 215' and 216' respectively to receive studs 144 which are mounted in cheek plates 34 and 35 (see Fig. 10). The levers 215 and 216 also have horizontally extending portions 217 and 218 (see also Figures 27 and 28) which extend inwardly toward each other and are provided with vertically extending relatively rectangular shaped plates 219 and 220 pinned together at their upper and lower ends by means of pins 221 and 222. The said plates 219 and 220 are provided with registered openings 223 and 224 to receive a cam shaft 225, which cam shaft is loosely mounted on a shaft 226 which passes through its center rigidly mounted upon which are collars 227 and 228 which abut against the ends of the cam shaft 225 and are held in locked position by means of set screws 229. The collar 227 is provided with an annular groove 230 to receive the bifurcated end 231 of a lever 232 which is pivotally mounted at 233 to the frame member 234 as is shown in Fig. 2 and Fig. 26. The frame member 234' is attached to the framework 2 which carries the entire type setting and accumulating mechanism and also the reciprocating printing carriage. The lever 232 intermediate its ends is provided with a rectangular cage 235 within the walls 236 and 237 of which is reciprocatably mounted a plunger 238 having a cam engaging head 239 on its upper end. A spring 240 is compressed between the inner face of the said cam engaging head 239 and the wall 237 of the rectangular cage. The spring is normally held compressed by means of a bell crank 239' pivoted to the lever 232 at the point 239'', one end 241 of which is adapted to engage a collar 242 carried on the inner end of the reciprocating plunger 238. The other arm of the bell crank 239' is provided with a key 240', which upon being pressed, disengages the lever 241 from the collar 242 and permits the plunger to be forced upwardly under action of the spring. The plunger upon being released enters a cam groove 244 in the periphery of the cam 77. As the cam head runs in the groove 244 the lever 232 will be pushed to one side by the said groove and thereby cause a sidewise movement of the lever 232 which will slide the cam shaft 225, the purpose of which will be hereinafter set forth. As the cam reaches the end of its revolution an abutment 245 secured therein and having an inclined face 246 will engage the end of the cam head 239 and force it inwardly. The inward movement of the cam head 239 forces the collar 242 in a rearward direction until it slides over an inclined face 247 made on the lever 241 and snaps in back of the said lever and is held in its locked position as is shown in Fig. 2. A coil spring 248 (see Fig. 26) is stretched between the end of the lever 241 and the upper edge of the lever 232 and provides means for normally holding said end in an upward position to be engaged by the collar 242.

Returning now to the levers 207 and 208 which, as before described, are for the purpose of reciprocating the accumulating carriage, these levers are pivotally mounted upon a transverse shaft 250 which is mounted in the cheek plates 34 and 35. Between the said levers 207 and 208 and pivotally mounted on the shaft 250 are the contacting ends 251 and 252 of levers 253 and 254 respectively which have openings 255 and 256 to receive the cam shaft 225 as is shown in Fig. 29. The levers 253 and 254 are offset at the point 255' so that at the point where they receive the cam shaft 225 they are in spaced parallel relation with each other. The free ends of the levers 253 and 254 carry relatively vertically extending portions 256′ and 257 provided with horizontal stud shafts 258 and 259, upon which are revolubly mounted rollers 260 and 261 respectively. The roller 261 is adapted to run in a cam groove 262′ in the cam 118 which, during the revolution of the said cam, transmits a rocking motion to the lever 254 which through the medium of the levers 213 and 207 reciprocates the accumulating carriage. When the said accumulating carriage is being reciprocated by the lever 254, the accumulating elements thereof are actuated for accumulating purposes only, as will be hereinafter more fully set forth, and consequently the lever 254 may be termed the "accumulating lever". A coil spring 263 is strained between an ear 264 carried by the lever 207 and an ear 265 carried by the lever 213 for the purpose of normally holding a lug 266 carried by the lower edge of the lever 207 against the lower edge of an opening 267 made in the upper end of the lever 213. The spring 263 is of sufficient strength so that as the lever 213 is rocked by the lever 254, the lever 207 will also be rocked and the said levers 207 and 213 held together, for all practical purposes, as though they were made as a single lever. The roller 260 is revolubly mounted in a cam groove 268 of a cam 269 which, during the revolution thereof, will transmit a rocking motion to the lever 253, which motion, through the medium of levers 214 and 208, will reciprocate the accumulating carriage. Since the reciprocating carriage is reciprocated by the lever 253 only when taking the total this lever 253 may be termed the "total taking lever". The levers 208 and 214 are connected so that they operate substantially as a single lever by means of a coil spring 270 similarly mounted to the coil spring 263 and as a consequence needs no further detailed description.

A description will now be given of the effect and purposes of the slidably mounted cam shaft 225, reference being had particularly to Figs. 27 and 28. The cam shaft 225 is provided with an annular groove 271 having inclined side walls 272 and 273 respectively. The lower edges of the rectangular shaped plates 219 and 220 are provided with annular collars adjacent openings 223 and 224 which form bearings for the cam shaft 225. The levers 253 and 254 lie between the plates 219 and 220. The extreme width of the groove 271 is greater than the distance between the outer faces of the levers 253 and 254 so that only one of the said levers at a time can have the walls of its opening in contact with the periphery of the cam shaft 225. As for instance, when the cam shaft is shifted by the lever 232 and its associated parts, as heretofore described, and the lever 254 has the walls of its opening 256 in engagement with the periphery of the cam shaft 225, the opening 255 in the lever 253 will not engage the periphery of the cam shaft 225 but will be loosely disposed within the groove 271 as shown in Fig. 27. When the cam shaft 225 is shifted in the reverse direction, by the mechanism heretofore described, the opposite action takes place and the levers 253 and 254 occupy the position shown in Fig. 28, in which the lever 254 is shown loosely mounted in the groove 71 while the edges of the opening of the lever 253 are in engagement with the periphery of the cam shaft 225. Since both of the levers 253 and 254 are always being oscillated through the action of the cams 261 and 260 respectively, the lever which is loosely mounted in the groove 271 may frequently not be in a position where its opening will exactly register to receive the cam shaft 225 when it is moved sidewise. Due to the inclined walls 272 and 273 of the annular groove 271, however, when the cam shaft 225 is moved sidewise in the opening in one of the levers 253 or 254, the edges of the said opening will slide up the inclined walls of the annular groove 271 until they come in position to receive the cam shaft 225. When the cam shaft 225 is moved sidewise so as to place the edge of the opening of one of said levers in engagement with the periphery of the cam shaft, a positive connection will be made between the said lever and its cooperating lever 207 or 208 as the case may be, and the accumulating carriage reciprocated by the action of this lever. At this time the other lever whose opening is loosely fitting in the groove 271 has no operative effect on its associated lever 207 or 208 for reciprocating the accumulating carriage. When the cam shaft 225 is shifted however, the opposite action takes place and the accumulating carriage is reciprocated by the other lever 253 or 254 as the case may be. From the above it is apparent that the levers 253 and 254 are alternately locked, so to speak, to the cam shaft 225 for reciprocating the accumulating carriage, the alternating lock and release being actuated by the shifting of the cam shaft 225.

The purpose of alternately reciprocating the accumulating carriage by two different levers, and the effect of this alternating actuating means upon the other elements of the accumulating and printing mechanisms will be hereinafter described in detail.

We will now take the position of the parts in which the lever 254 is locked on the cam shaft 225 and the accumulating carriage is being reciprocated thereby for the purpose of accumulating, as has been heretofore set forth. At this time the elements of the accumulating mechanism occupy the position shown in Fig. 10 and reference will now be had to this figure in order to give a detailed description of the accumlating mechanism and the action of its elements while performing the accumulating functions.

As is shown in this figure, the printing operation has been completed, and the other elements of the printing mechanism have been so set to permit a free passage of the reciprocating members 82 back to their original position. Before the members 82 move back however, the lever 254 is operated which will reciprocate the accumulating carriage until the accumulator wheels 197 have been brought in contact with the gear teeth 123 of the type segments 122. The backward movement of the bars 82 will then rotate the accumulating gear wheels 197 and set the teeth thereon which correspond with the type last set up by the segments for printing. When the reciprocating bars 82 have reached the limit of their rearward movement the lever 254 is again rocked to reciprocate the accumulating carriage rearwardly and thereby disengage the accumulating gear wheels with the gear teeth of the type segments, and bring the said accumulating gear wheels into engagement with a transverse bar 272 which is carried by the cheek plates 34 and 35 holds the said accumulating gear wheels in their set up positions. This reciprocation of the accumulating carriage forward and backward and the engagement and disengagement of the accumulating gear wheels with the gear teeth of the type segments takes place as the bars 82 are reciprocated backward and forward. However, when any of the accumulating gear wheels have made a complete revolution of the inclined wall 200 of the abutment 201 carried by the said gear wheel has been brought into engagement with the inclined wall 273 made on the lower end 274 of an L shaped lever 275, the said lever is rocked upwardly on its pivot 276 into the position shown in Fig. 11. A coil spring 277 is strained between the lever 275 and a transverse rod 276' carried between the cheek plates 189 and 190 of the accumulating carriage. This spring normally holds the lower end 274 of the lever 275 in a horizontal position as is shown in Fig. 3, the downward movement of the front end of the lever being limited by a transverse rod 277' mounted between the cheek plates 189 and 190 of the accumulating carriage. In its horizontal position, the lever 275 holds a vertically extending lever 278 to the limit of its upward movement, the upper edge of the lever 275 engaging a lip 279' carried by the side of the lever 278, which movement is limited by the rod 277' mounted in a longitudinal slot 280 in the end of the lever 278, and holds the said lever 278 in its said upward position against the tension of a coil spring 280' (see Fig. 11) which is strained between the said lever and a transverse rod 281 carried between the cheek plates 189 and 190 of the accumulating carriage. A horizontally disposed comb plate 281' is carried between the cheek plates 189 and 190 forming guide ways for the vertical extending levers 278. Pivoted to the lower end of the lever 278 at the point 282 is a lever 283, fitting within a vertically disposed guide comb plate 284'. The other end of the lever 283 is provided with a stud 284 upon which is pivotally mounted the lower end of a lever 285 which is provided with an enlarged slot 286 surrounding the transverse shaft 276. The upper end of the lever 285 is shaped to form a lever 287 which extends rearwardly in a relatively horizontal position, and which is pivotally mounted upon a transverse rod 288, carried between the cheek plates 34 and 35. A coil spring 289 is strained between an ear 290 carried by the lever 285 and a transverse shaft 291 carried by the cheek plates 189 and 190 and provides means for normally holding the outer end of the lever 287 in a downward position. The said outer end of the lever 287 is slidably mounted in a vertically disposed comb plate 292 and carries on its outer end a stud 293 upon which is revolubly mounted a roller 294. The roller 294 runs upon a stepped cam plate 295 which is adapted to be reciprocated back and forth for lifting the roller 294 and rocking lever 287 against the tension of the spring 289. The cam plate 295 is arranged in a horizontal position between the cheek plates 34 and 35 and carries on its side edges rollers 296 which are adapted to roll in longitudinal slots 297 made in the cheek plates 34 and 35. The means for reciprocating the cam plate 295 backward and forward comprises levers 298 pivoted to each side edge of the cam plate 295 and adjacent the outer face of the cheek plates 34 and 35 (see Figs. 23 and 24). The said levers 298 are pivoted to the cam plate at the point 299, and carry on their lower edges rack teeth 300 which are in mesh with a pinion 301 revolubly mounted upon a shaft 302 which shaft is slidably mounted in a longitudinal slot 303 made in the cheek plates 34 and 35. The said levers 298 have their upper edges in engagement with rollers 304 which prevent their upward movement and keep the rack teeth 300 in engagement with the pinions 301. The pinions 301 are also in mesh with stationary rack bars 305 which are fastened to the outer face of the cheek plates 34 and 35 by means of screws 306. The shaft 302 is moved forward and backward in the slots 303 by means of levers 307 which have their bifurcated upper ends 308 in engagement with the said shaft 302. The levers 307 are pivoted to stud shafts 309 carried by the adjacent cheek plates 34 and 35. The lower ends of the levers 307 are bifurcated at 310 to straddle a transverse shaft 311 reciprocatively mounted within parallel slots 312 in the frame work 234. Attention is called to the fact that the transverse shaft 311 passes through the entire machine and is arranged to receive the levers 307 of each independent unit or zone. Two levers 313 (Fig. 2) arranged on each side of the machine have one end 314 pivotally mounted on the transverse shaft 311 and their other ends provided with a longitudinal slot 315 to receive the main drive shaft 74. These ends of the levers 313 are also provided with an ear 316 carrying a stud shaft 317 upon which is revolubly mounted a roller 318 which is arranged to rotate in a cam groove 319 in the cam 77. As the main shaft 74 is revolved, through the lever connections heretofore described, the stepped cam plate 295 is reciprocated forward and backward. Attention is called to the fact that due to the arrangement of the pinion 301 on the rack bars 298 and 305, the movement of the rack bar 298 is in ratio of two to one to the movement of the pinion 301 on the rack bar 305.

Returning now to the L shaped lever 275, it will be seen that means is provided for locking the rear end of this lever in a downward position when the vertical portion 274 thereof has been raised by engagement with the abutment 200 carried by the accumulative gear wheels. This means comprises a bell crank lever 320 pivoted upon a transverse shaft 321 carried by the cheek plates 189 and 190 of the reciprocating carriage. Horizontally disposed comb plates 322 and 323 are provided for guiding these levers during their rocking movement. A coil spring 324 is strained between the upper end of the lever 320 and a transverse shaft 325 carried by the cheek plates 189 and 190 which will normally pull the upper end of the lever 320 forwardly and hold it against the inner end of the lever 275 when the said lever is in the horizontal position shown in Fig. 3. When the lower end of the lever 275 is depressed, as heretofore described, vertically extending portion 326 thereof will snap within a notch 327 formed in the front edge of the lever 320 and hold the said lever 275 in its downward position, as is shown in Fig. 11. The other arm 328 of the bell crank 320 is adapted to come in contact with the transverse shaft 206 and upon doing so will move the upper end of the lever rearwardly against the tension of the spring 324 releasing the vertically extending portion 326 of the lever 275 from the notch 327 and permit the said lever 275 to occupy its horizontal position, being actuated into this horizontal position by means of the coil spring 277.

A description of the operation of the carry over mechanism which has just been above described in detail will now be given. After the accumulating gear wheels have made a complete revolution and the abutment 200 thereon comes in contact with the cam face 273 of the vertically extending portion 274 of the lever 275 the said lever will be rocked about its pivot so that its inner end is lowered. The lowering of the inner end of the lever 275 permits the vertically extending rod 278 to be drawn down under action of the spring 280' so that the lever 283 will be dropped down in front of the abutment 104 carried by the reciprocating bars 82. Attention is called to the fact that when any one of the accumulating gear wheels have made a complete revolution the reciprocating bar 82 associated therewith will of necessity be in its extreme rearward position. Both the vertically extending lever 278 and the inner end of the lever 275 descend simultaneously, the lever 275 being locked in its downward position by means of the bell crank 320 and the vertical lever 278 being held in its downward position by means of the coil spring 280'. When the parts are in the positions above described, the reciprocating cam plate 295 is moved forwardly by means of the levers 298, 307 and their associated elements. A forward movement of the cam plate 295 will engage an inclined cam surface 295' thereon with the roller 294 carried by the inner end of the lever 297 and be lifted. The lifting of the roller 294 will rock the lever 285 about its pivot 288 thereby forcing the lever 283 pivoted thereto in a rearward direction and bringing the inner end of the lever 283 into engagement with the abutment 104 made on the upper edge of the reciprocating bar 82, and force the said bar backward a distance sufficient to turn the gear wheel 120 to oscillate the type segment a distance sufficient to rotate the accumulator gear wheel with which it is associated, back one tooth. It is of course to be understood that due to the fact that the abutments 200 are carried by the left hand face of each accumulative gear wheel, the set back mechanism heretofore described of the next adjacent accumulative gear wheel to the left is actuated. In other words, a rotation of one of the accumulative gear wheels will actuate the set back mechanism of the accumulative gear wheel which is adjacent to it on the left.

A brief description of the entire machine thus far described will now be given explaining the sequence of operation of the various mechanisms to print and accumulate the data perforated in the cards which are passed through the machine.

As a card is fed through the machine various stop pins 14 are elevated by means of the plungers 12, the stop pins corresponding with the various perforations of the cards. The elevation of the stop pins 14 will lower the naught stops 16 in the rows in which the stop pins are elevated. The lowering of the stop pins will permit the reciprocating bars 82 associated therewith, to be moved forwardly. The forward movement of the bars 82 will depress the levers 132 which are associated therewith, and these levers will depress all of the levers 132 to the right thereof which have not been depressed by the forward movement of the reciprocating bars associated therewith. All of the levers 132 however, to the left of the lever 132 which has been depressed by the forward movement of the rack bar will still be in their upright position as shown in Fig. 5. While the reciprocating bars 82 which have been released are moving forwardly, these last mentioned levers 132 will be reciprocated rearwardly by means of the bell cranks 139 levers 143 and other elements associated therewith, which in their rearward movement will force back the bars 82 with which they are associated, and oscillate the type segments actuated by these rack bars downwardly into a nonprint position as is shown in Fig. 9. The bars 82 move forwardly under the action of the reciprocating bar 89 until the abutments 104' carried on their lower edges come in contact with the various elevated stop pins 14 at which time they come to a rest. When the rack bars 82 have come to a rest, the segments associated therewith have been oscillated upwardly a distance sufficient to set the type thereon in consonance with the number of the stop pin 14. When all of the type segments have been oscillated into proper position the detent 130 is drawn down into engagement with the gear teeth 123 on the type segments and alines and locks them so that they cannot be moved during the printing operation. Simultaneous with the operation of the detent, the levers 62 and 163 are actuated, the former tripping the shutter 36' and drawing down the set stop pins 14 and elevating all of the naught stops 16, the latter contacting with the reciprocating bars 86 for lowering them so that on their return movement the bell cranks 97 carried thereby will be in position to rest upon the top of the naught stops 16. The reciprocating printing carriage 600 is then brought into engagement with the type segment and an impression made on the paper carried thereby. The rack bars 82 are now ready for their rearward movement, but previous thereto the reciprocating accumulating carriage has been moved forwardly so that the accumulating gear wheels are brought into engagement with the teeth 123 of the type segments. The locking detent for the type segments is withdrawn and the reciprocating bars moved rearwardly under action of the bar 89. The rearward movement of the rack bars 82 will revolve the accumulating gear wheel through the medium of the type segments and set up thereon the gear teeth corresponding with the type printed. When the bars 82 have completed their rearward motion, the reciprocating accumulating carriage is also moved rearwardly so as to disengage the accumulative gear wheel from the type segments and to move them into engagement with a transverse bar to lock them against further rotation. All of the elements are now ready for a second forward movement of the reciprocating bars 82. This operation continues. When any of the accumulative gear wheels have made a complete revolution, during which time the bars 82 associated therewith have moved rearwardly into naught stop position, the L shaped bars 275 are rocked, which through the mechanism heretofore described, will move the rack bar 82 adjacent to the left thereof, back one space so that the accumulative gear wheel associated with this rack bar will also be moved back one space, and in this way form the "carry over".

The above operation continues as the cards pass through the machine and the items thereon are printed by the type sectors and accumulated on the accumulator wheels until either a total card is fed to the machine or until it is desired to take the total of the data accumulated by operating a total key manually. A detail description of this total taking mechanism will now be given.

All of the actions heretofore described have taken place when the lever 254, which I have termed the accumulating lever, is in locked position on the reciprocating cam shaft as is shown in Fig. 27. When the total is to be taken the key 240' is lifted either manually or by a push rod A controlled by the perforated cards, as is described in my copending application, Serial No. 80,793 filed Feb. 28, 1916 now Patent No. 1,376,555. The reciprocating plunger 238 is released, which will spring into the cam groove 244 and upon engaging therewith will rock the lever 232 about its pivot 233 and reciprocate the cam shaft 225 to the position shown in Fig. 28, which will unlock the accumulating lever 254 and lock the total taking lever 253. The shifting of the reciprocating cam shaft 225 takes places when all of the parts are in the position shown in Fig. 3. The locking of the lever 208 with the reciprocating cam shaft 225 will cause the said lever to reciprocate the accumulating carriage forwardly until the accumulator wheels are brought into contact with the type segments.

At the same time that the cam shaft 225 is reciprocated as above described, means is provided for lowering the naught stops 16 so that the bars 82 will be in a position to move forward. This means will now be described. Levers 330 and 331 (see Figs. 23 and 26) are pivoted to the transverse shaft 64 and have their lower ends 332 and 333 respectively fitting within cam grooves 335 and 336 of the cam shaft 225. The cam groove 335 has an inclined side wall 337 and the cam groove 336 an inclined side wall 338 as shown in Fig. 28. As the cam shaft 225 is reciprocated for taking a total as is shown in this figure, the lower ends 332 and 333 of the levers 330 and 331 respectively ride up on the inclined faces 337 and 338 and move the said lower ends rearwardly. A rearward movement of the ends 332 and 333 will rock the levers 330 and 331 about their pivots 64 in an upward direction and lift the vertically disposed comb plate 339 carried between the said levers and thereby raise the bars 62 which rest against the bottom edge of the comb plate as is shown in Fig. 3. A lifting of the levers 62, will, through the medium of the lever 68 draw the naught stops downwardly, as has been heretofore described. The lever 330 is also provided with a rearwardly extending arm 340 (see Fig. 23), carrying on its outer end a stud shaft 341 to which is pivoted one end of a vertically extending lever 342. The other end of the lever 342 is pivoted at the point 343 to a horizontally disposed lever 344, which, in turn is pivoted at its forward end to a stud shaft 345 carried by the cheek plate 34. The free end of the lever 344 is adapted to come in contact with a lug 346 having an inclined face 347. The lifting of the lever 330 will also lift the lever 344 through the medium of the link 342 so that its free end 346' will engage the inclined face 347 of the lug 346 which is formed on the shutter 47 which will disengage the edge 41 of the shutter from either of the notches 44 and 45 within which it might be resting. This is to insure that before the bars 82 start on their forward movement, all of the stop pins 14 as well as the naught stops 16 will be in their lower position.

After the accumulator gear wheels have been moved into the gear teeth on the type segments and after both the naught stops and the stop pins have been lowered as above described, all the elements have been set to permit a forward movement of the bars 82. The bars 82 are moved forward under the action of the transverse bar 89 and its associated elements, the said bar 89 being gripped between the abutments 104 and the notches 88 formed in the upper edges of the bars 86. The forward movement of the bars 82 rotate the type segments and accumulator gear wheels in the direction indicated by the arrow in Fig. 26 until the radial wall 201 of the abutments 200 come into contact with the rear edge of the vertically extending bar 274. When the accumulating gear wheels have been stopped in the manner heretofore described they have revolved their associated type segments upwardly a distance sufficient to set into printing position the type corresponding with the gear teeth of the accumulating wheels. Since all of the accumulating wheels will not revolve the same distance, but since it is necessary that the bar 89 should move to the limit of its outward movement, means is provided for releasing the said bar from engagement with the notches 88 formed in the bar 86 so that the bar 89 may slide on the upper edge of the bar 86 as is shown in Fig. 26. This means comprises a lever 350 pivoted to a transverse shaft 351 carried by the cheek plates 189 and 190 and provided on its upper edge with a rounded abutment 353 which is adapted to come in contact with the rounded abutment 203 carried on the collar 199. When the said abutments 203 and 353 come in contact as is shown in Fig. 26, the lever 350 is forced downwardly, which will force the bars 86 also downwardly through the medium of an outwardly turned lip 354 formed on the outer end of the lever 350 which lip is always in contact with the upper edge of the bars 86. The forcing down of the bars 86 as before described, will release the transverse reciprocating bar 89 and permit it to move forwardly to the limit of the stroke. When all of the type segments have been set up in the manner heretofore described, the detent 130' is brought into contact with the gear teeth of the type segments and locks the said segments in printing position. The reciprocating printing carriage 600 is then moved up into engagement with the type and an impression made on the paper carried thereby. This impression gives the total of the data accumulated by the accumulative gear wheels. After the printing operation is completed the detent 130' is lifted. The bars 82 then move rearwardly during which motion the abutment 245 has been brought into contact with the cam engaging head 239 and forced the reciprocating plunger 238 into its locked position shown in Fig. 10 and has also rocked the lever 232 about its pivot 233 and thereby reciprocated the cam shaft 225 into the position shown in Fig. 27 in which the total taking lever 253 has been released and the accumulating lever 254 has been locked. All of the parts are now in the position shown in Fig. 3 and the mechanism is ready to accumulate further data.

Figure 35:
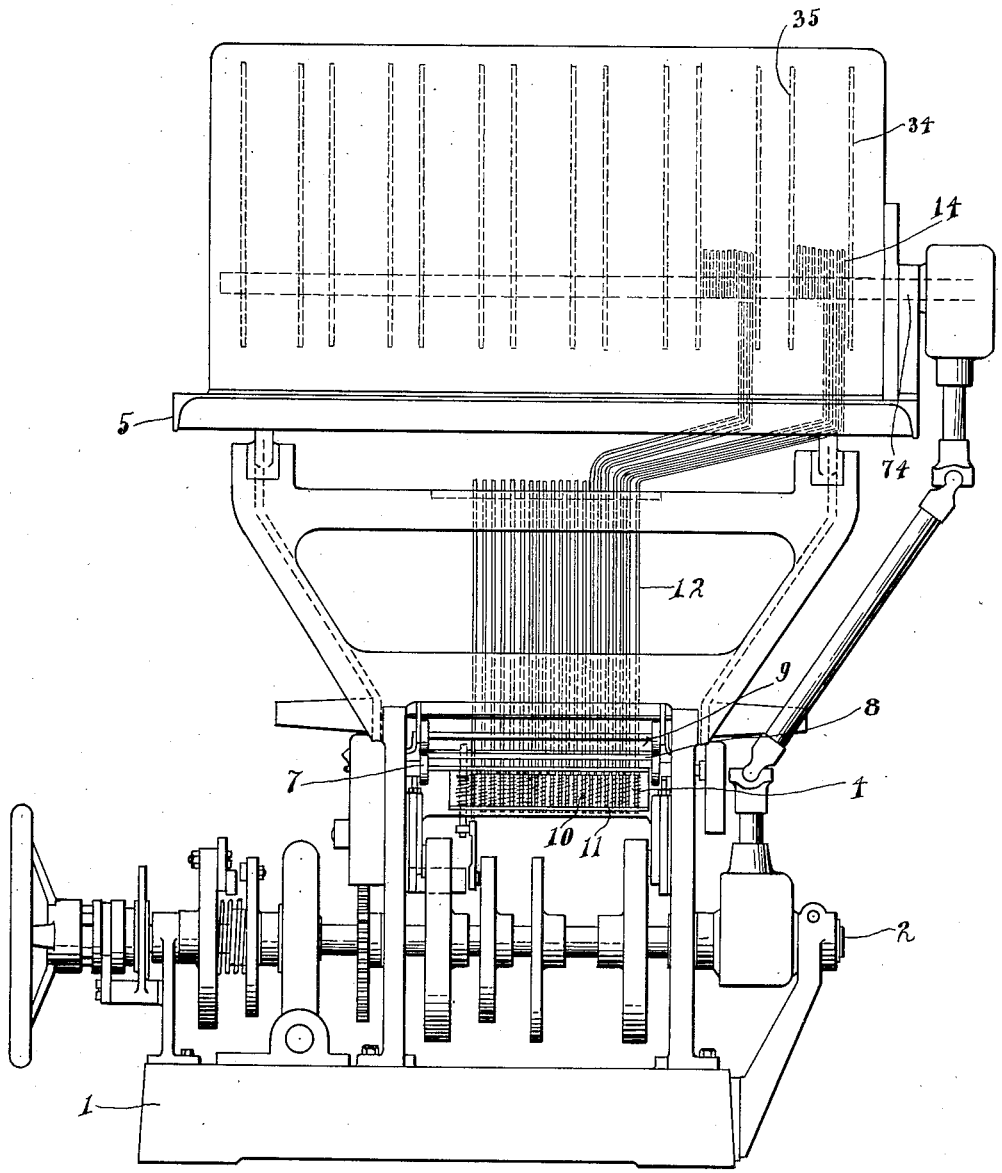
Fig. 35 is an end elevation of Fig. 1.

It is to be understood that all the description thus far has been given relative to the operation of one unit of the machine, that is, one printing and accumulating section composed of 9 type sectors and 9 accumulating gear wheels together with their associated and cooperative elements. It is also to be understood, however, that each unit may contain a greater or less number of associated printing and accumulated elements. The complete machine, however, as is shown in Fig. 35 comprises a number of units each identical with the unit heretofore described. These units are indicated in dotted lines on the figure referred to. As is well known to those skilled in this art, the perforated cards which are adapted to be used with this machine are divided off into a plurality of columns, the perforations in each column normally controlling one unit of the machine or in other words 9 type sectors and accumulator wheels. Very often in practice however, it is found desirable to adapt the machine having units of 9 accumulative wheels each, to analyze a card on which there are a number of columns having less than 9 rows of digits, as for instance 4 or 5. These perforations which are arranged in columns having a less number of perforations than 9, must transfer their data to the type setting and accumulating elements which normally have units of 9 rows of digits each. As a consequence it is necessary to provide some mechanism for the machine which will permit the various units having 9 rows of digits to be "split", so that the data of a column may be accumulated and printed although it contains a less number of rows of digits than 9. A description will now be given of the mechanism which is adapted to split the units of the machine for the purpose above described.

Referring now particularly to Figs. 20, 21 and 22, the mechanism comprises the levers 149 which are pivoted to the transverse shaft 137 and are pivotally connected with the levers 132 by means of the pin 151 and slot 152. A hand engaging element or key 400 is formed on the outer end of the levers 149 and provides means for drawing said levers to the rear so that the pin 151 will engage and lodge within the retaining notch 153. The lever 149 which has been drawn out in the manner above described will disengage its horizontally extending lip 156 from contact with the adjacent lever 132 to the right thereof as is shown in Fig. 22. The pulling out of one of the levers 149 as above described has the following result: All of the levers 132 to the left of the bar 149 which has been drawn out and including the said bar will be depressed one by the other in the manner described in connection with the kick back mechanism which has heretofore been explained. All of the levers 132 to the right of the lever 149, which has been drawn out, however, will not be controlled by any of the levers 149 to the left thereof as would normally be the case, because the connection between them has been broken at the point the lever 149 has been drawn out. All of the levers to the right of the drawn out lever 149 however, are still operatively connected together by means of the lugs 156 and will be operated one by the other. When none of the levers 149 have been withdrawn, and when any of the bars 82 have been released thru the actuation of a stop pin 14, all of the bars 82 to the right thereof will also be released thru the medium of the levers 132 and 149. However, when one of the bars 149 has been withdrawn as is shown in Fig. 22 and any of the bars 82 associated with levers 132 to the left thereof have been released by the actuation of a stop pin 14, all of the bars 82 to the right of the one released will be also released down to and including the bar 82 which is associated with the withdrawn lever 149. All of the bars 82 which are associated with levers 132 and 149 to the right of the lever 149 which have been withdrawn are free to operate and control each other independent of any of the bars 82 associated with the levers 132 to the left of the bar 149 which has been withdrawn. Since by the withdrawing of the bar 149 the reciprocating bars 82 operate with each other in two separate groups, as a consequence, these separate groups will print, accumulate, total, and print the total each independent of the other because the connection between each group has been broken by the withdrawal of the lever 149.

If it is desirable to split a column, however, so that any particular line of digits will neither accumulate nor print, means is provided for holding the bars 82, associated with the digits to be kept from printing and accumulating, so that it cannot run forward and backward to set type and accumulate and also to hold the bar 82 back far enough to cause the type segment associated therewith to occupy a non-print position. This means (shown in Fig. 10) comprises a plurality of latch levers 401 which are pivotally mounted upon a transverse bar 402 carried between the cheek plates 34 and 35 of the machine. When it is desired to render a line of digits inoperative the reciprocating bar 82 associating therewith is drawn back so that the upper end of the latch lever 401, which is provided with a hook 403, will hook over a horizontally extending pin 404 carried by the vertically extending portion 92 carried by the bar 82.

It is oftentimes found desirable in the operation of the machine to have one of the units only set one number into the accumulating mechanism associated therewith and then lock the accumulating mechanism out so that during the subsequent operation of the machine, although the same number is set up and printed by the unit, the number will not be added by the accumulator. Suppose for instance that a series of cards are being run thru the machine containing various data relative to the population, etc. of the city of Chicago. Each of these cards is provided with perforations which represent the key number of the city of Chicago. The first card that passes thru the machine will print this key number and also set it up on the accumulator wheel. It is now desirable to lock out the accumulator mechanism so that when another card passes thru the machine provided with perforations for the Chicago key number, this number will be set up by the type segments and printed but will not be added by the accumulator because the same has been locked out of operative connection. The means for holding the accumulating mechanism in a locked out position so that it will not operate will now be described. This mechanism (shown in Figs. 24 and 25) comprises a lever 405 pivoted to a stud shaft 406, carried by the cheek plate 35. The forward end of the lever 405 is provided with a vertically extending arm 407, and with a cam face 408, adapted to engage the collar 194 of the accumulator shaft 192, and is also provided with a cut-out portion 409 for a purpose hereinafter to be explained. The other end of the lever 405 is made in bell crank form having arms 410 and 411. A coil spring 412 is strained between a stud 413 carried by the arm 410 and a stud 414 carried by the vertically extending arm 415 of a bell crank 416, which bell crank is pivoted to a stud shaft 417 carried by the cheek plate 35. The upper end of the arm 415 is provided with a notch 417 to receive a horizontally extending lip 418 carried by the arm 410. The arm 411 of the lever 405 is provided with a horizontally extending lip 419 which is adapted to engage an abutment 420 formed on the upper edge of a lever 421 which lever is provided on its outer end with a longitudinal slot 422 to receive the drive shaft 74 of the machine. The outer end of the lever 421 is also provided with an arm 423 carrying on its outer end a stud shaft 424 pivotally mounted upon which is a roller 425 which is adapted to engage the outer periphery of the cam 118. A coil spring 430 is strained between the pin 431 carried on the side of the lever 421 and a stud 432 carried by the cheek plate 35 and provides means for holding the roller 425 in contact with the outer periphery of the cam 118 as is clearly shown in Fig. 25.
This cam is made with a notch 425' into which the roller 25 is drawn momentarily by the spring 430 once in each rotation of the cam, thus imparting a momentary rearward motion to the bar 421. There is a time both in an adding cycle and also in a total-taking cycle when the register pinions are out of mesh with the racks and the notch 425' is timed to pass the roller 425 at that moment. The free end of the lever 421 is slidably mounted in a vertically extending slot 433 (see Fig. 5) provided with a retaining recess 434 in its upper end and a similar recess 435 in its lower end. The said slot is formed in a plate 436 carried by the side of the cheek plate 35. The end of the lever 421 projects a sufficient distance thru the slot 435 to provide an opening handle 437 by means of which the lever 421 may be raised or lowered and held in either of these positions by engagement with the retaining notches 434 and 435 of the slot 433. Returning now to the bell crank lever 416, this lever is provided with a horizontally extending arm 439 carrying on its outer end a pin 440 which is loosely mounted in a vertically extending slot 441 made in the end of one arm 442 of a bell crank lever 443 which is pivoted on the transverse shaft 250. The bell crank lever 443 is provided with a vertically extending arm 444 which is bent at the point 445 to form a horizontally extending portion 446, the outer end 447 of which is in engagement with the slot 336 of the cam shaft 225 as is clearly shown in Figs. 27 and 28.
The operation of this device is as follows, reference being had to Fig. 25, in which the accumulator gear wheels are shown in contact with the gear teeth of the segments 123 and the operation of the said segments will accumulate the data set up thereon on the accumulator gear wheels. Attention is called to the fact that during this operation the accumulator shaft 192 is within the cut-out portion 409 of the lever 405. After the type segments have made one impression and the data has been transferred to the accumulator wheels, it is now desirable to lock the said wheels out of engagement with the type segments so that during the succeeding printing operation, the data printed thereby will not be accumulated. To accomplish this result, the lever 437 is moved to its upper position as shown in Fig. 24 so that the abutment 420 carried on its upper end will engage with the horizontally extending abutment carried on the lower end of the arm 411 of the lever 405 when lever 437 is reciprocated by the action of cam 118. The outward movement of the lever 420 will lift the arm 410 of the lever 405 until the horizontal extending lip 417 carried on its upward end will snap within the slot 418 made in the upper end of the bell crank 415. The upward movement of the arm 410 will move the vertically extending portion 407 downwardly, the cam face 408 thereon engaging the collar 194 of the cam shaft 192 and holding the said shaft 194 and accumulator gear wheels carried thereon in the position shown in Fig. 24. The accumulating carriage reciprocating actuating levers 207 and 208 are pulled backwardly against the springs 263 and 270 which permits a break between the said levers and the levers 213 and 214 which are operated by the cams 118 and 269 respectively. Due to the break between the levers 207 and 208 and the levers 213 and 214 the actuation of the latter levers by the cams will not actuate the accumulating carriage.

All of the parts above described are held in the positions shown in Fig. 24 while the rest of the units of the machine are accumulating and printing. When the total is to be taken it is desirable that the accumulator gear wheels which have been locked out should be allowed to come into contact with the gear teeth 123 of the type segments so that the data accumulated thereon may be transferred to the type segments and be printed. This result is accomplished automatically when the total key 240' is lifted and the reciprocatable cam shaft 225 is reciprocated. The reciprocation of the cam shaft 225 will engage the outer end 447 of the arm 446 with the inclined surface 338 of the cam. This engagement will oscillate the bell crank 444 about its shaft 250 which oscillation will lift the arm 442 raising with it the arm 439 of the bell crank 416. The lifting of the arm 439 will move the upper end of the arm 415 rearwardly and thereby disengage the notch 417 made therein from engagement with the horizontally extending lip 418 carried by the outer end 410 of the lever 405. The lever 405 upon being released will be drawn down under action of the spring 412 until the vertically extending portion 407 thereof occupies the position shown in Fig. 25, in which position the cut-out portion 409 is in alinement with the accumulator shaft 192 so that the said shaft will be moved forward in its slot 193' to bring the accumulator wheels in contact with the gear wheel 123 of the type segments, and permit the data accumulated thereon to be transmitted to the type segments during the total taking operation as has been heretofore described.

The printing carriage, designated generally by reference numeral 600 (Figs. 36 and 37) is located on the front of the printer tabulator base, to the front of the tabulating mechanism.

The carriage 600 which consists of mechanism for controlling the movement of the paper rolls and printing on the same is mounted between two plates 617 which are tied together by means of tie-rods 613 and 629. Said carriage 600 is carried at each end on an L-shaped support member 605 which slides in a slot 604 in bracket 601 and also has a roller 606 on the end of its horizontal arm which roller moves in an opening 607 formed in bracket 599. On the upper end of the vertical portion 608 of said member 605 is a connecting shaft 609. Mounted on the shaft 609 between said members 608 are two levers 637 which are also mounted on a shaft 639 carried in bracket 601. These levers 637 serve in the manner to be later described to give a reciprocating motion to the carriage so that it can be moved against the type sectors 21 in order to print.

Another pair of supports 612 which are approximately L-shaped, are connected near the upper ends of their vertical arms to shaft 609 between the two levers 637, and have forward extending arms 614 curved to come directly under the tie-rod 513 so that they support the tie-rod and the carriage. The supports 612 are mounted, at the point where the vertical and horizontal arms meet, on the shaft 610.

Two forwardly extending plates 615 are secured in slots in the shaft 609 and at their forward ends support a carriage rail 616 so that when shaft 609 is reciprocated by movement of levers 637, carriage rail 616 will reciprocate with it.

Slidably mounted on carriage rail 616 are two plates 618 provided with slots 619 of such size as to permit the plates 618 to be moved past plates 615 when these plates are rotated about 25° counter-clockwise from the position shown in Fig. 36. The plates 618 are connected with the carriage 600 by rods 629. It will thus be seen that the carriage 600 is pivotally suspended at its rear on rail 616 and in front is supported by the contact of rod 613 with arms 614.

In the operation of the machine it is sometimes desirable to shift the carriage relative to the type sector units, so that the printing columns may occupy various desired positions upon the sheet of paper. Means for accomplishing this will now be described:

The rearward edges of the uprights 608 (Figs. 37 and 39) of the members 605 are provided with inwardly turned perforated ears 621 carrying supporting studs 622 on which is slidably mounted the locating bar 624 provided with elongated slots 625 receiving said studs 622, said bar 624 being also provided with a plurality of holes 626 large enough to receive the head of the locating stud 627 fixed on the locating bracket 628 fixed to the bracket shafts 629 (Fig. 45) connecting the end plates 617.

The stud 627 carried by bracket 628 is locked in position by means of a locking plate 630 provided with key slots 631 each having a large end 632 thru which the head of the stud 627 is adapted to pass, and with small ends 634 (Fig. 43) adapted to form shoulders to engage under the head of said stud whereby the locking plate is positioned by means of a spring 635 tensioned between the upright 608 and the angular manipulating end 636 bent outwardly on said locking plate. The locking plate is held in proper position relative to the locating bar by means of a guide plate 633 secured to an upright 608 (Fig. 39) receiving one end of the locking plate and slotted guide plate 633′ secured to the other end of the locking plate and embracing the screw in the slot 634′ in the ear 621.

To change the position of the carriage the locking plate 630 is pushed over to allow pin 627 to swing free of holes 631 and 626 after which the carriage 600 is swung up around rail 616 and then is moved along rail 616 until it reaches the desired location when the pin 627 is reinserted in a new hole 626 and locked in place as desired.

The printing is accomplished by the rearward movement of the paper supporting mechanism, which movement brings the paper against type of the type sectors. This is accomplished by means of the upper and lower carriage actuating levers 637 and 638 (Fig. 37) pivoted on the lever shaft 639 carried by the brackets 601. The upper and lower actuating levers are both pivotally mounted on said shaft 639 and when in printing position are locked together as will be explained, and are oscillated by means of the engagement of the cam roller 640 engaging in the cam groove 641 of the printing cam 642 carried on the cam shaft 74. The actuating levers give one complete cycle of oscillation once for every revolution of the cam shaft 74.

This locking is accomplished by means of locking cones 645, which are shown in unlocked position in Fig. 38 and must be moved to the right of said figure to lock said upper and lower levers against relative movement. These cones engage in, and when locked, hold in alinement the openings 648 and 649 of said upper and lower levers, and are carried on the cone supporting shaft 650 yieldably drawn to unlocked position by means of the tension spring 651 secured between the end of said shaft and a cross piece 652 disposed across the opening 654 (Fig. 37) in the bracket 601. The opening 654 is large enough for the insertion of the cone shaft and cones when assembling the machine. These cones may be moved to locking position by means of the bell crank lever 655 fulcrumed on the base of the machine and provided at its upper end with spaced ears 656 engaging a transverse pin 657 in the cone supporting shaft 650. This lever is actuated by means of a link 658 pivoted at its lower end to the motive arm of said lever, and at its upper end to the locking lever 660 (Figs. 2 and 36) fulcrumed intermediately as at 661 on the cam shaft bracket 599. The locking lever 660 terminates in a manipulating end 662 (Figs. 2 and 48) received in a slot 664 of the locking plate 665, said slot being provided at its upper and lower parts with shoulder-forming recesses 666 and 667 in which said manipulating end may be locked to retain said locking cones in either locked or unlocked position. When lock lever 660 is moved into locking position, lever 637 will be moved by a movement of lever 638 and thereby the printing carriage will be moved and the items set up by type segments will be printed.

Now will be described the means for supporting the paper.

On the paper roller shaft 620 journaled in the end plates 617 (Figs. 38 and 47) are disposed a plurality of paper rollers 748 each provided with a boss 749 held spaced apart by means of spacing bushings 750 (Fig. 46). Between adjacent pairs of the paper rollers 748 and loosely engaging said bushings are disposed platen support brackets 751 held against rotation by means of the bracket shaft 752 passing thru holes in the lugs 754 on the upper part of said brackets, said brackets being held in spaced relation by means of sleeves 755, (Fig. 45) carried on said shaft 752. The lower part of each platen support bracket carries a forward projection 754 on which is secured, as by means of a screw 756, the platen support 757 having a recess in its forward end in which is carried the elastic platen block 758 of rubber or other suitable material.

The bushings 750 hold the paper rollers out of frictional contact with the platen brackets. The bushings and the paper rollers and all the parts rotatable on the paper roller shaft 620 are caused to rotate with said shaft by means of frictional engagement with each other brought about by the clamping of the screw 759 (Fig. 36) on said shaft.

Between each adjacent pair of paper rollers are the upper and lower inner paper shields 760 and 761 (Fig. 46), which form a continuation of the cylindrical surface of the paper rollers. These shields have angular extensions 764, each extension having inwardly turned ears 765 each provided with an opening receiving the bracket shaft 752. The upper inner shield 760 is pivotally supported on said rod by said ears, being permitted to move pivotally because of the rounded upper face 766, whereby access may be had to the screw 756. This upper shield 760 may be omitted if desired.

Partly surrounding or housing the lower inner shields 761 and the lower part of the paper rollers 748 are the outer paper shields 767 provided with edge flanges 768 on which are formed turned ears 769 provided with openings receiving the bracket shafts 629 (Figs. 37, 45 and 46). These outer shields cooperate with the lower inner shields 761 to form guides for the paper 781 on which the tabulations are to be printed, the outer shields being continued upwardly in front of the paper rollers 748, whereby are formed extensions 784 (Fig. 38) between which the type of the type sectors pass when the paper is pressed against them by means of the platen blocks 758.

On the lower part of the flanges 768 are formed small ears 785 provided with perforations in which are carried release arm shafts 786 (Figs. 38 and 45) on which are pivotally carried the feed roller levers 787 between the outer ends of which are journaled the paper feed rollers 788, said rollers engaging on opposite sides of the lower part of the paper rollers 748, and passing thru suitable openings in the lower shields 767. These feed rollers are held in contact with the paper rollers by means of feed roller tension springs 789, secured at opposite ends to the journaled pins 790 of the rollers (Figs. 38 and 45). The feed roller levers are held from accidental spreading away from the feed rollers by means of spacing springs 789.

The pressure of rolls 788 on the paper 781 may be released by means of a lever 796 which comes into contact with a rod 794 sliding in slots 795 of end plates 617. The lever 596 pushes up on end pieces 792 located at each end of levers 787, thereby swinging rollers 788 out of the position shown in dotted lines in Fig. 45. The shaft 797 to which levers 796 are fastened is carried between end plates 617 and has directly connected to it a lever 798 which is manually operated to release the pressure on the rollers as described. When lever 798 is released, forward movement of this lever is limited by projecting portion 800 of plate 617 (see Fig. 36).

After each number is printed by the type of the type sectors, it is necessary to feed the paper upwardly one or more spaces. This feeding is accomplished by means of engagement of the teeth of the feed ratchet 801, mounted on the shaft 620, by a two armed feed pawl 802 (Fig. 37) pivotally mounted on the feed pawl lever 804 fulcrumed intermediately as on the stud shaft 805 and driven by the link 806, which in turn is driven by the drive lever 807 mounted on the feed shaft 808, said shaft being actuated by the actuating arm 809 fixed on said shaft and adapted to come into contact with and be moved by the abutment shaft 810 carried on the abutment shaft bracket 811 pivotally mounted on the plates 602 which are suspended between brackets 599 and 601. The brackets 811 are limited in their forward movement by the engagement with the tie plates, of a shoulder 812 formed by the lower edge of the lug 814 laterally turned at the forward edge of said abutment shaft brackets, and is yieldably held at its forward limit of movement by a spring 815 tensioned between said lug and a lip on the front part of the plate 602.

When the carriage is moved rearwardly toward the type sectors the free end face 816 of the actuating arm 809 engages and pushes back the abutment shaft 810 against the action of the spring 815 until said end face clears said shaft and permits the shaft and its bracket to be snapped back by the spring 815 until stopped by the shoulder 812. Fig. 37 shows the abutment shaft the instant after it has cleared said end face.

After the printing has taken place and the carriage moves forward, the abutment shaft 810 is engaged by the lower side of the actuating arm 809 whereby said arm and drive lever 807 are raised thus rocking the pawl lever 804 and lowering the pawl 802, which turns the ratchet 801 one or more teeth depending upon how soon the lower member 817 of the pawl is permitted to engage the teeth. When it is desired that the ratchet feed only one tooth at a time, the feed limiting lever 818 pivotally mounted on the upper part of the end plate 617, is set in the position shown in Fig. 37, thus preventing the pawl member 817 to continue to engage the ratchet teeth after it has moved upwardly a distance of one tooth, since the inclined inner face 819 of said member will be engaged by the feed limiting pin 820 mounted on the lower part of the feed limiting lever.

The feed limiting lever 818 is somewhat resilient and is provided with a pair of depressions 821 either one of which is adapted to be engaged by a single projection on the inner face of the end plate 617 formed by stamping a depression 822' (Fig. 37) on the outer face of said end plate, depending upon whether the lever is shifted to the right as shown in Fig. 37, or to the left. This arrangement serves to hold the lever in shifted position.

When it is desired that the pawl feed more than one tooth of the ratchet at a time, the lever 818 is shifted to the left of Fig. 37, thus moving the pin 820 away from the lower pawl member 817 permitting said member to be in engagement with the ratchet teeth during the downward movement of the pawl member for a distance of, for instance, two teeth. If desired, the parts may be so proportioned that three or more teeth may be fed at a time.

In order to prevent the feeding of the paper more than the desired number of teeth, as when the machine is running at very high speed, the pawl 802 is provided with an overthrow preventing cam 822 adapted to engage between the teeth of the ratchet and the inclined face thereof, whereby the ratchet is prevented from turning another tooth space after the pawl has ceased to travel in its feeding direction. A spring 824 tensioned between the stop member 822 and the lever 804 yieldably holds the pawl in engagement with the ratchet teeth.

The feeding mechanism is yieldably held in position to feed by means of a spring 825 tensioned between the end plate 617 and a perforated ear on the upper part of the inner end of the arm 807.

In order to hold the ratchet wheel 801 and the parts carried on the shaft 620 in the positions to which they are fed by the pawl, I provide a detent roller 826 revolubly mounted on one end of the detent lever 827 pivoted to the end plate 617 and drawn by the spring 828 strained between the other end of the detent lever and the lower part of the end plate 617, whereby said roller is yieldably pressed between the teeth of the ratchet and yieldably holds the ratchet in the position to which it is fed.

When it is desired to insert, remove or feed the paper entirely independently of the feeding mechanism just described, I provide the mechanism, shown in Figs. 42, 43, and 45 comprising the paper feed gear 829 fixed on the paper feed shaft 620 and engaged by the idler gear 830 rotatably mounted on the end plate 617, the idler gear being in turn engaged by the knob gear 831 fixed on the stud shaft 805 rotatably mounted in the end plate 617 and carrying knurled knob 832 by which said shaft and gears may be manually rotated.

While the paper is being fed and during the time of printing, it is desirable that it be firmly held against the platens. This is accomplished by means of a clamping mechanism comprising a clamp bar 833 (Fig. 37) carried between the outer ends of the clamp levers 834 provided with intermediate longitudinal slots 835 loosely receiving the paper feed shaft 620, whereby the paper clamp bar is adapted to move toward and from the paper rollers as well as to pivot in relation to said rollers. The inner ends of the clamp levers are provided with small pins 836' received in longitudinal slots 837 in the lower ends of the spring levers 838 intermediately fulcrumed on the end plates 617 and drawn by a spring 836 strained between the upper end of the spring levers and the upper part of end plates 617, whereby the clamp lever 834 is yieldably drawn downwardly and the clamp bar 833 yieldably presses against the paper and presses the paper against the paper rolls 748.

This yieldable engagement maintains during the printing and feeding of the paper, but after feeding has taken place, as above described, the releasing pin 840 mounted on the cam bracket shaft 841 comes into contact with the abutment shaft 810 and forces the cam bracket shaft and the cam bracket 842 to rock forwardly whereupon the cam edge 843 forces outwardly the pin 836 and therewith the lever 834 and bar 833 and also rocks said lever in a direction clockwise on Fig. 37 whereupon the bar 838 is moved downwardly over the paper and later takes a fresh grip upon the paper when the clamping lever is released by the cam on the next rearward movement of the carriage and moves downwardly under the action of the spring 836.

While other methods of inking may be used, I prefer to use an inking ribbon of which the supporting and feeding means will now be described:

The upper part of the cam brackets 842 are each provided with an outwardly projecting ribbon feed arm 844 (Figs. 37, 42, 43 and 44) on which is pivotally mounted the ribbon feed pawl 845 adapted to engage the teeth of the ribbon feed ratchets 846 fixed to the ribbon spools 847 and 848 (see also Fig. 40) each rotatably mounted on a spindle 849 carried by the spool brackets 850.

When this pawl engages the ratchet, the rocking arm of the bracket 842 and the arm 844 causes the spool to feed in a direction to wind the ribbon 851 upon the spool 848, for instance, unwinding said ribbon from the other spool 847. Mechanism is provided for disengaging said pawl from the ratchet of the spool on which the ribbon has become fully wound. This mechanism will now be described.

Each spool 847 and 848 is provided in its upper and lower discs with parallel radial slots 852 in which are received the pin 853 on which pin the end of the ribbon is looped. When the ribbon is wound upon the spool the pin 853 takes its innermost position in the slots as shown in Figure 42; but when the ribbon becomes substantially entirely unwound, it draws the pin outwardly toward the end of the slots, the ribbon being guided outwardly by means of the guide roller 854 and the tension roller 855 carried respectively by the brackets 856 and 857. When this outward movement of the pin takes place, the pin engages the cam arm 858 carried on the reversing bracket 859 (Fig. 44) pivotally mounted on the spindle 849 and carrying the reversing arm 860 and the contact pin 861, which contact pin contacts and holds the pawl 845 out of engagement with the ratchet teeth when said contact pin 861 is in its innermost position. When however, the reversing pin 853 moves outwardly carrying with it the cam arm 858, the reversing arm 860 is moved to the position shown by the dotted lines of Fig. 42, thus disengaging the contact pin 861 from the pawl and permitting the pawl to become engaged with the ratchet teeth, whereupon the ribbon commences to rewind upon the spool. Simultaneously the arm 860 of the other spool is moved in the opposite direction by means of the connecting rod 862 thus causing the disengagement of the pawl of said other spool, thus permitting the other spool to unwind.

In order to maintain the idler roller 855 properly tensioned against the ribbon and against the guide roller 854, the bracket 857 on which the idler roller is journaled is formed with an inwardly extending arm 863 between the end of which and the spool bracket 850 is tensioned a spring 864 which holds the idler roller properly pressed against the ribbon and the guide roller 854.

The inking roller 865 is journaled on the bracket 866 and yieldably held in contact with the idler roller 855 by the spring 867 stretched between the brackets 866 and 856.

The lower journal pin 871 of the inking roller is received in the open ended slot 872 of the bracket 866 and is held therein by retaining latches 874 provided with notches 875 engaging said journal.

The spring 876 tensioned between the end of the pawl 845 and the inner end of the feed arm 844 holds said pawl yieldably in engagement with the ratchet when the pawl is disengaged by the pin 861. A U-shaped guide arm 877 bent up from the reversing bracket 857 properly guides the pawl in its movement. The spools 847 and 848 may be manually operated by means of the handles 876.

The ribbon guide brackets 878 provided with vertical slots 879 thru which the ribbon passes properly positions the ribbon between the platens and the type.

When a total is printed it is desirable to show some visual signal to indicate that the number printed is a total. This is accomplished by shifting the carriage to the left when the total is printed, whereby the total is shown printed a little to the right of the alinement of the listed column. Means for accomplishing this result will now be described.

As shown in Figure 38, the lower edge of the locating bar 624 is provided with a notch 880 in which engages the upper end of the vertical lever 881 pivoted intermediately on the bracket 882 fixed on the printing lever shaft 639, the lower end of said lever being pivotally connected to the rear end of the horizontal lever 884 (Fig. 36) intermediately pivoted on a pin 885 in a lug 886 on the base of the machine. The rearward end of said horizontal lever is pivotally connected to the front end of the total shift lever 232.

When the total pin 238 engages in the groove 244, said pin is shifted to the right, and the upper end of the lever 882 is shifted to the left whereupon the locating bar is moved to the left on the pin 622 in the slot 625, thus causing the printing to take place a slight distance to the right of the column.

When by means of the lever 660 the carriage has been set to a non-printing position so that the items accumulated are not printed, it is still desirable that the totals themselves be printed. In order to accomplish this printing automatically, there is provided the automatic printing lock lever 887 (Fig. 38) pivotally mounted on the bracket 888 fixed to the shaft 724, the upper end of which lever engages in a notch 890, the lower end engaging a transverse pin 891 in the printing lock shaft 650. When the carriage is shifted to the left, the bar 624 is moved therewith and carries the upper end of the lever 887 to the left whereupon the lower part of said lever, said printing lock shaft and the cones 745 are moved to the right thus locking together the upper and lower printing levers 637 and 638 and effecting the printing.

From the foregoing, the operation of the printing carriage will be easily understood. Paper is inserted in the rear opening between the outer shields 767 and the inner lower paper shields 761, and the paper rolls 748 turned by means of the knob 831 until the part on which it is desired first to print are opposite the platen blocks 758. The feed limiting lever 818 is set for the number of teeth it is desired that the feed ratchet shall be fed. If desired, the locking plate 630 is unlocked and the carriage adjusted on the carriage rail and the carriage relocked.

The locking lever 660 is set in locked or unlocked position depending upon whether it is desired that the items be printed or not.

The machine is then started in operation as heretofore explained and the type is set and the accumulators accumulate. If the locking lever is set in locked position the cams 642 cause the printing levers and the carriage to reciprocate and the printing is effected.

When a total is taken the carriage is moved to the left just before the printing by means of the total signal lever 881 engaging in the notch 880 of the locating bar. If the locking lever 660 has not been set in printing position, the automatic levers 887 also cause the cones 745 to lock the printing levers and print totals when the totals are set up and presented by the type sectors.

I claim:

1. A printing tabulator mechanism comprising printing elements, accumulating elements, reciprocating members operatively associated with the printing elements, driving means for the reciprocating members, latch means for connecting the driving means with the reciprocating members, and a release mechanism for disconnecting the driving means, said release mechanism comprising pivoted levers having their free ends in contact with the latch mechanism, the accumulating elements provided with abutments arranged to contact with the pivoted levers for forcing them downwardly and releasing the latch mechanism.

2. A printing tabulator mechanism comprising printing elements, tabulator elements and total taking elements, actuating means for the printing elements, means for reciprocating the tabulator elements into operative relation with the printing elements, said means comprising pivoted links, means for driving them, resilient means for normally holding the links against movement on their pivots, means for preventing the reciprocation of the tabulator elements, said means comprising oscillating levers connected to the said carriage, means for oscillating the levers for reciprocating the carriage independent of and against the first mentioned reciprocating means, members holding the said oscillating levers in their oscillated position to retain the carriage out of operative relation with the printing elements, and a connection between the holding means and the total taking elements whereby an actuation thereof will release the holding means and permit a reciprocation of the tabulator elements by the reciprocating means.

3. A printing tabulator mechanism comprising printing elements, tabulator elements and total taking elements, actuating means for the printing elements, means for reciprocating the tabulator elements into operative relation with the printing elements, means for preventing the reciprocation of the tabulator elements, said means comprising oscillating levers connected to the said carriage, means for oscillating the levers for reciprocating the carriage independent of and against the first mentioned reciprocating means, members holding the said oscillating levers in their oscillated position to retain the carriage out of operative relation with the printing elements, and a connection between the holding means and the total taking elements whereby an actuation thereof will release the holding means and permit a reciprocation of the tabulator elements by the reciprocating means.

4. A printing tabulator mechanism comprising printing elements, tabulator elements and total taking elements, actuating means for the printing elements, means for reciprocating the tabulator elements into operative relation with the printing elements, said means comprising pivoted links, means for driving them, resilient means for normally holding the links against movement on their pivots, means for preventing the reciprocation of the tabulator elements, said means comprising oscillating levers connected to the said carriage, means for oscillating the levers for reciprocating the carriage independent of and against the first mentioned reciprocating means, said means comprising a cam, levers operatively connected thereto and engaging the oscillating levers for oscillating them, members holding the said oscillating levers in their oscillated position to retain the carriage out of operative relation with the printing elements, and a connection between the holding means and the total taking elements whereby an actuation thereof will release the holding means and permit a reciprocation of the tabulator elements by the reciprocating means.

5. In an apparatus of the character described, the combination of type carriers normally in zero position; actuating bars operatively connected to said carriers; means for moving said bars and carriers to numeral position; a reciprocatory transverse shaft under said bars; retracting levers fulcrumed on said shaft, each normally in position to kick to non-printing position the associated actuating bar on each reciprocation of said shaft, each retracting lever being adapted to be moved to inoperative position by a numeral positioned bar; tripping means associated with each retracting lever for carrying to inoperative position all retracting levers of an order lower than any inoperatively positioned retracting lever; and means for rendering said tripping means inoperative.

6. In an apparatus of the character described, the combination of type carriers; actuating members operatively connected to said carriers and each provided with a cam edge; retracting members associated with said reciprocatory members respectively and each provided with a cam wall normally engaging said cam edge; means for reciprocating the retracting members; and tripping means carried by each retracting member for tripping the retracting member of the next lower order.

7. In an apparatus of the character described, the combination of type carriers normally in zero position; actuating members operatively connected to said carriers and each provided with a cam edge; retracting members each provided with a cam wall normally yieldably engaging said cam edge, whereby the retracting members may be moved to inoperative position by a printingly-positioned actuating member; means for reciprocating the retracting members; whereby, any normally positioned retracting member retracts to non-printing position the associated actuating member; and tripping means carried by each retracting member whereby any inoperatively positioned retracting member trips to inoperative position any retracting members of a lower order.

8. In an apparatus of the character described, the combination of type carriers normally in zero position; actuating members operatively connected to said carriers and each provided with a cam edge; means for moving said members and carriers to numeral position; retracting members each provided with a cam wall normally yieldably engaging said cam edge, whereby the retracting members may be moved to inoperative position by printingly positioned actuating member; means for reciprocating the retracting members whereby any normally positioned retracting member retracts to non-printing position the associated actuating member; means for guiding said retracting members during said reciprocation; and tripping means carried by each retracting member whereby any inoperatively positional retracting member trips to inoperative position any retracting member of a lower order.

9. In an apparatus of the character described, the combination of type carriers normally in zero position; actuating bars operatively connected to said carriers and each provided with an inwardly facing cam edge; means for moving said bars and carriers to numeral position; a reciprocatory transverse shaft under said bars; retracting levers fulcrumed on said shaft and each provided with an outwardly facing cam wall normally yieldably contacting said cam edge, said levers being provided with substantially longitudinal slots connected together at their inner ends; a fixed transverse bar normally received in the inner end of said lower slots; and an extension lever slidable on the outer arm of each retracting lever, and having a laterally turned lip adapted to engage under the outer end of the outer arm of the retracting lever of the next lower order.

10. In an apparatus of the character described, the combination of type carriers normally in zero printing position; longitudinally reciprocatory bars operatively connected to said carriers respectively and each provided with a lower holding edge terminating inwardly in an inwardly and downwardly facing cam edge; means for moving said bars to cause said carriers to move from zero position to numeral printing position; a laterally horizontally reciprocatory transverse shaft under said edge; retracting levers intermediately fulcrumed on said shaft one associated with each reciprocatory bar and each having its inner end yieldably held upward and provided with an upwardly and outwardly facing cam wall normally contacting said cam edge and with a lip adapted to engage under the outer arm of the retracting lever of the next lower order.

11. In an apparatus of the character described, the combination of type carriers normally in zero position; actuating bars operatively connected to said carriers and each provided with an inwardly facing cam edge; means for moving said bars and carriers to numeral position; a reciprocatory transverse shaft under said bars; retracting levers fulcrumed on said shaft and each provided with an outwardly facing cam wall normally yieldably contacting said cam edge, said levers being provided with upper and lower approximately longitudinal slots connected together at their rear ends; a fixed transverse bar normally received in the rear end of said lower slots; a pin projecting laterally from the outer arm of each retracting lever; an extension lever longitudinally slidably associated with the outer arm of each retracting lever and provided with an inner slot receiving said reciprocatory shaft, with an outer U-shaped slot receiving said pin, and with a laterally turned lip adapted when the extension lever is slid inwardly to engage under the outer end of the outer arm of the retracting lever of the next lower order; a spring associated with each extension lever for drawing the latter downwardly; bell-cranks each having a bifurcated upper end adapted to receive said reciprocatory shaft; and means for reciprocating the bell-cranks.

12. In an apparatus of the character described, the combination of type carriers normally in zero printing position; rack bars operatively connected to said carriers respectively and each provided with an inwardly and downwardly facing cam edge; means for moving said bars and carriers to numeral printing position; a reciprocatory transverse shaft under said bars; retracting levers intermediately fulcrumed on said shaft one associated with each rack bar and each having its inner end yieldably held upward and provided with a cam wall normally contacting said cam edge, and with an upper and lower substantially longitudinal slot connected together at their ends; a fixed transverse bar normally received in the ends of said lower slots; and an extension lever longitudinally slidably associated with the outer arm of each retracting lever; and having a laterally turned lip adapted to engage under the outer end of the retracting lever of the next lower order.

13. In an apparatus of the character described, the combination of type carriers; actuating members connected therewith; means for moving said members and carriers to printing position; a carrying mechanism associated with the carriers and adapted to kick back said members; and latch levers to hold the members and carriers in inoperative position.

14. In an apparatus of the character described, the combination of type carriers; actuating bars operatively connected therewith; means for moving said actuating bars and carriers to printing position; a carrying mechanism associated with the carriers and having carrying levers adapted to kick back said actuating bars; latch levers having end hooks adapted to engage said bars to hold the sectors in non-printing position and said bars away from the carrying levers.

15. In an apparatus of the character described, the combination of type sectors; rack bars meshing therewith respectively and each provided with an upper abutment; means for moving said bars to numeral printing position; a carrying mechanism associated with the sectors and having carrying levers adapted to kick back said upper abutments; a horizontally disposed pin projecting from each rack bar; a fixed transverse bar to the rear of said pins; latch levers fulcrumed on said fixed bar and having end hooks adapted to engage over said pins respectively, to hold the sectors in non-printing position; and said upper abutments away from the carrying levers.

16. In an apparatus of the character described, the combination of type sectors; rack bars meshing therewith respectively and each provided with an upper and a lower abutment; an abutment bar fulcrumed to each rack bar and provided with a notch forming a rearwardly facing abutment; a bell crank connecting each rack bar and associated abutment bar and each provided with a lower rear notch; a reciprocatory drive bar adapted to engage said rearwardly facing abutment; a zero stop disposed, when raised, before said lower abutment and in said notch to hold the abutment bar depressed and the rack bar against forward movement; numeral stop in series with each zero stop and adapted when raised to lower the zero stop and to engage the bell cranks to lower said abutment bar to clear said drive bar; a carrying mechanism associated with the sectors and having carrying levers adapted to kick back said upper abutments; a horizontally disposed pin projecting from each rack bar; a fixed transverse bar to the rear of said pins; latch levers fulcrumed on said fixed bar and having end hooks adapted to engage over said pins respectively, to hold the sectors in non-printing position, said rearwardly facing shoulders out of reach of the drive bar and said upper abutments away from the carrying levers.

17. In an apparatus of the character described, the combination of type sectors; an accumulator; means for reciprocating the accumulator to and from the type sectors; a holding lever provided with a vertically extending arm adapted when the lever is set to holding position, to hold said accumulator against reciprocation to the type sectors; means for yieldably pressing said lever toward non-holding position; a cam-operated lever adapted to engage said holding lever to move it to holding position; a total taking mechanism for adapting said apparatus for taking totals, and comprising a shiftable part for initiating the total taking operation; and a latch lever adapted to hold said holding lever in holding position, and operated by said shiftable part for releasing the holding lever.

18. In an apparatus of the character described, the combination of type sectors; an accumulator comprising an accumulator shaft and accumulator wheels adapted to mesh with the type sectors; means for yieldably reciprocating the accumulator to and from the type sectors; an intermediately fulcrumed holding lever provided with a vertically extending arm adapted, when the lever is set to holding position, to hold said accumulator against reciprocation to the type sectors; a downwardly extending arm and a rearwardly extending arm on said holding lever; means for yieldably pressing said lever toward non-holding position; a longitudinally reciprocatory cam operated lever adapted to be at will moved from inoperative to operative position and provided with an abutment adapted to engage said downwardly extending arm for moving the holding lever to holding position; a total taking mechanism adapted to adapt said apparatus for taking totals, and comprising a shiftable part for initiating the total taking operation; and a latch lever adapted to hold said holding lever in non-holding position, and operated by said shiftable part for releasing the holding lever.

19. In an apparatus of the character described, the combination of settable stops; a drive member; an actuating member adapted to be engaged by the drive members, or disengaged therefrom by any set stop; accounting mechanism controlled by the actuating members and adapted to disengage said means when a total is taken; and means initiating total taking and adapted to release set numeral stops.

20. In an apparatus of the character described, the combination of settable stops; a zero stop; a drive member; an actuating member adapted to be engaged by the drive members, disengaged therefrom by any set stop or normally positioned zero stop; accounting mechanism controlled by the actuating members; and means initiating total taking and adapted to release set numeral stops, and to move the zero stop out of operative relation with said actuating members.

21. In an apparatus of the character described, the combination of settable stops; a zero stop associated therewith; a drive member; an actuating member adapted to be engaged by the drive member or disengaged therefrom by any set stop, or normally positioned zero stop; accounting mechanism controlled by the actuating members and adapted to disengage said actuating member when a total is taken; means initiating total taking and adapted to release set numeral stops and to move the zero stop out of operative relation with the actuating members.

22. In an apparatus of the character described, the combination of groups of settable stops; a zero stop associated with each group; actuating members; a drive member; means associated with each actuating member and adapted to be engaged by the drive member, and to be disengaged therefrom by any set stop or a normally positioned zero stop; accounting mechanism controlled by the actuating members and comprising devices adapted to disengage said means from the drive member when a total is taken; and means initiating total taking and adapted to release set numeral stops, and to move the zero stop out of operative relation with said means without setting a numeral stop.

23. In an apparatus of the character described, the combination of rows of settable numeral stops; a zero stop associated with each row; shutter members associated with said rows and adapted to hold the stops set; actuating bars; a drive bar; means carried by each actuating bar and adapted to be engaged by the drive bar and disengaged therefrom by any set stop; accounting mechanism controlled by the actuating bars and comprising levers adapted to actuate said means when a total is taken; means for initiating total taking; and means actuated by the initiating means for raising the zero stops; causing said shutter members to release the numeral stops.

24. In an apparatus of the character described, the combination of rows of numeral stops each provided with a notch and a long recess; a zero stop associated with each row and provided with a notch; shutters between said rows and adapted to engage in said notches; an actuating bar above each row; a transverse drive bar; an abutment lever carried by each actuating bar and adapted to be engaged by the drive bar and disengaged therefrom by any raised stop; accounting mechanism controlled by the actuating bars and comprising levers adapted to depress said abutment levers when a total is taken; means initiating total taking and comprising a cam; a slide-plate for disengaging said shutters from said notches; elongated levers in said long recesses; means connected to the elongated levers for raising the zero stops when the elongated levers are raised; and a retracting member adapted to be engaged by said cam and to actuate said slide-plate and to raise said elongated levers.

25. In an apparatus of the character described, the combination of numeral stops each provided with a notch and a long recess; zero stop associated with each of said rows and provided with a notch and an opening; means for raising the numeral stops; pivoted shutters between said rows and adapted to engage in said notches; an actuating bar disposed above each row; a transverse drive bar; an abutment lever carried by each actuating bar and adapted to be driven by the drive bar, and adapted to be lowered by any raised stop; accounting mechanism controlled by the actuating bars and comprising levers adapted to depress said abutment levers when a total is taken; means initiating total taking and comprising a cam member; a slide-plate adapted to disengage said shutters from said notches; yieldably depressed elongated levers disposed between said rows and provided with lugs engaging in said long recesses; intermediately fulcrumed links having one end connected to the elongated levers and the other end provided with a lug engaging in said opening; a retracting lever adapted to be engaged by said cam member and to actuate said slide-plate and provided with a comb plate adapted to raise said elongated levers thereby to depress the zero stops without raising the numeral stops.

26. In an apparatus of the character described, the combination of settable numeral stops each provided with a notch and a long recess; a zero stop and provided with a notch and with an opening; means adapted to engage in said notches and to be disengaged from some notches as other notches are raised; yieldably depressed elongated levers provided with lugs engaging in said long recesses; intermediately fulcrumed connecting links having one end connected to the elongated levers and the other end provided with a lug engaging in said opening of the zero stop; and selecting means controlled by the stops.

27. In an apparatus of the character described, the combination of settable numeral stops each provided with a notch and a long recess; a zero stop and provided with a notch and with an opening; means adapted to engage in said notches to be disengaged from some notches as other notches are raised; yieldably depressed elongated levers provided with lugs engaging in said long recesses; means for raising the elongated levers; intermediately fulcrumed connecting links having one end connected to the elongated levers and the other end provided with a lug engaging in said opening of the zero stop; and selecting means controlled by the stops.

28. In an apparatus of the character described, the combination of rows of vertically movable stops each provided with a notch and in its lower part with a long recess; a zero stop associated with each row of numeral stops and provided with a notch and with an opening; pivoted shutters between said rows of stops and adapted to engage said notches; a slide-plate adapted to move said shutters out of engagement with said notches and provided with a cam; yieldably depressed elongated levers disposed between said rows and provided with lugs engaging in said long recesses; intermediately fulcrumed connecting links having one end connected to the elongated levers and the other end provided with a lug engaging in said opening of the zero stop; means for raising numeral stops; selecting means controlled by the stops; a fulcrumed release arm having one end engaging said cam; and means for reciprocating the release arm.

29. In an apparatus of the character described, the combination of a pair of cheek plates; rows of vertically movable numeral stops between said plates and each provided with upper and lower notches and in its lower part with a long restoring recess; a zero stop associated with each row of numeral stops and provided with upper and lower notches and with a lug receiving opening; shutters pivotally mounted between the rows of stops and engaging either of said notches; a transverse slide-plate adapted when actuated to move said shutters out of engagement with said notches and projecting through one of the cheek plates and having a cam face; yieldably depressed elongated levers pivotally mounted at one end and disposed between said rows of stops and provided with a plurality of lugs engaging in said restoring recesses; intermediately fulcrumed connecting links having one end loosely connected to the elongated levers and the other end provided with a lug engaging in said opening of a zero stop; means for raising numeral stops; selecting means controlled by the stops; a release arm fulcrumed on one of said plates and having one end engaging said cam face; and means for reciprocating the release arm.

30. In an apparatus of the character described, the combination of an accounting mechanism comprising type sectors and rack bars cooperating with the type sectors; an elongated lever pivoted to each rack bar and provided with an outwardly disposed shoulder; a transverse drive bar adapted to engage said shoulders for driving the rack bars; an accumulating mechanism associated with said type sectors and comprising accumulator gears; provided with a zero position stop and a projection; means adapted to engage said stops for stopping the gears in total-taking position; and a pivoted bracket lever associated with each elongated lever and adapted to be engaged by said projection when the gear is in total taking position and adapted when thus engaged to depress the elongated lever to permit said shoulder to clear the drive rod.

31. In an apparatus of the character described, the combination of type carriers; actuating members therefor respectively and each provided with an abutment; a normally yieldably raised engaging member movably mounted on each actuating member; a drive member; a series of numeral stops associated with each actuating member and adapted when raised to cause the engaging member to engage the drive member thereby to carry forward the actuating member and then to lower said engaging member to clear said drive member; a carrying mechanism associated with the carriers and having carrying members adapted to kick back said abutments to effect carrying; and latch levers adapted to engage said actuating members respectively to hold the actuating members retracted and to hold said upper abutments away from the carrying members.

32. In an apparatus of the character described, the combination of type carriers; actuating members therefor respectively; an accumulating and carrying mechanism associated with the carriers and having carrying levers adapted to kick back said actuating members to effect carrying; and latches adapted to engage said actuating members respectively to hold the actuating members retracted out of reach of the carrying levers.

33. In an apparatus of the character described, the combination of actuating members; a drive member for the actuating members; an accumulating and carrying mechanism operatively associated with the actuating members and having carrying members adapted to kick back said actuating members to effect carrying; and devices adapted to engage said actuating members respectively to hold the actuating members retracted out of reach of the carrying members.

34. In an apparatus of the character described, the combination of actuating members; an accumulating and carrying mechanism actuated by the actuating members and having carrying members adapted to kick back said actuating members to effect carrying; and devices for at will engaging said actuating members respectively to hold the actuating members out of reach of the carrying members.

35. In an apparatus of the character described, the combination of type carriers normally in zero position; actuating members therefor respectively; a normally yieldably raised abutment member on each actuating member; a drive member; a series of numeral stops associated with each actuating member and adapted when raised to cause the abutment member to engage the drive member, thereby to carry forward the actuating member and then to lower said abutment member to clear said drive member; and latch levers adapted to hold the actuating member retracted during complete cycles of operation of the apparatus, thereby to hold the carriers in non-printing position to the rear of normal zero position.

36. In an apparatus of the character described, the combination of type carriers; actuating members therefor respectively; a normally yieldably raised abutment bar fulcrumed to each actuating member and provided at its upper edge with a rearwardly facing abutment; a drive member; a series of numeral stops associated with each actuating member and adapted when raised to cause the abutment bar to dispose its rearwardly facing abutment before the drive member thereby to carry forward the actuating member and then to lower said abutment bar to clear said drive member; and latch levers adapted to hold retracted the respective actuating members thereby to hold said rearwardly facing abutments to the rear of and out of reach of the rearmost position of the drive member, thereby to render the drive member inoperative to drive the actuating member.

37. In an apparatus of the character described, the combination of actuating members; an abutment bar movably mounted on each actuating member and provided with a rearwardly facing abutment; a drive member; selecting means associated with each actuating member and adapted to cause the abutment bar to dispose its rearwardly facing abutment in driving relation with the drive member thereby to carry forward the actuating member; and latch levers adapted to hold retracted the respective actuating members thereby to hold said rearwardly facing abutments to the rear of and out of reach of every position of the drive member, thereby to render the drive member inoperative to drive the actuating member.

38. In an apparatus of the character described, the combination of actuating members; an abutment member movably mounted on each actuating member during the initial stroke of the drive member; a drive member; selecting means associated with each actuating member and adapted to cause the abutment member to dispose itself in driving relation with the drive member; and devices adapted to hold retracted the respective actuating members thereby to hold said abutment members out of driving relation with the drive member during complete cycles of operation of the apparatus.

39. In an apparatus of the character described, the combination of actuating members; a drive member; selectively operated connecting means associated with each actuating member for bringing about driving relation between the drive member and the associated actuating member; and devices free of control by said connecting means adapted to hold retracted the respective actuating members and thereby to hold said connecting means out of reach of the drive member during complete cycles of operation of the apparatus, thereby to render the drive member inoperative to drive the actuating member.

40. In an apparatus of the character described, the combination of an accounting mechanism; actuating members therefor; a drive member for positively driving said actuating members in both directions; connecting means associated with each actuating member for bringing about driving relation between the drive member and the actuating member; and devices adapted to hold respective actuating members and the associated connecting means out of driving relation with the drive member during complete cycles of operation of the apparatus.

41. In an apparatus of the character described, the combination of printing mechanism; actuating members therefor; a drive member; connecting means associated with each actuating member for bringing about driving relation between the drive member and the actuating member; and normally inoperative devices adapted to hold the respective actuating members and associated connecting means out of driving relation with the drive member during complete cycles of operation of the apparatus.

42. In an apparatus of the character described, the combination of actuators; a reciprocatory accumulator; holding levers yieldably held in non-holding position and adapted when set to holding position to hold said accumulator against reciprocation into accumulating engagement with the actuators; a latch adapted to hold said holding lever in holding position; a cam operated means adapted to move said lever to position to be caught by said latch for holding the lever in holding position; and a total taking mechanism comprising a shiftable part, adapted to operate said latch for releasing the holding lever.

43. In an apparatus of the character described, the combination of actuators; a reciprocator accumulator; holding levers yieldably held in non-holding position and adapted when set to holding position to hold said accumulator against reciprocation into accumulating engagement with the actuators; a latch adapted to hold said holding lever in holding position; means adapted to move said lever to position to be caught by said latch for holding the lever in holding position; and a total taking mechanism comprising a shiftable part, adapted to operate said latch for releasing the holding lever.

44. In an apparatus of the character described, the combination of actuators; a yieldably reciprocatory accumulator; holding means adapted when set to holding position to hold said accumulator against reciprocation into accumulating engagement with the actuators; means adapted to move said holding means to holding position; and a total taking mechanism comprising a shiftable part, adapted to bring about disabling of the holding means.

45. In an apparatus of the character described, the combination of actuating members; a reciprocatory accumulator; holding means adapted when operative to hold said accumulator against reciprocation into accumulating engagement with the actuating member; means for rendering said holding means operative; and a total-taking initiating mechanism adapted to render said holding means inoperative.

46. In an apparatus of the character described, the combination of an accumulator; holding means yieldably held inoperative and adapted when operative to hold said accumulator against accumulating means for rendering said holding means operative; and a total-taking initiating mechanism adapted to render said holding means inoperative.

47. In an apparatus of the character described, the combination of an accumulator; holding means adapted when operative to hold said accumulator against accumulating; means for positively rendering said holding means operative; and a total-taking initiating mechanism adapted to render said holding means inoperative.

48. In an apparatus of the character described, the combination of an accumulator; holding means adapted when operative to positively hold said accumulator against accumulating items; and a total-taking initiating mechanism adapted to render said holding means inoperative.

49. In an apparatus of the character described, the combination of an accumulator; holding means adapted when operative to hold said accumulator against accumulating items; and a total-taking initiating mechanism adapted to render said holding means inoperative.

50. In an apparatus of the character described, the combination of actuators; a reciprocatory accumulator; actuating levers having yieldably active arms operatively connected to said accumulator for reciprocating the same into and out of mesh with the actuators; and holding levers normally in inoperative position and adapted when moved to holding position to hold said active arms and said accumulator against reciprocation to the actuators while the motive portions of the actuating levers continues to reciprocate.

51. In an apparatus of the character described, the combination of actuators; a reciprocatory accumulator; yieldable means for reciprocating the accumulator into and out of mesh with the actuators; and holding devices normally in inoperative position and adapted when moved to holding position to hold said accumulator against reciprocation.

52. In an apparatus of the character described, the combination of actuating members; a reciprocatory accumulator reciprocating into and out of engagement with the actuating members; and holding means normally inoperative and adapted when moved to holding position to hold said accumulator against reciprocation during complete cycles of operation of the apparatus.

53. In an apparatus of the character described, the combination of type carriers normally in zero position; actuating members operatively connected to said carriers; retracting members normally engaging said actuating members respectively and adapted to be moved to inoperative position by an associated numeral positioned actuating member; means for reciprocating the retracting members, whereby any normally positioned retracting member retracts to non-print position the associated actuating member; and tripping means movably mounted on each retracting member and adapted to be at will moved to operative or inoperative relation with the retracting member of the next lower order, whereby when said means is in said operative relation, an inoperatively positioned retracting member will trip to inoperative position any retracting member of a lower order, and whereby when the tripping means is in said inoperative relation said tripping action will not be accomplished.

54. In an apparatus of the character described, the combination of type carriers normally in zero position; actuating members operatively connected to said carriers; retracting members normally operative to engage said actuating members respectively and adapted to be rendered inoperative by any associated numeral positioned actuating member; a device for reciprocating the retracting members, whereby any normally operative retracting member retracts to non-print position the associated actuating member; and means movably mounted on each retracting member and adapted to be at will moved to operative or inoperative relation with the retracting member of the next lower order, whereby when said means is in said operative relation, an inoperative-rendered retracting member will disable for retracting any retracting member of a lower order, and whereby when said means is in said inoperative relation said disabling action will not be accomplished.

55. In an apparatus of the character described, the combination of type carriers normally in zero position; actuating members operatively connected to said carriers; retracting members adapted to engage said actuating members respectively and adapted to be moved to inoperative position by an associated numeral positioned actuating member; and means interposed between adjacent retracting members and adapted to be at will rendered operative or inoperative, whereby when said means is operative, an inoperatively positioned retracting member will trip to inoperative position any retracting member of a lower order, and whereby when the means is inoperative, said tripping action will not take place.

56. In an apparatus of the character described, the combination of type carriers normally in zero position; actuating members operatively connected to said carriers and each provided with a cam edge; retracting members each provided with a cam wall normally yieldably engaging said cam edge, whereby the retracting members may be moved to inoperative position by a printingly-positioned actuating member; means for reciprocating the retracting members, whereby any normally positioned retracting member retracts to non-printing position the associated actuating member; and tripping means carried by each retracting member whereby any inoperatively positioned retracting member trips to inoperative position any retracting members of a lower order.

57. In an apparatus of the character described, the combination of type carriers; actuating members operatively connected to said carriers respectively; retracting members normally engaging said actuating members respectively and movable to inoperative position by any numeral positioned actuating member or any inoperatively positioned retracting member of a higher order; means for retracting the retracting members, thereby to cause normally positioned retracting members to retract to non-printing position the associated actuating member; and means for holding the retracting member in operative or inoperative position during the retracting operation.

58. In an apparatus of the character described, the combination of type carriers; actuating members operatively connected to said carriers respectively; retracting members adapted to engage said actuating members respectively and movable to inoperative position by any numeral positioned actuating member or any inoperatively positioned retracting member of a higher order; means for retracting the retracting members, thereby to cause normally positioned retracting members to retract to non-printing position the associated actuating member; and means for positively holding the retracting member in operative or inoperative position during the retracting operation.

59. In an apparatus of the character described, the combination of type carriers; actuating members operatively connected to said carriers respectively; retracting members normally engaging said actuating members respectively and movable to inoperative position by any numeral positioned actuating member or any inoperatively positioned retracting member of a higher order; means for retracting the retracting members, thereby to cause normally positioned retracting member to retract to non-printing position the associated actuating member but permitting the inoperatively positioned retracting members to retract without retracting the associated actuating members; and means for positively holding the inoperatively positioned retracting member in inoperative position during the retracting operation.

60. In an apparatus of the character described, the combination of type carriers; actuating members operatively connected to said carriers respectively; retracting members adapted to engage said actuating members respectively and movable to inoperative position by any numeral positioned actuating member or any inoperatively positioned retracting member of a higher order; means for retracting the retracting members; and means for positively holding the inoperatively positioned retracting member in inoperative position during the retracting operation.

61. In an apparatus of the character described, the combination of type carriers; actuating members operatively connected to said carriers respectively; retracting members adapted to engage and normally engaging said actuating members respectively and movable to inoperative position by any associated numeral positioned actuating member or any inoperatively positioned retracting member of a higher order; means for actuating the retracting members, thereby to cause normally positioned retracting members to retract to non-printing position the associated actuating member; and means for positively holding the retracting member in operative position during the actuating operation.

62. In an apparatus of the character described, the combination of type carriers; actuating members operatively connected to said carriers respectively; retracting members normally operative to retract said actuating members respectively and movable to inoperative position by any associated numeral positioned actuating member or any inoperatively positioned retracting member of a higher order; means for retracting the retracting members; and means for positively holding the retracting member in operative position during the actuating operation.

63. In an apparatus of the character described, the combination of type carriers; actuating members operatively connected to said carriers respectively; retracting members normally engaging said actuating members and in operative position to retract said actuating members respectively and movable to inoperative position by any numeral positioned actuating member or any inoperatively positioned retracting member of a higher order; means for actuating the retracting members, thereby to cause normally positioned retracting members to retract to non-printing position the associated actuating member.

64. In an apparatus of the character described, the combination of type carriers; actuating members operatively connected to said carriers respectively; retracting members normally operative to retract said actuating members respectively and movable to inoperative position by any numeral positioned actuating member or any inoperatively positioned retracting member of a higher order.

65. In an apparatus of the character described, the combination of type carriers; retracting members normally adapted to retract said carriers respectively to non-printing position and rendered inoperative by any numeral positioned actuating member or any inoperatively rendered retracting member of a higher order.

66. In combination, type carriers; an actuating means for selectively positioning each type carrier; and a device individually associated with each individual actuating means and acting to selectively hold the actuating member retracted in non-printing position during complete cycles of operation.

67. In combination, type carriers; an actuating means for selectively positioning each type carrier; and a device associated with each actuating means and acting independently of the other actuating means to hold the actuating member retracted in non-printing position during complete cycles of the operation of the combination.

68. In combination, type carriers; an actuating means for selectively positioning each type carrier; and a manually operable device associated with each actuating means to selectively hold the actuating member retracted in non-printing position during complete cycles of the entire operation of the combination, unless manually released.

69. In combination, rows of settable positioning means; an accounting machine controlled by said means when set for accumulating and adapted to be set for totals when free of such control; and means for causing total taking and disabling the set positioning means.

70. In combination, positioning means; detent means for holding said positioning means operative; an accounting machine controlled by said positioning means for accumulating and adapted to be set for totals when free of such control; and means for causing total taking and disabling said detent means.

71. In combination, rows of settable stops; latches adapted to hold said stops set for accumulating; an accounting machine controlled by said stops for accumulating and adapted to be set for totals when free of such control; shiftable means for causing total taking; and an operative connection between said latches and shiftable means for releasing set stops during total taking.

72. In combination, rows of settable stops; latches adapted to hold said stops set for accumulating; and accounting machine controlled by said stops for accumulating and adapted to be set for totals when free of such control; means for causing total taking and comprising a cam; and an operative connection between said cam and latches for releasing set stops during total taking.

73. In combination, rows of stops each provided with a pair of lateral notches; shutter latches adapted to engage either one of said notches of each stop, and provided with end projections; an accounting machine controlled by said stops and comprising an accumulator adapted to accumulate or take totals; means for actuating said accumulator by two different actions for accumulating or taking totals; means for shifting said actuating means and comprising a cam provided with a shutter releasing cone; and a shutter retracting plate slidably mounted on one of said supporting plates and provided with projections engaging between said end projections and operatively connected to said cone.

74. In combination, a plurality of groups of numeral types; a zero type associated with each group; control means cooperating with the zero type for preventing movement of the zero type to printing position and constructed and positioned to be manually set to assume a normal or an abnormal condition, and adapted, when in said normal condition, to be by a control means of another group influenced to assume an operative condition, and when in abnormal position to be free from such influence.

75. In an apparatus of the character described, the combination of movable members; a drive member; means for yieldably moving said movable members into operative relation with the drive means when a total is to be taken; and an accumulating mechanism operatively associated with said movable members and adapted to disconnect them from the drive member.

76. In an apparatus of the character described, the combination of abutment members adapted when actuated to bring about accumulation; a drive member; means adapted to move the abutment member into engagement with the drive member; and means for stopping the abutment member.

77. In an apparatus of the character described, the combination of abutment members; an accounting machine controlled by the abutment members; means adapted to move said abutment members into and out of driven relation; and additional means for moving said abutment members out of driven relation.

78. In an apparatus of the character described, the combination of actuation bars; an accounting machine controlled by the actuating bars; an abutment lever pivotally secured on each actuating bar; a drive bar; means adapted to raise said abutment levers into and out of driving relation with the drive shaft; means for lowering the levers in accordance with the number to be registered; and additional means for depressing said abutment levers.

79. In an apparatus of the character described, the combination of actuating bars; an accounting machine controlled by the actuating bars; an abutment lever pivotally secured on each actuating bar; a drive member; means adapted to raise said abutment levers into driving relation with the drive member; means for lowering the levers in accordance with the number to be registered; a reciprocating means; and means carried by the reciprocating means for depressing said abutment levers.

80. The combination with a series of tabulator units each including a totalizer and actuators therefor, and an operating mechanism for operating said tabulator units, of resilient means for moving said totalizers into and out of gear with their actuators, and means settable to lock a selected totalizer out of engagement with its actuators and against the action of said resilient means.

81. The combination with a series of tabulator units each including a totalizer and actuators therefor, and operating means for operating said tabulator units, of resilient means for moving each totalizer into engagement with its actuators, and means acting automatically to lock a selected one of said totalizers against the action of said resilient means out of engagement with its actuator.

82. The combination with a series of tabulator units each including a totalizer and actuators therefor, and operating mechanism for said tabulator units, of resilient means for moving each totalizer into engagement with its actuator, a lock for holding a selected totalizer out of engagement against the action of said resilient means, and a device settable to operative and inoperative position, said device when in operative position causing the operating mechanism to actuate said lock and thus prevent the selected totalizer from engaging its actuator.

83. The combination with a series of tabulator units each including a totalizer and actuators therefor, and operating mechanism for said tabulator units, of resilient means for moving each totalizer into engagement with its actuator, a lock for holding a selected totalizer out of engagement against the action of said resilient means, a device settable to operative and inoperative position, said device when in operative position causing the operating mechanism to actuate said lock and thus prevent the selected totalizer from engaging its actuator, means for taking a total and means controlled by said total taking means for automatically releasing said lock.

WILLIAM W. LASKER.